(12) United States Patent
Petro et al.

(10) Patent No.: US 8,471,425 B2
(45) Date of Patent: Jun. 25, 2013

(54) ROTOR-STATOR STRUCTURES INCLUDING BOOST MAGNET STRUCTURES FOR MAGNETIC REGIONS HAVING ANGLED CONFRONTING SURFACES IN ROTOR ASSEMBLIES

(75) Inventors: John P. Petro, Los Altos, CA (US); Ken G. Wasson, Foster City, CA (US); Donald Burch, Los Altos, CA (US); Jeremy Mayer, Mountain View, CA (US); Michael Regalbuto, Santa Clara, CA (US)

(73) Assignee: NovaTorque, Inc., Fremont, CA (US)

( * ) Notice: Subject to any disclaimer, the term of this patent is extended or adjusted under 35 U.S.C. 154(b) by 273 days.

(21) Appl. No.: 13/044,519

(22) Filed: Mar. 9, 2011

(65) Prior Publication Data
US 2012/0228978 A1   Sep. 13, 2012

(51) Int. Cl.
*H02K 29/03* (2006.01)
*H02K 21/24* (2006.01)

(52) U.S. Cl.
USPC ............ 310/156.38; 310/112; 310/156.07; 310/156.15; 310/156.36; 310/156.62; 335/302

(58) Field of Classification Search
CPC .......... H02K 29/03; H02K 21/24; H02K 1/278
USPC ................ 310/112, 156.07, 156.15, 156.36, 310/156.38, 156.62; 335/302
See application file for complete search history.

(56) References Cited

U.S. PATENT DOCUMENTS

| | | |
|---|---|---|
| 439,102 A | 10/1890 | Bradley |
| 829,975 A | 9/1906 | Lincoln |
| 1,039,197 A | 9/1912 | Roth et al. |
| 1,557,213 A | 10/1925 | Lee |
| 1,640,742 A | 8/1927 | Wallace et al. |
| 1,763,104 A | 6/1930 | Shurtleff |
| 1,771,281 A | 7/1930 | Wilsing |

(Continued)

FOREIGN PATENT DOCUMENTS

| | | |
|---|---|---|
| CH | 400323 | 4/1966 |
| DE | 2433809 A1 | 7/1974 |

(Continued)

OTHER PUBLICATIONS

USPTO Office Action in U.S. Appl. No. 11/925,661, mailed Mar. 30, 2010.

(Continued)

*Primary Examiner* — John K Kim
(74) *Attorney, Agent, or Firm* — Cooley LLP

(57) ABSTRACT

Various embodiments relate generally to electrodynamic machines and the like, and more particularly, to rotor assemblies and rotor-stator structures for electrodynamic machines, including, but not limited to, outer rotor assemblies and/or inner rotor assemblies with a corresponding stator assembly. In some embodiments a rotor assembly can include magnetically permeable structures having confronting surfaces oriented at an angle to the axis of rotation. A group of magnetic structures can be interleaved with the magnetically permeable structures. The magnetically permeable structures can also include non-confronting surfaces adjacent to which boost magnets are disposed to enhance flux in a flux path passing through magnetic structures that are interleaved with magnetically permeable structures. Further, the rotor assemblies can include a flux conductor shield disposed adjacent to the boost magnets, the flux conductor shield configured to provide return flux paths.

21 Claims, 38 Drawing Sheets

U.S. PATENT DOCUMENTS

| | | |
|---|---|---|
| 1,874,094 A | 8/1932 | Ford et al. |
| 1,962,832 A | 6/1934 | Neureuther |
| 2,025,560 A | 12/1935 | Warren |
| 2,059,518 A | 11/1936 | Harley |
| 2,081,993 A | 6/1937 | Gebhardt et al. |
| 2,378,668 A | 6/1945 | Vickers |
| 2,480,825 A | 9/1949 | Adolph |
| 2,484,001 A | 10/1949 | Raymond |
| 2,486,656 A | 11/1949 | Klirkhamer |
| 2,500,730 A | 3/1950 | Yonkers |
| 2,561,890 A | 7/1951 | Stoddard |
| 2,575,153 A | 11/1951 | Wightman |
| 2,669,687 A | 2/1954 | De Tastes |
| 2,677,256 A | 5/1954 | Donandt |
| 2,677,259 A | 5/1954 | Woodward |
| 2,694,781 A | 11/1954 | Hinz |
| 2,717,969 A | 9/1955 | Buchhold et al. |
| 2,769,106 A | 10/1956 | Dembowski |
| 2,796,542 A | 6/1957 | Bekey et al. |
| 2,802,959 A | 8/1957 | Powers |
| 2,824,272 A | 2/1958 | Delaporte |
| 2,927,229 A | 3/1960 | Merrill |
| 3,001,093 A | 9/1961 | Wilcox et al. |
| 3,025,445 A | 3/1962 | Welch |
| 3,111,596 A | 11/1963 | Lovegrove |
| 3,153,157 A | 10/1964 | Rabe |
| 3,173,042 A | 3/1965 | Fodor |
| 3,175,111 A | 3/1965 | Orr |
| 3,205,384 A | 9/1965 | Sears |
| 3,210,582 A | 10/1965 | Miller |
| 3,223,866 A | 12/1965 | Tiltins |
| 3,241,111 A | 3/1966 | Sandstrom |
| 3,309,547 A | 3/1967 | Woodward |
| 3,319,100 A | 5/1967 | Erickson |
| 3,321,652 A | 5/1967 | Opel |
| 3,344,325 A | 9/1967 | Sklaroff |
| 3,356,425 A | 12/1967 | Carriere et al. |
| 3,360,667 A | 12/1967 | Gordon |
| 3,374,376 A | 3/1968 | Kromrey |
| 3,396,291 A | 8/1968 | Somerville |
| 3,399,002 A | 8/1968 | Atkinson |
| 3,428,837 A | 2/1969 | Morreale et al. |
| 3,466,518 A | 9/1969 | Aylikci |
| 3,471,729 A | 10/1969 | Latta et al. |
| 3,482,131 A | 10/1969 | Lytle |
| 3,490,816 A | 1/1970 | Lyman |
| 3,513,341 A | 5/1970 | Gratzmuller |
| 3,519,859 A | 7/1970 | Morreale et al. |
| 3,555,324 A | 1/1971 | Lovegrove |
| 3,565,495 A | 2/1971 | Lyman |
| 3,603,826 A | 9/1971 | Saretzky |
| 3,619,014 A | 11/1971 | Quick |
| 3,648,090 A * | 3/1972 | Voin .................... 310/191 |
| 3,651,355 A | 3/1972 | Mason |
| 3,689,787 A | 9/1972 | Staretzky |
| 3,717,780 A | 2/1973 | Hohne, Jr. et al. |
| 3,723,796 A | 3/1973 | Mason |
| 3,787,100 A | 1/1974 | Habermann et al. |
| 3,822,768 A * | 7/1974 | Sebulke .................... 188/70 R |
| 3,863,084 A | 1/1975 | Hasebe |
| 3,936,680 A | 2/1976 | Kuwako et al. |
| 3,947,155 A | 3/1976 | Bidol |
| 3,950,663 A | 4/1976 | Mead |
| 3,956,651 A | 5/1976 | Brammerlo |
| 3,979,821 A | 9/1976 | Noodleman |
| 4,031,421 A | 6/1977 | Geiger |
| 4,043,614 A | 8/1977 | Lyman |
| 4,045,696 A * | 8/1977 | Lutz et al. .................... 310/49.43 |
| 4,066,922 A | 1/1978 | Hennemann et al. |
| 4,080,724 A | 3/1978 | Gillette |
| 4,117,359 A | 9/1978 | Wehde |
| 4,143,289 A | 3/1979 | Williams |
| 4,152,570 A | 5/1979 | Inoue |
| 4,156,817 A | 5/1979 | Preece et al. |
| 4,159,434 A | 6/1979 | Kalsi |
| 4,216,263 A | 8/1980 | Otis et al. |
| 4,221,984 A | 9/1980 | Mason |
| 4,259,603 A | 3/1981 | Uchiyama et al. |
| 4,321,495 A | 3/1982 | Kennedy |
| 4,327,302 A | 4/1982 | Hershberger |
| 4,328,411 A | 5/1982 | Haller et al. |
| 4,358,693 A | 11/1982 | Palmer et al. |
| 4,363,988 A | 12/1982 | Kliman |
| 4,378,146 A | 3/1983 | Suzuki et al. |
| 4,390,262 A | 6/1983 | Hirohata et al. |
| 4,395,815 A | 8/1983 | Stanley et al. |
| 4,460,253 A | 7/1984 | Kawai et al. |
| 4,476,395 A | 10/1984 | Cronin |
| 4,480,208 A | 10/1984 | Logie et al. |
| 4,483,570 A | 11/1984 | Inoue |
| 4,491,401 A | 1/1985 | Inaba et al. |
| 4,503,349 A | 3/1985 | Miller |
| 4,543,506 A | 9/1985 | Kawada et al. |
| 4,564,775 A | 1/1986 | Mazzorana |
| 4,577,129 A | 3/1986 | Bertram |
| 4,593,222 A | 6/1986 | Burkel et al. |
| 4,594,539 A | 6/1986 | Michelson |
| 4,601,564 A | 7/1986 | Yamamoto |
| 4,614,888 A | 9/1986 | Mosher et al. |
| 4,628,220 A | 12/1986 | Flogvall |
| 4,631,807 A | 12/1986 | Kawada et al. |
| 4,658,228 A | 4/1987 | Leupold |
| 4,663,581 A | 5/1987 | Glennon |
| 4,674,178 A | 6/1987 | Patel |
| 4,710,667 A | 12/1987 | Whiteley |
| 4,713,569 A | 12/1987 | Schwartz |
| 4,725,750 A | 2/1988 | Welch |
| 4,731,626 A | 3/1988 | Kawamoto |
| 4,741,094 A | 5/1988 | Denk et al. |
| 4,745,345 A | 5/1988 | Petersen |
| 4,748,359 A | 5/1988 | Yahara et al. |
| 4,748,361 A | 5/1988 | Ohnishi et al. |
| 4,757,224 A | 7/1988 | McGee et al. |
| 4,759,186 A | 7/1988 | Sugden |
| 4,760,314 A | 7/1988 | Mohri et al. |
| 4,763,150 A | 8/1988 | Sumi |
| 4,777,397 A | 10/1988 | Parshall |
| 4,784,604 A | 11/1988 | O'Connor |
| 4,788,465 A | 11/1988 | Hertrich |
| 4,802,347 A | 2/1989 | Nystuen |
| 4,879,484 A | 11/1989 | Huss |
| 4,883,996 A | 11/1989 | Aoki |
| 4,885,489 A | 12/1989 | Stuhr |
| 4,918,802 A | 4/1990 | Schaefer |
| 4,920,295 A | 4/1990 | Holden et al. |
| 4,939,397 A | 7/1990 | Morrill |
| 4,962,583 A | 10/1990 | Yang |
| 4,983,870 A | 1/1991 | McSparran |
| 4,984,972 A | 1/1991 | Clausen et al. |
| 5,033,265 A | 7/1991 | Sugden |
| 5,036,235 A | 7/1991 | Kleckner |
| 5,045,741 A | 9/1991 | Dvorsky |
| 5,047,682 A | 9/1991 | Burgbacher |
| 5,049,771 A | 9/1991 | Challita et al. |
| 5,081,387 A | 1/1992 | Nystuen |
| 5,091,668 A | 2/1992 | Cuenot et al. |
| 5,130,592 A | 7/1992 | Bitsch et al. |
| 5,140,211 A | 8/1992 | Ucida |
| 5,140,212 A | 8/1992 | Iwasaki et al. |
| 5,157,297 A | 10/1992 | Uchida |
| 5,168,187 A | 12/1992 | Baer et al. |
| 5,191,256 A | 3/1993 | Reiter, Jr. et al. |
| 5,200,662 A | 4/1993 | Tagami et al. |
| 5,204,572 A | 4/1993 | Ferreira |
| 5,212,418 A | 5/1993 | Mason |
| 5,216,308 A | 6/1993 | Meeks |
| 5,233,254 A * | 8/1993 | Fisher et al. .......... 310/216.092 |
| 5,237,229 A | 8/1993 | Ohishi |
| 5,258,677 A | 11/1993 | Mason |
| 5,283,492 A | 2/1994 | Mason |
| 5,300,848 A | 4/1994 | Huss et al. |
| 5,386,161 A | 1/1995 | Sakamoto |
| 5,406,157 A | 4/1995 | New |
| 5,436,518 A | 7/1995 | Kawai |
| 5,463,262 A | 10/1995 | Uchida |
| 5,486,730 A | 1/1996 | Ludwig et al. |
| 5,514,924 A | 5/1996 | McMullen et al. |

| | | |
|---|---|---|
| 5,536,985 A | 7/1996 | Ward et al. |
| 5,610,460 A | 3/1997 | Jacobson et al. |
| 5,627,419 A | 5/1997 | Miller |
| 5,642,009 A | 6/1997 | McCleer et al. |
| 5,674,169 A | 10/1997 | Yang |
| 5,731,641 A | 3/1998 | Botos et al. |
| 5,744,887 A | 4/1998 | Itoh |
| 5,751,086 A | 5/1998 | Taghezout |
| 5,753,989 A | 5/1998 | Syverson et al. |
| 5,767,597 A | 6/1998 | Gondhalekar |
| 5,777,421 A | 7/1998 | Woodward, Jr. |
| 5,780,950 A | 7/1998 | Yang |
| 5,844,345 A | 12/1998 | Hsu |
| 5,955,806 A | 9/1999 | Devenyi |
| 5,955,811 A | 9/1999 | Chiba et al. |
| 5,962,948 A | 10/1999 | Hakala et al. |
| 6,049,148 A | 4/2000 | Nichols et al. |
| 6,057,613 A | 5/2000 | Trago |
| 6,104,115 A | 8/2000 | Offringa et al. |
| 6,114,788 A | 9/2000 | Vuillemin (Muller) et al. |
| 6,157,109 A | 12/2000 | Schiferl et al. |
| 6,177,746 B1 | 1/2001 | Tupper et al. |
| 6,188,159 B1 | 2/2001 | Fan |
| 6,194,797 B1 | 2/2001 | Simon et al. |
| 6,236,124 B1 | 5/2001 | Sekiyama et al. |
| 6,246,146 B1 | 6/2001 | Schiller |
| 6,346,755 B1 | 2/2002 | Tong et al. |
| 6,359,357 B1 | 3/2002 | Blumenstock |
| 6,417,596 B1 | 7/2002 | Schurter et al. |
| 6,437,474 B1 | 8/2002 | Chu |
| 6,455,975 B1 | 9/2002 | Raad et al. |
| 6,492,751 B1 | 12/2002 | Ineson et al. |
| 6,492,753 B2 | 12/2002 | Zepp et al. |
| 6,590,312 B1 | 7/2003 | Seguchi et al. |
| 6,700,280 B1 | 3/2004 | Geiger et al. |
| 6,707,209 B2 | 3/2004 | Crapo et al. |
| 6,707,221 B2 | 3/2004 | Carl |
| 6,720,688 B1 | 4/2004 | Schiller |
| 6,745,972 B2 | 6/2004 | Takano et al. |
| 6,784,582 B1 | 8/2004 | Kolomeitsev et al. |
| 6,844,656 B1 | 1/2005 | Larsen et al. |
| 6,889,419 B2 | 5/2005 | Reiter, Jr. et al. |
| 6,903,471 B2 | 6/2005 | Arimitsu et al. |
| 6,952,064 B2 | 10/2005 | Hiwaki et al. |
| 7,061,152 B2 | 6/2006 | Petro et al. |
| 7,105,974 B2 | 9/2006 | Nashiki |
| 7,135,800 B2 | 11/2006 | Yamada et al. |
| 7,205,693 B2 | 4/2007 | Petro et al. |
| 7,239,058 B2 | 7/2007 | Petro et al. |
| 7,294,948 B2 | 11/2007 | Wasson et al. |
| 7,474,027 B2 | 1/2009 | Kikuchi et al. |
| 7,719,159 B2 | 5/2010 | Petro et al. |
| 7,884,522 B1 | 2/2011 | Petro et al. |
| 7,982,350 B2 | 7/2011 | Burch et al. |
| 8,072,106 B2 | 12/2011 | Petro et al. |
| 8,072,115 B2 | 12/2011 | Burch et al. |
| 2002/0047426 A1 | 4/2002 | Pop, Sr. |
| 2002/0192103 A1 | 12/2002 | Barber et al. |
| 2003/0051614 A1 | 3/2003 | Knoth et al. |
| 2003/0062792 A1 | 4/2003 | Reiter, Jr. et al. |
| 2003/0067236 A1 | 4/2003 | Takahata et al. |
| 2003/0214194 A1 | 11/2003 | Carl, Jr. et al. |
| 2004/0004407 A1 | 1/2004 | Laurent et al. |
| 2004/0119371 A1 | 6/2004 | Laing |
| 2004/0232800 A1 | 11/2004 | Seguchi et al. |
| 2005/0017591 A1 | 1/2005 | Brewster et al. |
| 2005/0088052 A1 | 4/2005 | Ionel et al. |
| 2005/0264118 A1* | 12/2005 | Kascak et al. ............... 310/90.5 |
| 2006/0001328 A1 | 1/2006 | Rau et al. |
| 2006/0028093 A1 | 2/2006 | Minagawa et al. |
| 2006/0087186 A1* | 4/2006 | Wasson et al. ................ 310/114 |
| 2006/0087188 A1* | 4/2006 | Petro et al. ............... 310/156.38 |
| 2006/0131976 A1 | 6/2006 | Kikuchi et al. |
| 2006/0145555 A1* | 7/2006 | Petro et al. ............... 310/156.38 |
| 2006/0152099 A1 | 7/2006 | Petro et al. |
| 2006/0238053 A1 | 10/2006 | Kascak et al. |
| 2007/0075593 A1* | 4/2007 | Petro et al. ...................... 310/12 |
| 2007/0085442 A1* | 4/2007 | Petro et al. .................... 310/233 |
| 2007/0126303 A1* | 6/2007 | Petro et al. ............... 310/156.38 |
| 2007/0205675 A1 | 9/2007 | Petro et al. |
| 2008/0278022 A1* | 11/2008 | Burch et al. ............. 310/156.38 |
| 2012/0228978 A1* | 9/2012 | Petro et al. ............... 310/156.38 |

FOREIGN PATENT DOCUMENTS

| | | |
|---|---|---|
| DE | 3742502 A1 | 12/1987 |
| DE | 4223836 A1 | 1/1994 |
| DE | 19545680 A1 | 12/1995 |
| DE | 19954196 A1 | 11/1999 |
| DE | 10140361 A1 | 3/2003 |
| EP | 0162927 A1 | 12/1985 |
| EP | 0251350 A2 | 1/1986 |
| EP | 0208124 A2 | 1/1987 |
| EP | 0627805 A2 | 12/1994 |
| GB | 960879 | 6/1964 |
| JP | 60-66658 | 4/1985 |
| JP | 63069442 A2 | 3/1988 |
| JP | 63-171145 | 7/1988 |
| JP | 04-026350 | 1/1992 |
| JP | 06-014521 | 1/1994 |
| JP | 06-038415 | 2/1994 |
| JP | 06-141527 | 5/1994 |
| JP | 06-351212 | 12/1994 |
| JP | 07-203643 A | 8/1995 |
| JP | 08-080019 | 3/1996 |
| JP | 08-223832 A | 8/1996 |
| JP | 10-174399 | 6/1998 |
| JP | 10-174400 | 6/1998 |
| JP | 2000-152534 A | 5/2000 |
| JP | 2000-166131 | 6/2000 |
| JP | 2000166131 A2 | 6/2000 |
| JP | 2001-037133 | 2/2001 |
| JP | 2002-165426 A | 6/2002 |
| SU | 1096736 A | 6/1984 |
| WO | WO/93/06645 | 1/1993 |
| WO | 9629774 | 9/1996 |
| WO | 9946187 | 9/1999 |
| WO | 2004004098 A1 | 1/2004 |

OTHER PUBLICATIONS

USPTO Office Action in U.S. Appl. No. 11/707,817 mailed Feb. 9, 2012.

USPTO Office Action in U.S. Appl. No. 11/707/817 mailed Jul. 13, 2011.

USPTO Office Action in U.S. Appl. No. 11/707,817 mailed Apr. 12, 2011.

USPTO Office Action in U.S. Appl. No. 11/707,817 mailed Jan. 31, 2011.

USPTO Office Action in U.S. Appl. No. 11/707,817 mailed Sep. 27, 2010.

USPTO Office Action in U.S. Appl. No. 11/707,817 mailed Apr. 16, 2010.

USPTO Office Action in U.S. Appl. No. 11/707,817 mailed Nov. 5, 2009.

USPTO Office Action in U.S. Appl. No. 11/543,521 mailed Nov. 13, 2008.

USPTO Office Action in U.S. Appl. No. 11/707,285 mailed Aug. 26, 2010.

USPTO Office Action in U.S. Appl. No. 11/707,285 mailed Apr. 1, 2010.

USPTO Office Action in U.S. Appl. No. 12/080,788 mailed Sep. 8, 2010.

USPTO Office Action in U.S. Appl. No. 12/156,789 mailed Feb. 22, 2011.

USPTO Office Action in U.S. Appl. No. 12/156,789 mailed Nov. 17, 2010.

USPTO Office Action in U.S. Appl. No. 12/156,789 mailed Jun. 10, 2010.

USPTO Office Action in U.S. Appl. No. 13/044,513 mailed Dec. 1, 2011.

USPTO Office Action in U.S. Appl. No. 11/255,404 mailed Apr. 2, 2007.

USPTO Office Action in U.S. Appl. No. 11/368,186 mailed Aug. 25, 2006.

USPTO Office Action in U.S. Appl. No. 11/021,417 mailed Mar. 29, 2006.
USPTO Office Action in U.S. Appl. No. 11/021,417 mailed Sep. 29, 2005.

USPTO Office Action in U.S. Appl. No. 11/021,417 mailed Aug. 9, 2005.

* cited by examiner

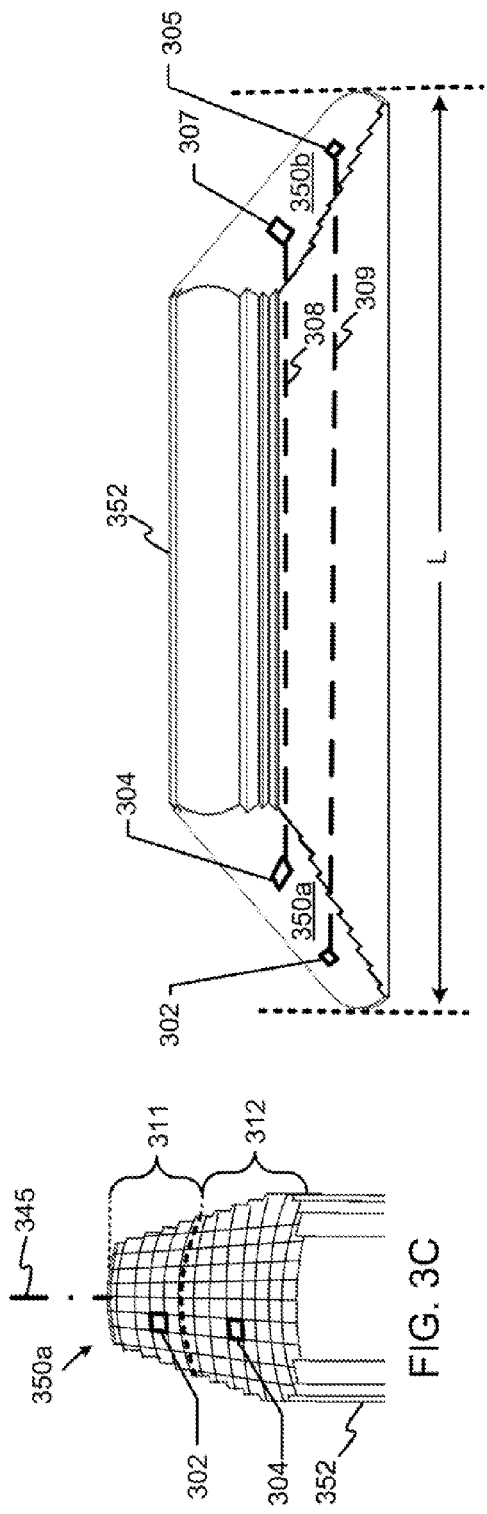
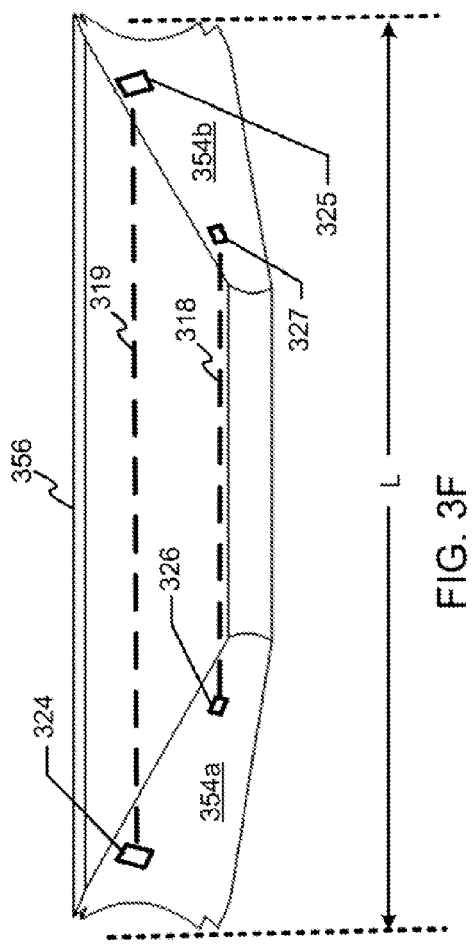
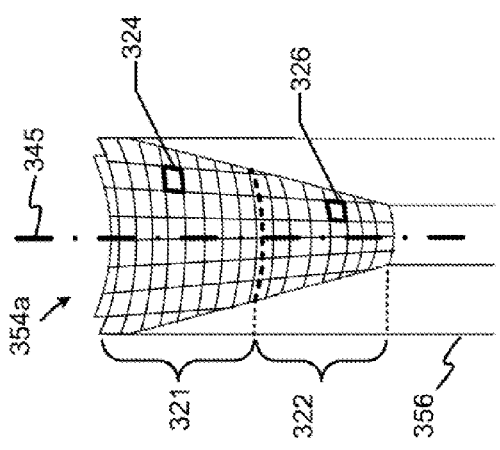

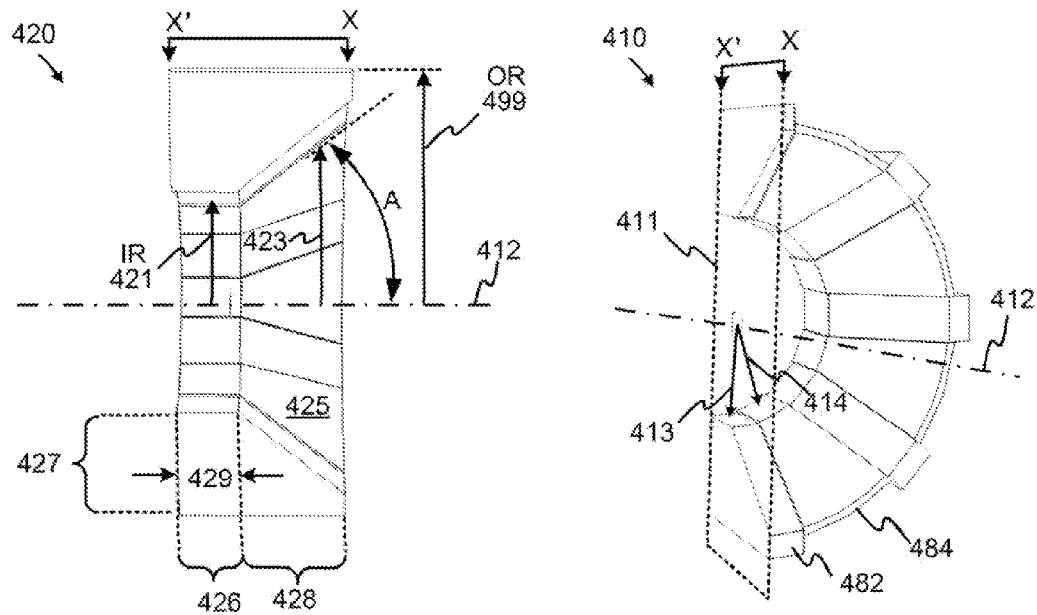
FIG. 4E
FIG. 4F
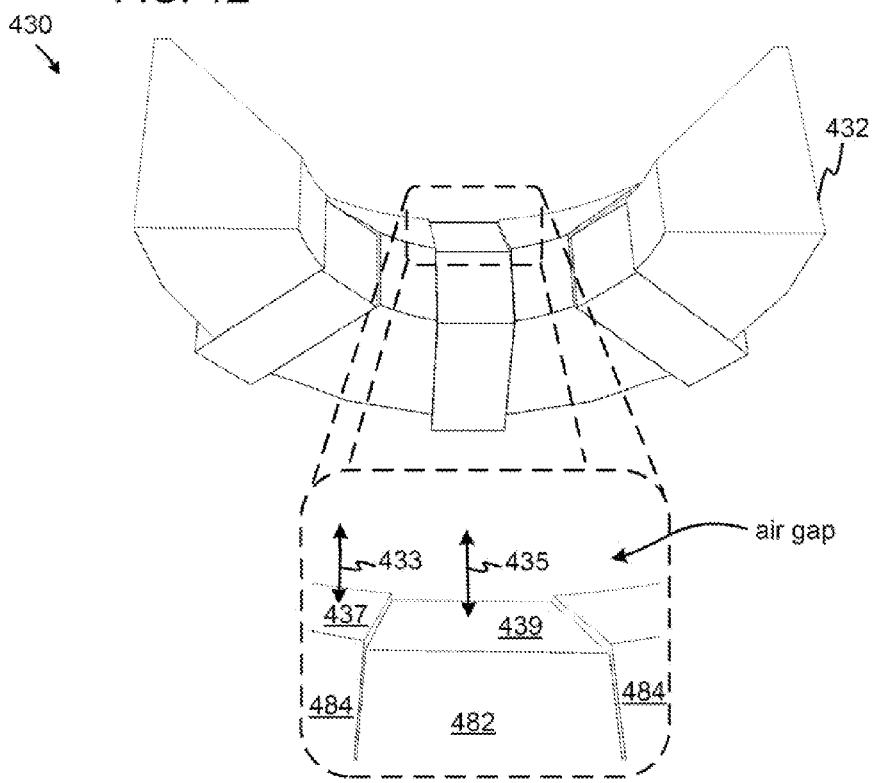
FIG. 4G

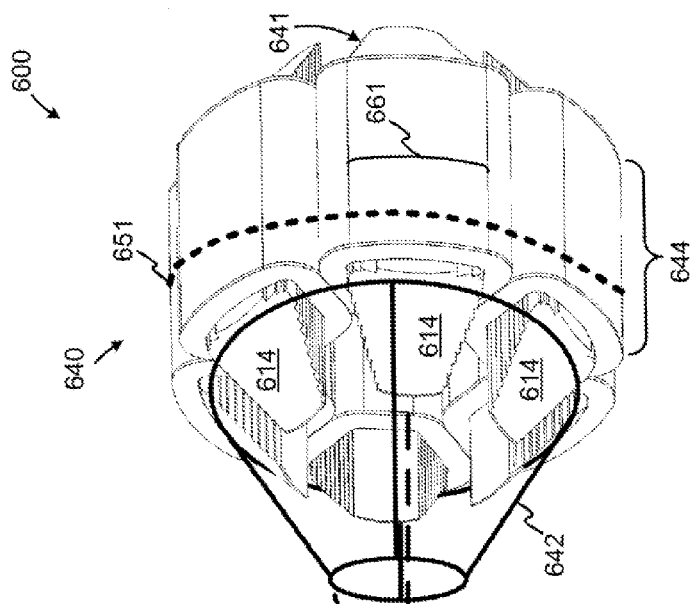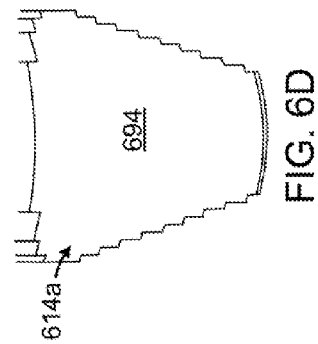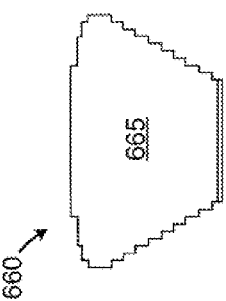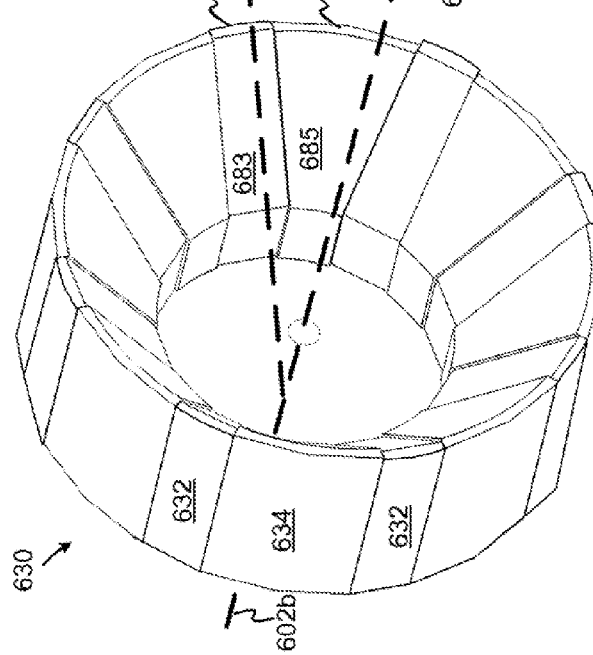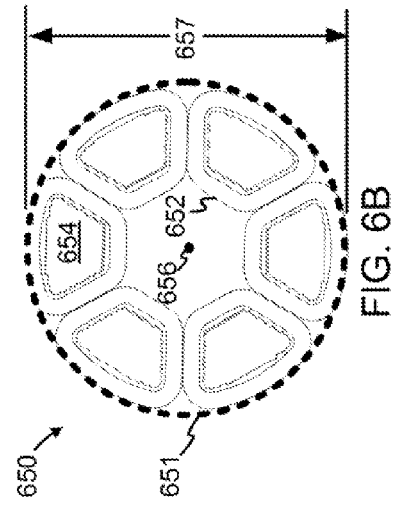

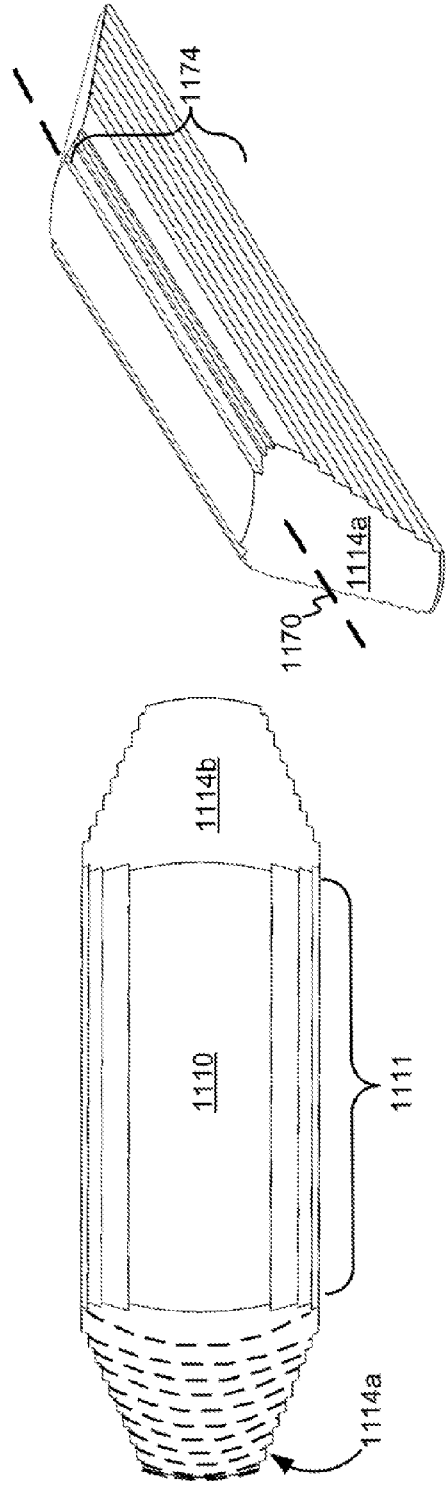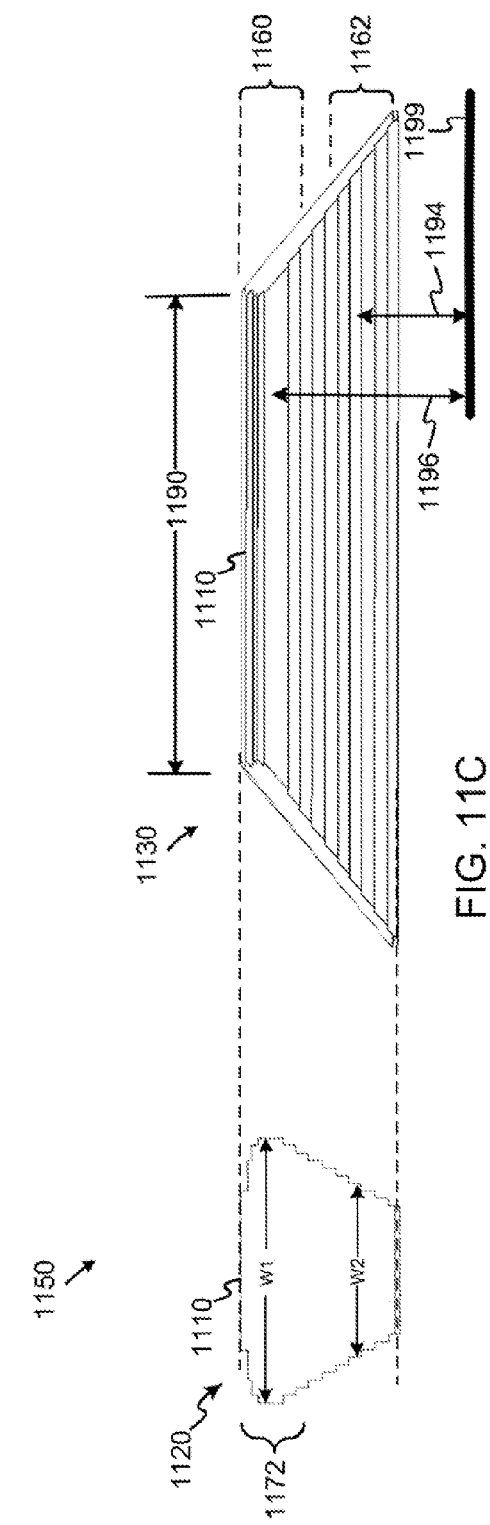

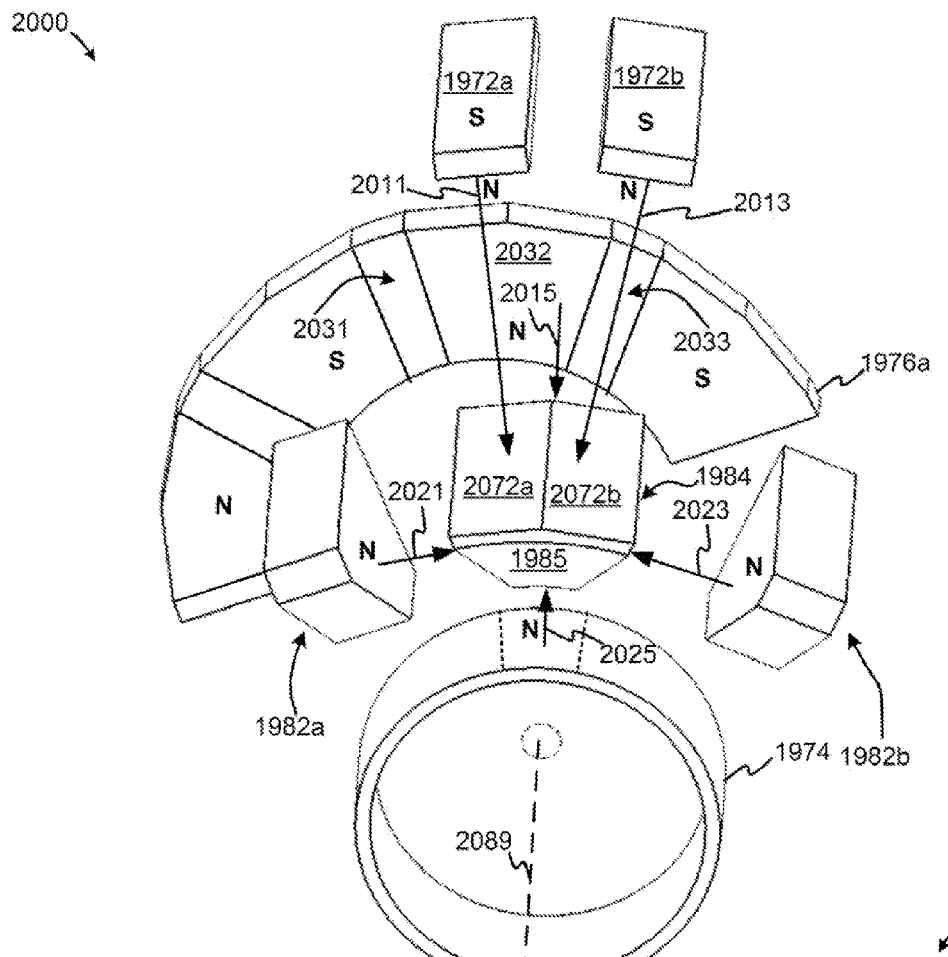
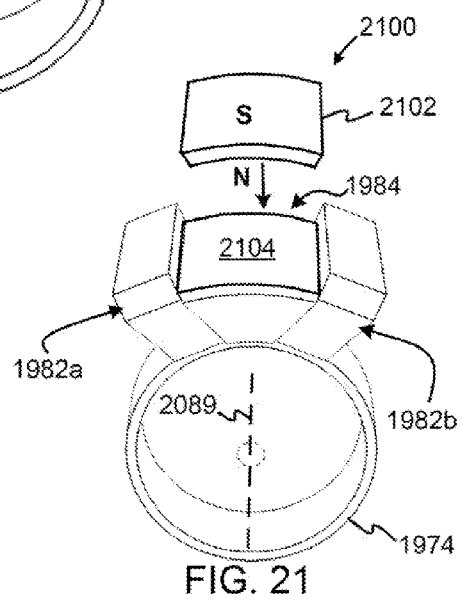
FIG. 20
FIG. 21

ROTOR-STATOR STRUCTURES INCLUDING BOOST MAGNET STRUCTURES FOR MAGNETIC REGIONS HAVING ANGLED CONFRONTING SURFACES IN ROTOR ASSEMBLIES

CROSS-REFERENCE TO RELATED APPLICATIONS

This application is related to U.S. Pat. No. 7,061,152 issued Jun. 13, 2006 entitled "Rotor-Stator Structure for Electrodynamic Machines," U.S. Pat. No. 7,294,948 issued Nov. 13, 2007 entitled "Rotor-Stator Structure for Electrodynamic Machines," U.S. Pat. No. 7,982,350 issued Jul. 19, 2011, entitled "Conical Magnets and Rotor-Stator Structures for Electrodynamic Machines," U.S. patent application Ser. No. 13/044,517, filed Mar. 9, 2011 entitled "Rotor-Stator Structures With an Outer Rotor for Electrodynamic Machines," U.S. patent application Ser. No. 13/044,527, filed Mar. 9, 2011 entitled "Outer Rotor Assemblies for Electrodynamic Machines," and U.S. patent application Ser. No. 13/044,513, filed Mar. 9, 2011 entitled "Rotor-Stator Structures Including Boost Magnet Structures for Magnetic Regions in Rotor Assemblies Disposed External to Boundaries of Conically-Shaped Spaces," all of which are incorporated herein by reference for all purposes.

FIELD

Various embodiments relate generally to electrodynamic machines and the like, and more particularly, to flux enhancement structures and techniques in rotor assemblies and rotor-stator structures for electrodynamic machines, including, but not limited to, outer rotor assemblies.

BACKGROUND

Both motors and generators have been known to use axial-based rotor and stator configurations, which can experience several phenomena during operation. For example, conventional axial motor and generator structures can experience losses, such as eddy current losses or hysteresis losses. Hysteresis loss is the energy required to magnetize and demagnetize magnetic material constituting parts of a motor or generator, whereby hysteresis losses increase as the amount of material increases. An example of a part of a motor that experiences hysteresis losses is "back iron." In some traditional motor designs, such as in some conventional outer rotor configurations for radial motors, stators and their windings typically are located within a region having a smaller diameter about the shaft than the rotor. In some instances, a stator and the windings are located concentrically within a rotor. With the windings located within the interior of at least some conventional outer rotor configurations, heat transfer is generally hindered when the windings are energized. Therefore, resources are needed to ensure sufficient heat dissipation from the stators and their windings.

While traditional motor and generator structures are functional, they have several drawbacks in their implementation. It is desirable to provide improved techniques and structures that minimize one or more of the drawbacks associated with traditional motors and generators.

BRIEF DESCRIPTION OF THE FIGURES

The various embodiments are more fully appreciated in connection with the following detailed description taken in conjunction with the accompanying drawings, in which:

FIGS. 3C to 3D depict an example of a field pole member configured to interoperate with outer rotor assemblies, according to some embodiments;

FIGS. 3E to 3F depict an example of a field pole member configured to interoperate with inner rotor assemblies, according to some embodiments;

FIGS. 4E to 4G depict cross-sectional views of an example of an outer rotor assembly, according to some embodiments;

FIG. 6A depicts an outer rotor assembly and a stator assembly configured to interact with each other, according to some embodiments;

FIGS. 6B to 6C depict cross-sections of field pole members for determining a surface area of a pole face, according to some embodiments;

FIG. 6D illustrates a surface area of a pole face determined as a function of the flux in a coil region and the flux density produced by at least one magnet, the surface area being oriented at angle from a reference line, according to some embodiments;

FIGS. 11A to 11C depict various views of a field pole member, according to some embodiments;

FIG. 20 depicts an exploded, front perspective view of a portion of an outer rotor assembly, according to some embodiments;

FIG. 21 depicts a portion of an exploded, front perspective view of another outer rotor assembly, according to some embodiments;

Like reference numerals refer to corresponding parts throughout the several views of the drawings. Note that in the specification most of the reference numerals include one or two left-most digits that generally identify the figure that first introduces that reference number.

DETAILED DESCRIPTION

Definitions

Figure 1:
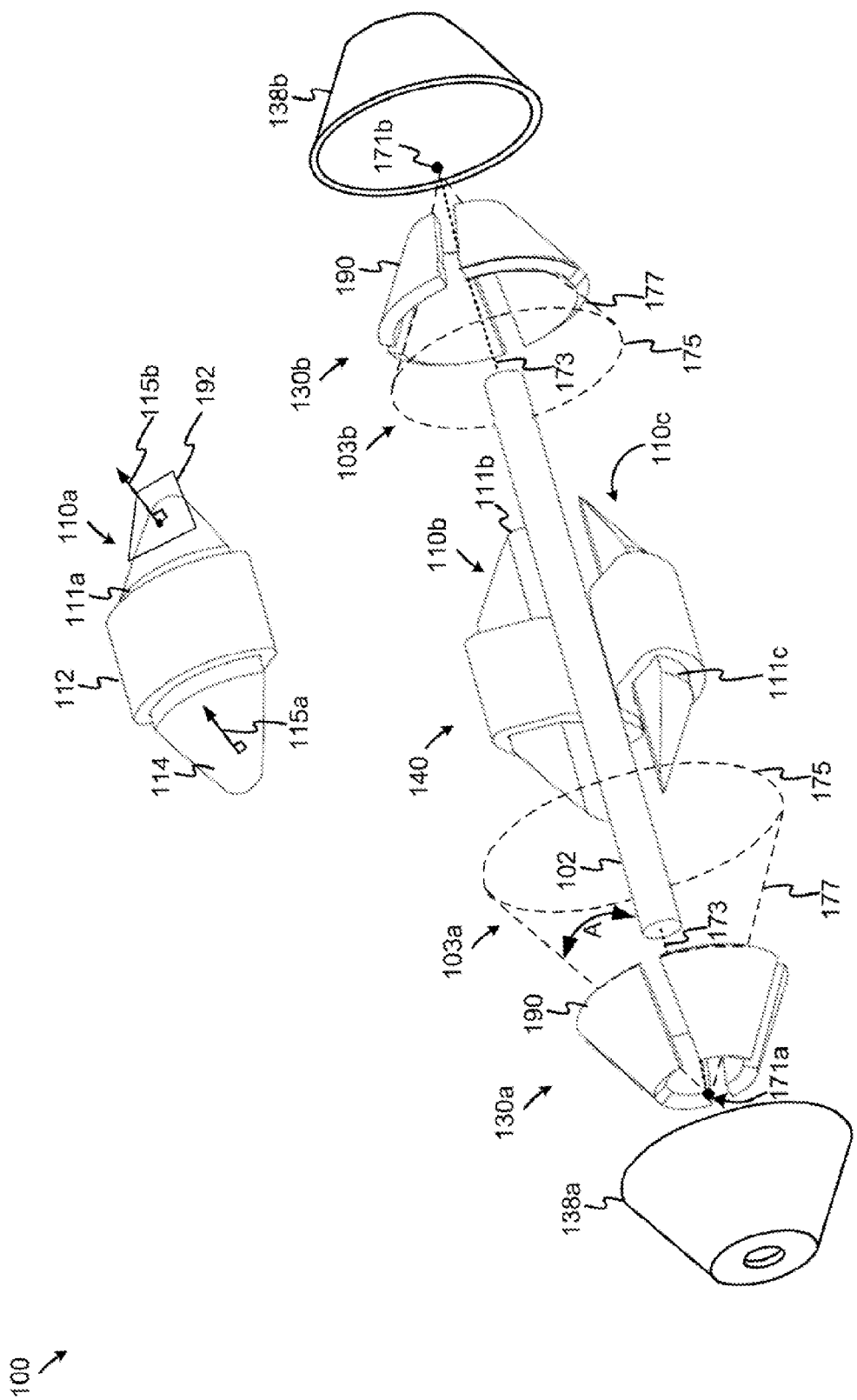
FIG. 1 is an exploded view of a rotor-stator structure including rotor assemblies in accordance with some embodiments.

The following definitions apply to some of the elements described with respect to some embodiments. These definitions may likewise be expanded upon herein.

As used herein, the term "air gap" refers, in at least one embodiment, to a space, or a gap, between a magnet surface and a confronting pole face. Examples of a magnet surface include any surface of magnetic material (e.g., a surface of permanent magnet), a surface of an internal permanent magnet ("IPM"), such as a magnetically permeable material through which flux passes (e.g., the flux being produced by a magnetic material), or any surface or surface portion of a "body that produces a magnetic field." Such a space can be physically described as a volume bounded at least by the areas of the magnet surface and the pole face. An air gap functions to enable relative motion between a rotor and a stator, and to define a flux interaction region. Although an air gap is typically filled with air, it need not be so limiting.

As used herein, the term "back-iron" commonly describes a physical structure (as well as the materials giving rise to that physical structure) that is often used to complete an otherwise open magnetic circuit (e.g., external to a rotor). In particular, back-iron structures are generally used only to transfer magnetic flux from one magnetic circuit element to another, such as either from one magnetically permeable field pole member to another, or from a magnet pole of a first rotor magnet (or first rotor assembly) to a magnet pole of a second rotor magnet (or second rotor assembly), or both, without an intervening ampere-turn generating element, such as coil, between the field pole members or the magnet poles. Furthermore, back-iron structures are not generally formed to accept an associated ampere-turn generating element, such as one or more coils.

As used herein, the term "coil" refers, in at least one embodiment, to an assemblage of successive convolutions of a conductor arranged to inductively couple to a magnetically permeable material to produce magnetic flux. In some embodiments, the term "coil" can be described as a "winding" or a "coil winding." The term "coil" also includes foil coils (i.e., planar-shaped conductors that are relatively flat).

As used herein, the term "coil region" refers generally, in at least one embodiment, to a portion of a field pole member around which a coil is wound.

As used herein, the term "core" refers to, in at least one embodiment, a portion of a field pole member where a coil is normally disposed between pole shoes and is generally composed of a magnetically permeable material for providing a part of a magnetic flux path. The term "core," in at least one embodiment, can refer, in the context of a rotor magnet, including conical magnets, to a structure configured to support magnetic regions. As such, the term core can be interchangeable with the term "hub" in the context of a rotor magnet, such as a conical magnet.

As used herein, the term "field pole member" refers generally, in at least one embodiment, to an element composed of a magnetically permeable material and being configured to provide a structure around which a coil can be wound (i.e., the element is configured to receive a coil for purposes of generating magnetic flux). In particular, a field pole member includes a core (i.e., core region) and at least one pole shoe, each of which is generally located near a respective end of the core. Without more (e.g., without a coil formed on thereon), a field pole member is not configured to generate ampere-turn flux. In some embodiments, the term "field pole member" can be described generally as a "stator-core."

As used herein, the term "active field pole member" refers, in at least one embodiment, to an assemblage of a core, one or more coils, and at least two pole shoes. In particular, an active field pole member can be described as a field pole member assembled with one or more coils for selectably generating ampere-turn flux. In some embodiments, the term "active field pole member" can be described generally as a "stator-core member."

As used herein, the term "ferromagnetic material" refers, in at least one embodiment, to a material that generally exhibits hysteresis phenomena and whose permeability is dependent on the magnetizing force. Also, the term "ferromagnetic material" can also refer to a magnetically permeable material whose relative permeability is greater than unity and depends upon the magnetizing force.

As used herein, the term "field interaction region" refers, in at least one embodiment, to a region where the magnetic flux developed from two or more sources interact vectorially in a manner that can produce mechanical force and/or torque relative to those sources. Generally, the term "flux interaction region" can be used interchangeably with the term "field interaction region." Examples of such sources include field pole members, active field pole members, and/or magnets, or portions thereof. Although a field interaction region is often referred to in rotating machinery parlance as an "air gap," a field interaction region is a broader term that describes a region in which magnetic flux from two or more sources interact vectorially to produce mechanical force and/or torque relative to those sources, and therefore is not limited to the definition of an air gap (i.e., not confined to a volume defined by the areas of the magnet surface and the pole face and planes extending from the peripheries between the two areas). For example, a field interaction region (or at least a portion thereof) can be located internal to a magnet.

As used herein, the term "generator" generally refers, in at least one embodiment, to an electrodynamic machine that is configured to convert mechanical energy into electrical energy regardless of, for example, its output voltage waveform. As an "alternator" can be defined similarly, the term generator includes alternators in its definition.

As used herein, the term "magnet" refers, in at least one embodiment, to a body that produces a magnetic field externally unto itself. As such, the term magnet includes permanent magnets, electromagnets, and the like. The term magnet can also refer to internal permanent magnets ("IPMs"), surface mounted permanent magnets ("SPMs"), and the like.

As used herein, the term "motor" generally refers, in at least one embodiment, to an electrodynamic machine that is configured to convert electrical energy into mechanical energy.

As used herein, the term "magnetically permeable" is a descriptive term that generally refers, in at least one embodiment, to those materials having a magnetically definable relationship between flux density ("B") and applied magnetic field ("H"). Further, the term "magnetically permeable" is intended to be a broad term that includes, without limitation, ferromagnetic materials such as common lamination steels, cold-rolled-grain-oriented (CRGO) steels, powder metals, soft magnetic composites ("SMCs"), and the like.

As used herein, the term "pole face" refers, in at least one embodiment, to a surface of a pole shoe that faces at least a portion of the flux interaction region (as well as the air gap), thereby forming one boundary of the flux interaction region (as well as the air gap). In some embodiments, the term "pole face" can be described generally as including a "flux interaction surface." In one embodiment, the term "pole face" can refer to a "stator surface."

As used herein, the term "pole shoe" refers, in at least one embodiment, to that portion of a field pole member that facilitates positioning a pole face so that it confronts a rotor (or a portion thereof), thereby serving to shape the air gap and control its reluctance. The pole shoes of a field pole member are generally located near one or more ends of the core starting at or near a coil region and terminating at the pole face. In some embodiments, the term "pole shoe" can be described generally as a "stator region."

As used herein, the term "soft magnetic composites" ("SMCs") refers, in at least one embodiment, to those materials that are comprised, in part, of insulated magnetic particles, such as insulation-coated ferrous powder metal materials that can be molded to form an element of the stator structure.

Discussion

FIG. 1 is an exploded view of a rotor-stator structure including rotor assemblies in accordance with some embodiments. Various embodiments relate generally to electrodynamic machines and the like, and more particularly, to rotor assemblies and rotor-stator structures for electrodynamic machines, including, but not limited to, outer rotor assemblies and/or inner rotor assemblies. In some embodiments, a rotor for an electrodynamic machine includes a rotor assembly. FIG. 1 depicts a rotor structure including at least two rotor assemblies 130a and 130b mounted on or affixed to a shaft 102 such that each of rotor assemblies 130a and 130b are disposed on an axis of rotation that can be defined by, for example, shaft 102. A stator assembly 140 can include active field pole members arranged about the axis, such as active field pole members 110a, 110b, and 110c, and can have pole faces, such as pole face 114, formed at the ends of respective field pole members 111a, 111b, 111c. Active field pole members include a coil 112. A subset of pole faces 114 of active field pole members 110a, 110b, and 110c can be positioned to confront the arrangement of magnetic regions 190 in rotor assembly 130a to establish air gaps. Note that a subset of pole faces 114 can be disposed internally to a conically-shaped boundary 103, such as either conically-shaped boundary 103a or conically-shaped boundary 103b. For example, the subset of pole faces 114 can be disposed at, within, or adjacent to at least one of boundaries 103a or 103b to form conically-shaped spaces. Either of boundaries 103a or 103b can circumscribe or substantially circumscribe a subset of pole faces 114 and can be substantially coextensive with one or more air gaps. For example, the term "substantially circumscribe" can refer to a boundary portion of conically-shaped space that encloses surface portions of the subset of pole faces 114. As shown, at least one of boundaries 103a and 103b form a conically-shaped space and can be oriented at an angle A from the axis of rotation 173, which can be coextensive with shaft 102. As shown, boundary 103a is at an angle A and extends from an apex 171a on axis of rotation 173 in a direction toward apex 171b, which is the apex of a conically-shaped boundary 103b. As shown, conically-shaped boundaries 103a and 103b each include a base 175 (e.g., perpendicular to shaft 102) and a lateral surface 177. Lateral surfaces 177 can be coextensive with conically-shaped boundary 103a and 103b to form conically-shaped spaces. Note that while conically-shaped boundary 103a and conically-shaped boundary 103b each is depicted as including base 175, conically-shaped boundary 103a and conically-shaped boundary 103b can extend (e.g., conceptually) to relatively larger distances such that bases 175 need not be present. Thus, conically-shaped boundary 103a can extend to encapsulate apex 171b and conically-shaped boundary 103b can extend to encapsulate apex 171a. Note, too, that in some embodiments, at least a portion of pole face 114 can include a surface (e.g., a curved surface) oriented in a direction away from an axis of rotation. The direction can be represented by a ray 115a as a normal vector extending from a point on a plane that is, for example, tangent to the portion of pole face 114. Ray 115a extends from the portion of pole face 114 in a direction away from the axis of rotation and shaft 102. Note that ray 115a can lie in a plane that includes the axis of rotation. Similarly, ray 115b can extend from the other pole face outwardly, whereby ray 115b can represent a normal vector oriented with respect to a tangent plane 192.

Each rotor assembly can include an arrangement of magnetic regions 190. Magnetic region 190 (or a portion thereof) can constitute a magnet pole for rotor assembly 130a or rotor assembly 130b, according to some embodiments. In one or more embodiments, at least one magnetic region 190 has a surface (or a portion thereof) that is coextensive (or is substantially coextensive) to one or more angles with respect to the axis of rotation or shaft 102. In the example shown, one or more magnetic regions 190 of rotor assembly 130a can be disposed externally to a portion of a conically-shaped space (e.g., a conically-shaped space associated with either conically-shaped boundary 103a or conically-shaped boundary 103b) that is centered on the axis of rotation. In some embodiments, the arrangement of magnetic regions 190 can be mounted on, affixed to, or otherwise constrained by a support structure, such as either support structure 138a or support structure 138b. Support structures 138a and 138b are configured to support magnetic regions 190 in compression against a radial force generated by the rotation of rotor assemblies 130a and 130b around the axis of rotation. In at least some cases, support structures 138a and 138b also can provide paths for flux. For example, support structures 138a and 138b can include magnetically permeable material to complete flux paths between poles (e.g., magnetic regions and/or magnets) of rotor assemblies 130a and 130b. Note that support structures 138a or 138b need not be limited to the example shown and can be of any varied structure having any varied shapes and/or varied functionality that can function to at least support magnetic regions 190 in compression during rotation. Magnetic regions 190 can be formed from magnetic material (e.g., permanent magnets) or magnetically permeable material, or a combination thereof, but is not limited those structures. In some embodiments, magnetic regions 190 of FIG. 1 can be representative of surface magnets used to form the poles (e.g., the magnet poles) of rotor assemblies 130a and 130b, whereby one or more surface magnets can be formed, for example, using magnetic material and/or one or more magnets (e.g., permanent magnets), or other equivalent materials. In some embodiments, the term "magnetic material" can be used to refer to a structure and/or a composition that produces a magnetic field (e.g., a magnet, such as a permanent magnet). In various embodiments, magnetic regions 190 of FIG. 1 can be representative of one or more internal permanent magnets ("IPMs") (or portions thereof) that are used to form the poles of rotor assemblies 130a and 130b, whereby one or more internal permanent magnets can be formed, for example, using magnetic material (e.g., using one or more magnets, such as permanent magnets) and magnetically permeable material, or other equivalent materials. According to at least some embodiments, the term "internal permanent magnet" ("IPM") can refer to a structure (or any surface or surface portion thereof) that produces a magnetic field, an IPM (or portion thereof) including a magnetic material and a magnetically permeable material through which flux passes (e.g., at least a portion of the flux being produced by the magnetic material). In various embodiments, magnetic material of a magnetic region 190 can be covered by magnetically permeable material, such that the magnetically permeable material is disposed between the surfaces (or portions thereof) of magnetic region 190 and respective air gaps and/or pole faces. In at least some cases, the term "internal permanent magnet" ("IPM") can be used interchangeably with the term "interior permanent magnet." While the rotor-stator structure of FIG. 1 is shown to include three field pole members and four magnetic regions, a rotor-stator structure according to various embodiments need not be so limited and can include any number of field pole members and any number of magnetic regions. For example, a rotor-stator structure can include six field pole members and eight magnetic regions.

As used herein, the term "rotor assembly" can refer to, at least in some embodiments, to either an outer rotor assembly or an inner rotor assembly, or a combination thereof. A rotor assembly can include a surface portion that is coextensive with a cone or a boundary of a conically-shaped space, and can include magnetic material and, optionally, magnetically permeable material as well as other materials, which can also be optional. Therefore, a surface portion of a rotor assembly can be either coextensive with an interior surface or an exterior surface of a cone. An outer rotor assembly includes magnetic regions 190 disposed "outside" the boundaries of the pole faces relative to the axis of rotation. Rotor assemblies 130a and 130b are "outer rotor assemblies" as magnetic regions 190 are disposed or arranged externally to or outside a boundary 103 of a conically-shaped space, whereas pole faces 114 are located within boundary 103 of the conically-shaped space (i.e., portions of magnetic regions 190 are coextensive with an exterior surface of a cone, whereas portions of pole faces 114 are coextensive with an interior surface of a cone). As such, a point on the surface of magnetic region 190 is at a greater radial distance from the axis of rotation than a point on pole face 114, where both points lie in a plane perpendicular to the axis of rotation. An outer rotor assembly can refer to and/or include an outer rotor magnet, according to at least some embodiments. Further, note that the term "rotor assembly" can be used interchangeably with the term "rotor magnet," according to some embodiments.

Figure 16:
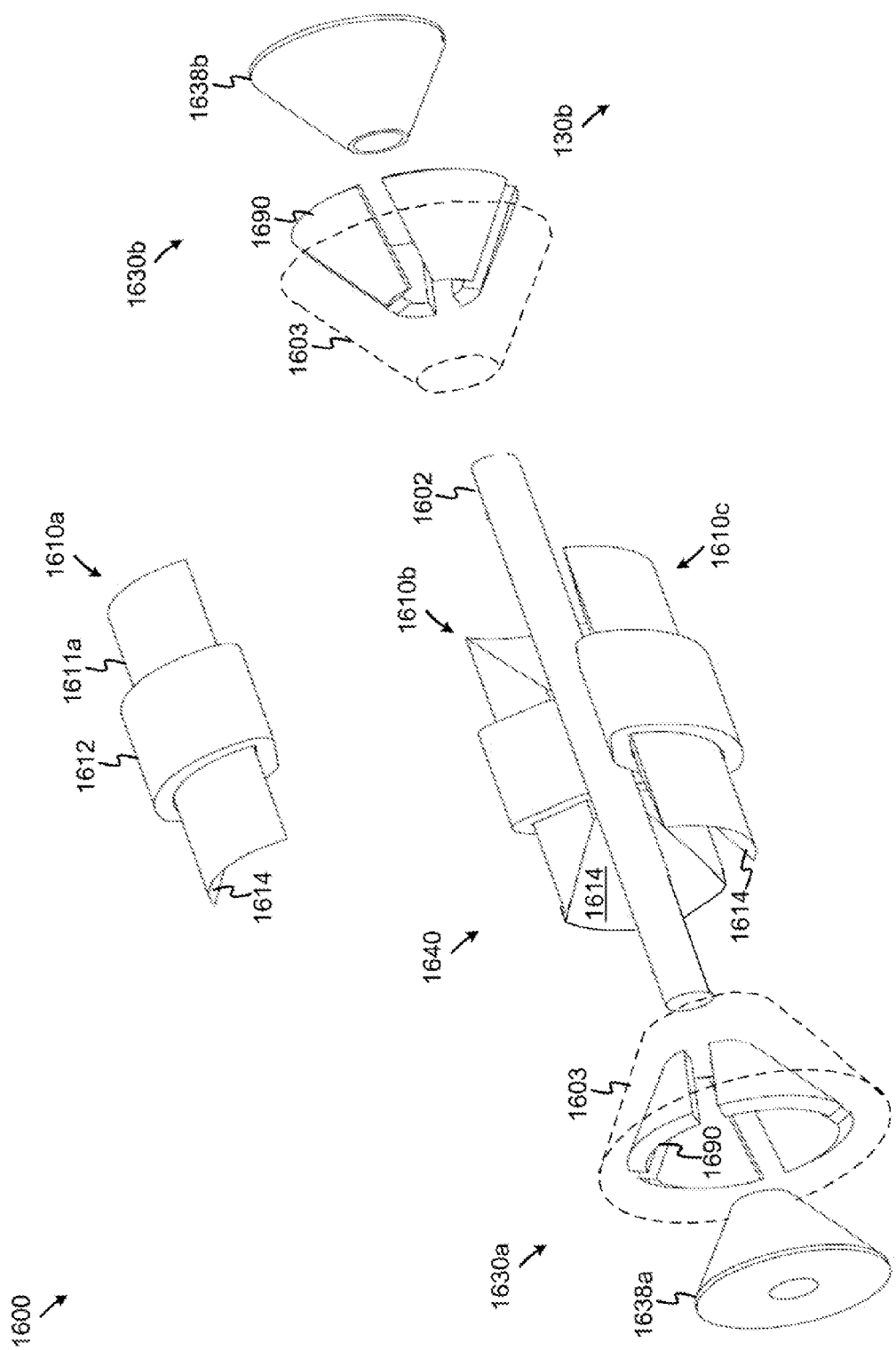
FIG. 16 is an exploded view of a rotor-stator structure including inner rotor assemblies in accordance with some embodiments.

The term "inner rotor assembly" can refer to, at least in some embodiments, portions of rotor structures in which magnetic regions are disposed internally to or "inside" a boundary of a conically-shaped space, whereas the pole faces are located externally to or outside the boundary of conically-shaped space. As such, a point on the surface of the magnetic region is at a smaller radial distance from the axis of rotation than a point on a pole face, where both points lie in a plane perpendicular to the axis of rotation. An inner rotor assembly can refer to and/or include an inner rotor magnet, according to at least some embodiments. To illustrate, FIG. 16 depicts boundaries 1603 of conically-shaped spaces in which magnetic regions 1690 are disposed. Pole faces 1614 are disposed or arranged outside boundaries 1603 of conically-shaped spaces. Thus, magnetic regions 1690 are coextensive with an interior surface of a cone, whereas pole faces 1614 are coextensive with an exterior surface of a cone). In some embodiments, the term "inner rotor assembly" can refer to either an "inner rotor magnet" or a "conical magnet" or a "conical magnet structure." An example of the structure of a conical magnet can include an assembly of magnet components including, but not limited to, magnetic regions and/or magnetic material and a support structure. In some instances, the support structure for an inner rotor assembly or conical magnet can be referred to as a "hub," or, in some cases, a "core." In at least some embodiments, the term "inner rotor assembly" can be used interchangeably with the terms "conical magnet" and "conical magnet structure." In at least one embodiment, the term "inner rotor assembly" can refer, but are not limited to, at least some of the magnets described in U.S. Pat. No. 7,061,152 and/or U.S. Pat. No. 7,294,948 B2. According to a specific embodiment, a rotor assembly can also refer to an outer rotor assembly combined with an inner rotor assembly.

In view of the foregoing, the structures and/or functionalities of an outer rotor assembly-based motor can, among other things, enhance torque generation and reduce the consumption of manufacturing resources. Mass in an outer rotor assembly is at a greater radial distance than an inner rotor assembly, thereby providing increased inertia and torque for certain applications. Again, support structures 138 can be also configured to support magnetic region and associated structures in compression against radial forces during rotation, thereby enabling optimal tolerances for the dimensions of the air gap formed between pole faces and magnetic regions. In particular, rotational forces tend to urge the surfaces of magnetic regions 190 away from the surfaces of the pole face surfaces, thereby facilitating air gap thicknesses that otherwise may not be available. As such, outer rotor assemblies can be used in relatively high speed applications (i.e., applications in which high rotational rates are used), such as in electric vehicles. In some embodiments, a rotor assembly, as described herein, has magnetic material (e.g., magnets, such as permanent magnet structures) having surfaces that are polarized in a direction such that flux interacts via at least one side of a magnetically permeable material. For example the direction of polarization of the magnetic material can be orthogonal or substantially orthogonal to a line or a line portion extending axially between two pole faces of a field pole member. The line or the line portion extending axially between the two pole faces of the field pole member can be oriented parallel to an axis of rotation. As such, the surface area of the magnetic region can be configured to be less than the combined surfaces areas of the magnetic material. For example, the combined surface areas of the magnetic material surfaces adjacent to the magnetically permeable material can be greater than the surface area of the magnetically permeable material that confronts the pole faces. Therefore, the amount of flux passing between the surface of the magnetically permeable material and a pole face can be modified (e.g., enhanced) as a function, for example, of the size of the surfaces area(s) of the magnetic material and/or the surface area(s) of the sides of magnetically permeable material. Also, the type of magnetic material (e.g., ceramic, rare earth, such as neodymium and samarium cobalt, etc.) can be selected to modify the amount of flux passing through a magnetic region. Accordingly, the angle of the conically-shaped space can be modified (e.g., to a steeper angle, from 45 degrees to 60 degrees relative to the axis of rotation) to form a modified angle. The modified angle relative to an axis of rotation can serve to define the orientation of either an angled surface (e.g., a conical surface) of magnetic region or a pole face, or both. With the modified angle, the rotor-stator structure can be shortened, which, in turn, conserves manufacturing materials (i.e., increasing the angle to a steeper angle, the field pole members of a stator assembly can be shortened). The angle of the conically-shaped space can be modified also to enable the use of less powerful magnets (e.g., ceramic-based magnets, such as ceramic ferrite magnets). For example, decreasing the angle from a relatively steep angle (e.g., 65 degrees) to a more shallow angle (e.g., 40 degrees), less powerful magnets can be used as the surface area of the magnets or magnetic regions can be increased to provide a desired flux concentration. Therefore, neodymium-based magnets can be replaced with ceramic-based magnets. In sum, the modified angle can be a function of one or more of the following: (i.) the type of magnet material, (ii.) the surface area of the magnet material, (iii.) the surface area of magnetically permeable material, (iv.) the surface area of the magnetic region, and (v.) the surface area of a pole face. In some embodiments, the modified angle can be a non-orthogonal angle. Examples of non-orthogonal angles include those between 0 degrees and 90 degrees (e.g., excluding both 0 degrees and 90 degrees), as well as non-orthogonal angles between 90 degrees and 180 degrees (e.g., excluding both 90 degrees and 180 degrees). Any of these aforementioned non-orthogonal angles can describe the orientation of pole face and magnetic regions for either outer rotor assemblies or inner rotor assemblies, or both.

Note that in some embodiments, boost magnets can be implemented to enhance the amount of flux passing between a magnetic region and a pole face, whereby the enhancement to the amount of flux by one or more boost magnets can influence the angle and/or surface areas of the magnetic region or the pole face. Boost magnets can include magnetic material disposed on non-confronting surfaces of magnetic permeable material that are oriented off of a principal flux path. Boost magnets can include axial and radial boost magnets, examples of which are shown in FIG. 18C and subsequent figures. Therefore, the modified angle can also be a function of the characteristics of boost magnets. For example, the type of magnet material constituting the boost magnets, the surface area of the boost magnets, and the surface area of magnetically permeable material adjacent to the boost magnets can influence or modify the amount of flux passing through a magnetic region.

In various embodiments, the angle of the conically-shaped space can be modified to determine an angle that provides for an optimal surface area of a pole face through which flux passes, the flux being at least a function of the magnetic material (e.g., ceramic versus neodymium). In one approach, the modified angle can be determined by the following. First, an amount of flux in a coil region of an active field pole member can be determined, the amount of flux producing a desired value of torque. A magnet material to produce a flux density at an air gap formed between a surface of the magnet material and a pole face of the active field pole member can be selected. Then, the surface area of the pole face can be calculated based on the flux in the coil region and the flux density of the magnet material, the surface area providing for the flux density. Then, the pole face (and the angle of the conically-shaped space) can be oriented at a non-orthogonal angle to the axis of rotation to establish the surface area for the pole face. In some embodiments, the magnets of a rotor assembly can include an axial extension area that can be configured to increase an amount of flux passing through the surface of the magnetically permeable structure by, for example, modifying the area dimension laying in planes common to the axis of rotation.

A stator assembly, according to some embodiments, can use field pole members that can use less material to manufacture than field pole members configured for other motors. Further, a field pole member for an outer rotor assembly-based rotor-stator structure can have wider and shorter laminations at distances farther from the axis of rotation than other laminations located at distances closer to the axis of rotation. In turn, flux passing through the field pole member is more uniformly distributed and is less likely to have high flux densities at certain portions of the field pole member. In some embodiments, the structure of field pole member can be shorter than in other motors, as there can be greater amounts of available surface area of magnetically permeable material in the rotor of the rotor-stator structure. The available surface area of magnetically permeable material presents opportunities to enhance the flux concentration by way of the use of magnetic material located adjacent to the available surface area. In turn, the enhanced flux concentration facilitates the use of pole faces that are coincident with a steeper angle relative to an axis of rotation. Steeper-angled pole faces can provide for shorter field pole member lengths and, thus, shorter motor lengths relative to pole faces coincident with less steep angles. According to some embodiments, a field pole member can be configured as an outwardly-facing field pole member having a pole face oriented in a direction away from an axis of rotation. Such a pole face can have a convex-like surface, but need not be so limited (e.g., a pole face can be relatively flat in rotor-stator structures implementing one or more outer rotors). This structure provides for flux paths through the field pole member that, on average, are shorter than found in other stator assemblies of comparable length along an axis of rotation. Consider that the surface area of an outwardly-facing pole face can be composed (conceptually) of a number of unit areas of comparable size, whereby a total flux passing through a pole face passes into a greater quantity of unit areas associated with relatively shorter flux path lengths than in other stator assemblies. With flux passing over relatively shorter flux paths, the flux passes through less material than otherwise might be the case. Therefore, losses, such as eddy current losses, are less than other stator assemblies that might have flux paths that, on average, are longer than those associated with the outwardly-facing field pole member (having a similar axial length). Further, an outwardly-facing field pole member can have less surface area (e.g., between the coils and pole faces) adjacent a perimeter of a stator assembly than other stator assemblies. Therefore, an outwardly-facing field pole member can have fewer magnetic linkage paths that extend through a motor case, thereby reducing losses and eddy currents that otherwise might be generated in the motor case.

Figure 2A:
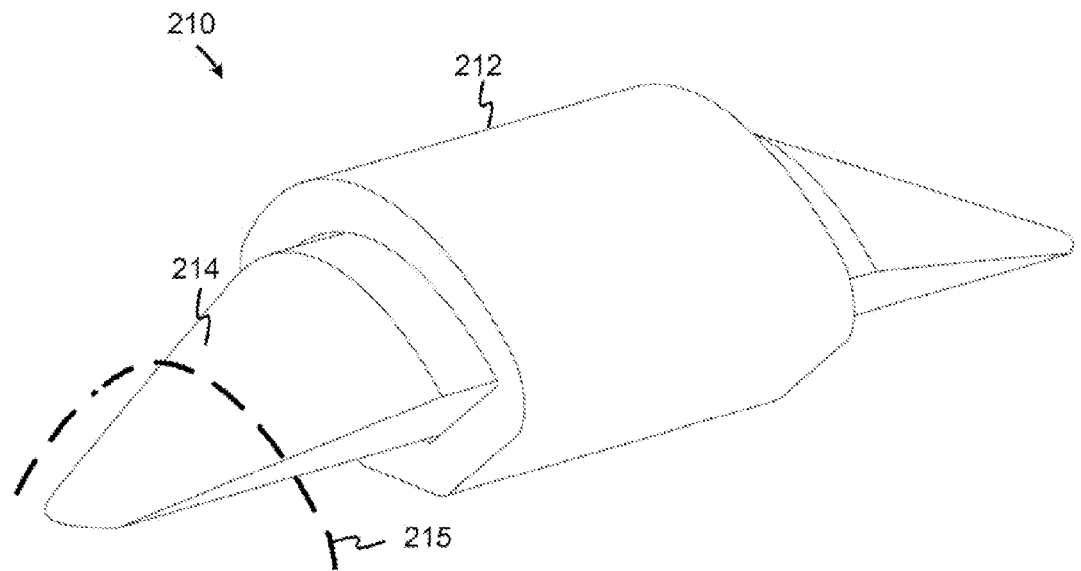
FIGS. 2A and 2B depict a pole face and a magnetic region each configured to form an air gap with the other, according to some embodiments.
Figure 2B:
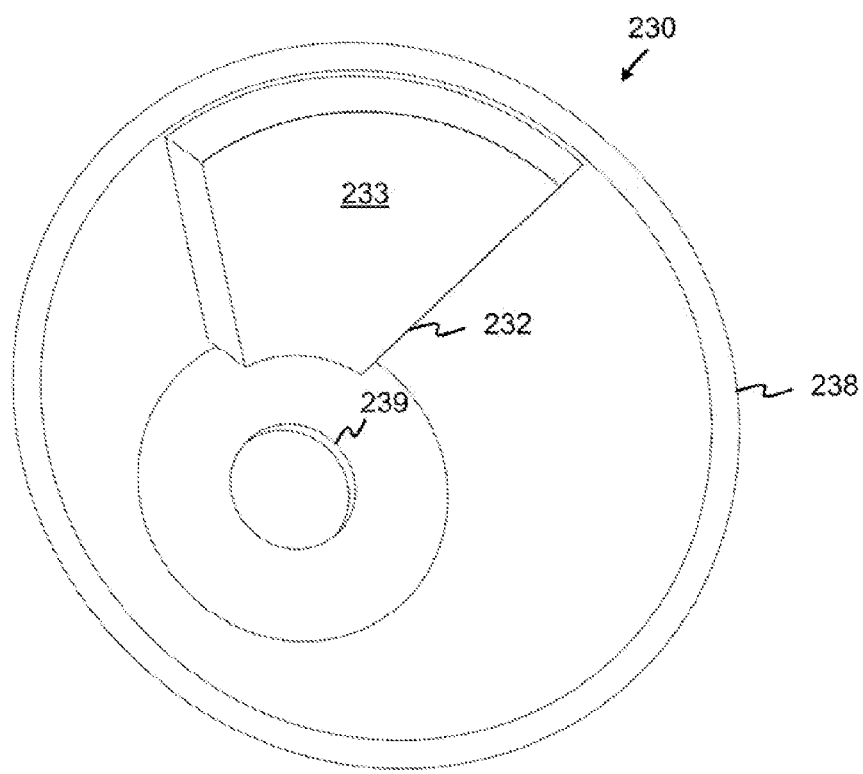

FIGS. 2A and 2B depict a pole face and a magnetic region, respectively, each being configured to form an air gap with the other, according to some embodiments. FIG. 2A depicts a pole face 214 being formed as one of two pole faces for an active field pole member 210, which also includes a coil 212. Pole face 214 can have a surface (or a portion thereof) that is curved or rounded outward from the interior of active field pole member 210. In some examples, at least a portion of pole face 214 has a curved surface that is coextensive with one or more arcs 215 radially disposed (e.g., at one or more radial distances) from the axis of rotation, and/or is coextensive with either an interior surface (or an exterior surface) of a cone. Although the field pole member of active field pole member 210 can be composed of a contiguous piece of magnetically permeable material (e.g., a piece formed by a metal injection molding process, forging, casting or any other method of manufacture), the field pole members described herein can also be composed of multiple pieces, such as laminations, wires, or any other flux conductors. Therefore, active field pole member 210 can be formed as a stacked field pole member composed of a number of laminations integrated together.

FIG. 2B depicts a magnetic region 232 including a magnet surface 233 being formed as one of a number of magnetic regions (not shown) that constitute a rotor assembly 230. As shown, rotor assembly 230 includes a support structure 238 for supporting magnetic region 232, among other things, to position magnetic region 232 at a distance from pole face 214 of FIG. 2A to establish an air gap. Support structure 238 can be also configured to support magnetic region 232 in compression against radial forces during rotation, thereby enabling optimal tolerances for the dimensions of the air gap formed between pole face 214 and magnetic region 232. Support structure 238 includes an opening 239 at which rotor assembly 230 can be mounted to a shaft. In some embodiments, support structure 238 can provide a flux path (e.g., a return path) to magnetically couple magnetic region 232 to another magnetic region not shown. At least a portion of surface 233 can be coextensive (or substantially coextensive) to an angle with respect to the axis of rotation (or shaft 102 of FIG. 1) passing through opening 239. While surface 233 of magnetic region 232 is depicted as a single, curved surface, this depiction is not intended to be limiting. In some embodiments, surface 233 of magnetic region 232 can include surfaces of multiple magnets (not shown) that are configured to approximate a curved surface that is substantially coextensive with one or more angles with the axis of rotation, the curved surface being configured to confront a pole face. The multiple magnets can include relatively flat surface magnets, or can include magnets having any type of surface shape.

Figure 3A:
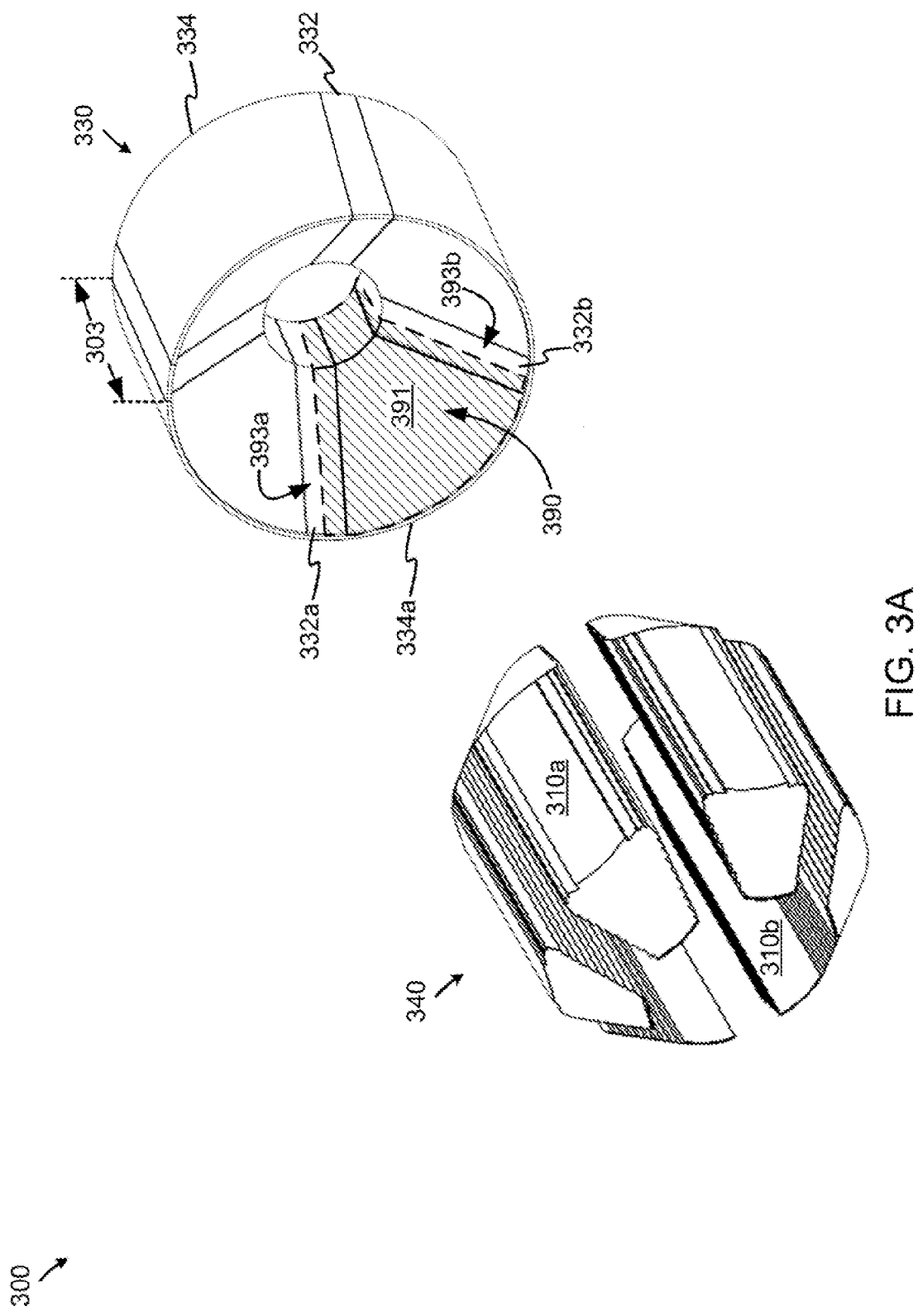
FIGS. 3A and 3B depict examples of outer rotor assemblies, according to some embodiments.
Figure 3B:
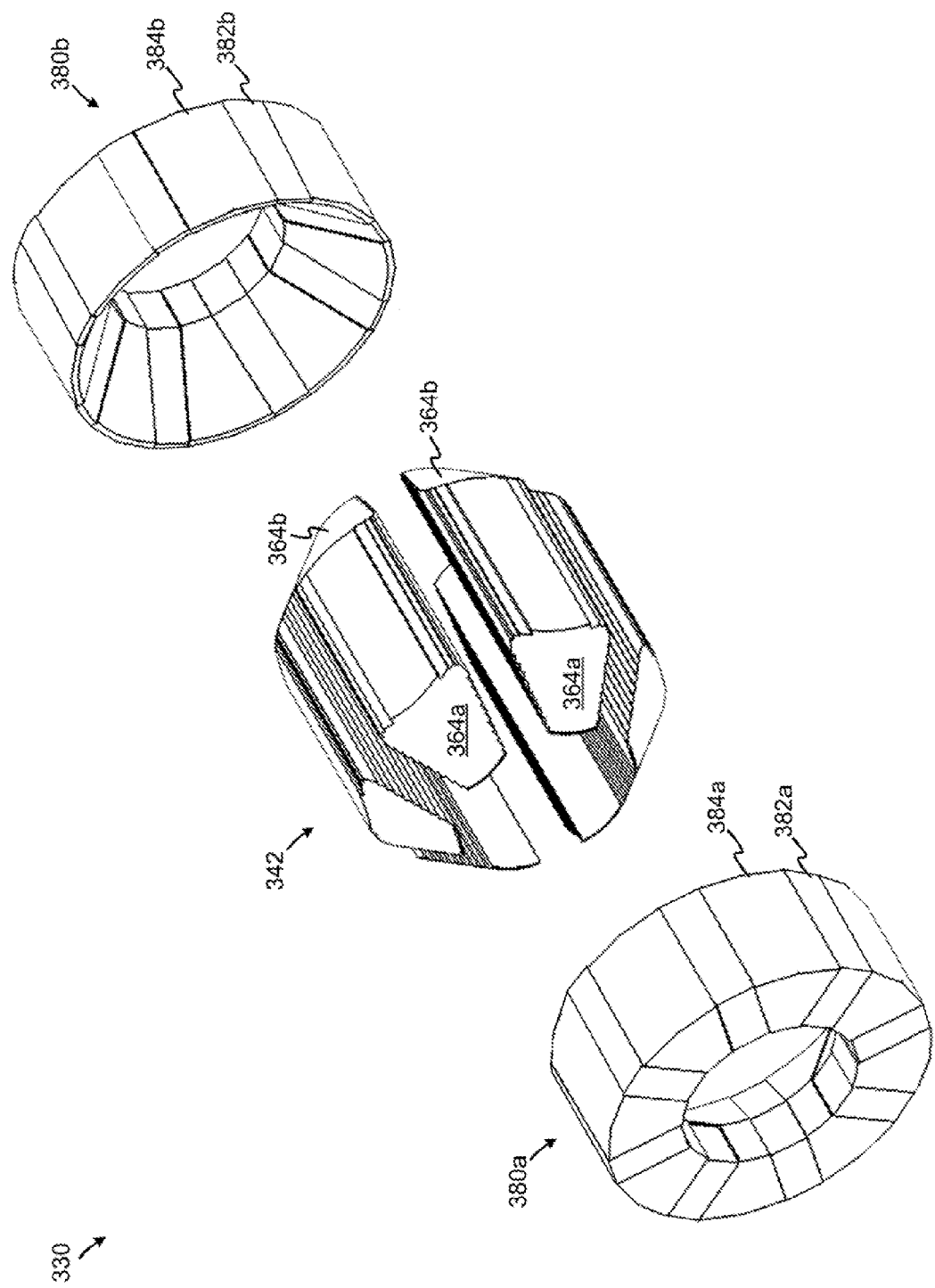

FIGS. 3A and 3B depict examples of outer rotor assemblies, according to some embodiments. FIG. 3A is a diagram 300 depicting a stator assembly 340 that includes a number of field pole members, such as field pole members 310a and 310b, and outer rotor assembly 330. In the example shown, outer rotor assembly 330 includes an arrangement of internal permanent magnet ("IPM") structures. In this example, the radial edges of magnetic region 390 are shown to be approximately half (i.e., ½) the width (e.g., peripheral width) of surfaces 393a and 393b of respective structures of magnetic material 332a and 332b that confront the stator assembly. Thus, the surface of magnetic region 390 can include a surface of a magnetically permeable structure and surface portions of magnetic material 332a and 332b. For example, outer rotor assembly 330 can include structures (e.g., magnets) including magnetic material 332, and magnetically permeable structures 334. Thus, outer rotor assembly 330 includes an arrangement of magnetic regions 390 configured to confront a subset of pole faces of stator assembly 340, whereby at least one magnetic region 390 includes a magnet 332a (or a portion thereof), a magnetically permeable structure 334a, and a magnet 332b (or a portion thereof). Note that a magnetic region is not limited to the example shown nor is limited to structures herein. For example, a magnetic region can include one magnet and one magnetically permeable structure. In other embodiments, a magnetic region can include any number of magnets and any number of magnetically permeable structures. Further, the term "magnetic region" can refer to the combination of magnets and magnetically permeable structures (e.g., used to form a magnet pole), or the combination of structures including magnetic material and magnetically permeable material. In some cases, a magnetic region can refer to those surfaces constituting a pole, or can refer to those surfaces or structures used to generate a pole, or both. A magnetic region can also be referred to as the surface of a magnetically permeable structure, and may or may not include surfaces 393a and 393b of magnetic material 332a and 332b or respective magnets. Thus, the surface of a magnetic region can be coextensive with the surface of 334a confronting stator assembly 340. In at least one embodiment, magnetic material 332 has an axial length dimension 303 that is configurable to modify an amount of flux density passing through a surface of a magnetically permeable structure, such as through surface 391 of magnetically permeable structure 334a. In some embodiments, structures of magnetic material 332a and 332b are polarized to produce magnet flux circumferentially within outer rotor assembly 330 about an axis of rotation (not shown).

FIG. 3B is a diagram 330 depicting a rotor-stator structure including an outer rotor assembly 380a, a group 342 of field pole members, and an outer rotor assembly 380b. Outer rotor assembly 380a includes magnetic material 382a and magnetically permeable structures 384a, whereas outer rotor assembly 380b includes magnetic material 382b and magnetically permeable structures 384b. A first subset of pole faces 364a are configured to confront surfaces of magnetic material 382a and magnetic permeable structures 384a, and a second subset of pole faces 364b are configured to confront surfaces of magnetic material 382b and magnetic permeable structures 384b.

FIGS. 3C to 3D depict an example of a field pole member configured to interoperate with outer rotor assemblies, according to some embodiments. As shown, FIGS. 3C and 3D depict field pole member 352 being an outwardly-facing field pole member with a pole face being oriented in a direction away from an axis of rotation 345. A pole face 350a is shown to include—at least conceptually—a number of unit areas each associated with a length (e.g., a length of a flux path or portion thereof) between pole faces 350a and 350b of FIG. 3D. Note that the units of area in FIG. 3C are not drawn to scale and each is equivalent to the other unit areas. Pole face 350a includes a unit area 302 and a unit area 304. In FIG. 3D, unit area 302 is associated with a length 309 between unit area 302 of pole face 350a and unit area 305 of pole face 350b. Similarly, unit area 304 is associated with a length 308 between unit area 304 of pole face 350a and unit area 307 of pole face 350b. Length 308 is relatively shorter than length 309. As such, flux passing over length 308 has a relatively shorter flux path than if the flux passed over length 309. Each unit area of pole face 350a is associated with a length extending to another unit area of pole face 350b.

Field pole member 352 can be characterized by a mean or average length per unit area, which can be determined by adding the lengths associated with each of the unit areas and dividing the sum by the number of unit areas in pole face 350a. The average length per unit area is indicative of the amount of material, such as magnetically permeable material, contained within field pole member 352. Flux, such as a unit of flux (e.g., unit of total flux), extending along a certain average length per unit experiences less losses, such as eddy current or hysteresis losses, than a longer average length per unit area. When pole face 350a confronts a magnetic region that produces a flux density over the surface area of pole face 350a, a total flux passes via an air gap (not shown) through field pole member 352. Another characteristic of field pole member 352 is that if pole face 350a is divided axially into two equal halves (i.e., an upper half 312 and a lower half 311) along the axis, then upper half 312 is associated with more units of area associated with relatively shorter lengths. Since field pole member 352 has wider dimensions in upper half 312 than lower half 311, upper half 312 can provide for more units of area. In particular, lower half 311 is associated with fewer units of area than upper half 312 as field pole member 352 has narrower dimensions in lower half 311. As there are more units of area in upper half 312, more flux passes through the associated lengths, including length 308, than passes through lower half 311. As such, more flux passes through shorter lengths than the longer lengths associated with lower half 311.

In view of the foregoing, field pole member 352 provides for flux paths that, on average, are shorter than found in other stator assemblies of comparable length along an axis of rotation. Therefore, a total flux passing through a pole face passes into a greater quantity of unit areas associated with relatively shorter flux path lengths than with other stator assemblies. Note that field pole members depicted in FIG. 3D (and elsewhere herein), such as field pole member 352, are not intended to be limited to field pole members that provide straight flux paths. Rather, field pole member 352 can include structural attributes to provide a substantially straight flux path (e.g., consecutive segments of flux path portions that do not deviate more than 60 degrees).

FIGS. 3E to 3F depict an example of a field pole member configured to interoperate with inner rotor assemblies, according to some embodiments. As shown, FIGS. 3E and 3F depict field pole member 356 being an inwardly-facing field pole member with a pole face being oriented in a direction toward an axis of rotation 345. A pole face 354a is shown to include a number of unit areas each associated a length between pole faces 354a and 354b of FIG. 3F. Note that the units of area in FIG. 3E are not drawn to scale and each is equivalent to the other unit areas. Pole face 354a includes a unit area 324 and a unit area 326. In FIG. 3F, unit area 324 is associated with a length 319 between unit area 324 of pole face 354a and unit area 325 of pole face 354b. Similarly, unit area 326 is associated with a length 318 between unit area 326 of pole face 354a and unit area 327 of pole face 354b. Length 318 is relatively shorter than length 319. As such, flux passing over length 318 has a relatively shorter flux path than if the flux passed over length 319. Each unit area of pole face 354a is associated with a length extending to another unit area of pole face 354b.

As with field pole member 352 of FIGS. 3C and 3D, field pole member 356 can be characterized by a mean or average length per unit area, which can be determined by adding the lengths associated with each of the unit areas and dividing the sum by the number of unit areas in pole face 354a. The average length per unit area is indicative of the amount of material within field pole member 356. Again, flux extending along a certain average length per unit experiences less losses than a longer average length per unit area. When pole face 354a confronts a magnetic region (e.g., of a conical magnet, a conical inner rotor assembly, or the like) that produces a flux density over the surface area of pole face 354a, a total flux passes via an air gap (not shown) through field pole member 356. Another characteristic of field pole member 356 is that if pole face 354a is divided axially into two equal halves (i.e., an upper half 321 and a lower half 322) along the axis, then upper half 321 is associated with more units of area as field pole member 356 (e.g., field pole member 356 has wider dimensions in upper half 321 that include more units of area). Lower half 322 is associated with fewer units of area as field pole member 356 is narrower in lower half 322. As there are more units of area in upper half 321, more flux passes through the associated lengths, including length 319, than passes through lower half 322. As such, more flux passes through longer lengths than the shorter lengths associated with lower half 322. In some cases, when the axial length, L, of field pole member 356 of FIG. 3F is equivalent to the axial length, L, of field pole member 352 of FIG. 3D, field pole member 352 has a shorter average length per unit area than field pole member 356 of FIG. 3F. As such, field pole member 352 may include a lesser amount of material than field pole member 356, and may, at least in some cases, experience less losses.

Figure 3G:
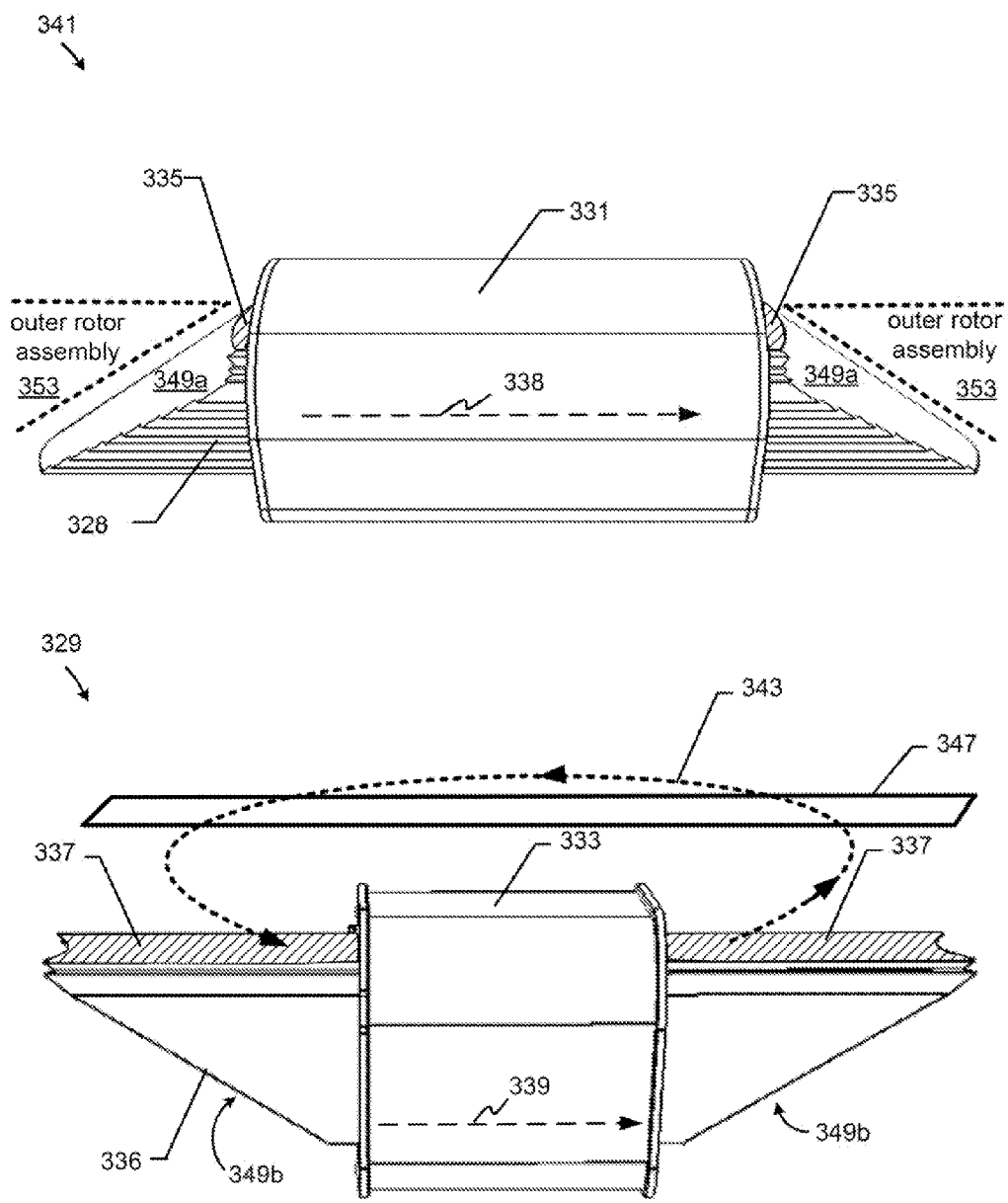
FIG. 3G depicts field pole members for outer rotor assemblies and inner rotor assemblies, according to some embodiments.

FIG. 3G depicts field pole members for outer rotor assemblies and inner rotor assemblies, according to some embodiments. Active field pole member 341 includes a coil 331 disposed on a field pole member 328, whereas active field pole member 329 includes a coil 333 disposed about field pole member 336. Active field pole members 341 and 329 can have equivalent lengths. Active field pole member 341 includes areas 335 between coil 331 and the pole faces. Similarly, active field pole member 329 includes areas 337 between coil 333 and the pole faces. Areas 335 and areas 337 are located at or adjacent to the perimeter of stator assemblies that include active field pole member 341 and active field pole member 329, respectively. An example of such a perimeter is perimeter 651 for stator assembly 640 in FIG. 6B. Consequently, areas 335 and areas 337 of FIG. 3G, in some examples, are located at or adjacent to motor cases that can be made of either of magnetically permeable material or electrically-conductive material, or a combination thereof. When coil 331 is energized, magnetic flux passes through field pole member 328 on flux path 338, whereas when coil 333 is energized, magnetic flux passes through field pole member 336 on flux path 339. As the areas 335 are lesser in size than areas 337, areas 335 of active field pole member 341 can have a reduced possibility to generate magnetic linkage paths 343 (e.g., from one area 337 to another area 337) that otherwise might pass through a surface 347 of a motor case and generate losses due to such magnetic linkage paths 343. Therefore, if the motor case is composed of magnetically permeable material, areas 335 of active field pole member 328 provide for reduced hysteresis losses relative to the hysteresis losses produced by magnetic linkage paths 343 passing through surface 347 of the motor case. Or, if the motor case is composed of electrically-conductive material, areas 335 of active field pole member 328 provide for reduced eddy current losses relative to the eddy current losses produced by magnetic linkage paths 343 passing through surface 347 of the motor case. In some embodiments, the motor case can be composed of neither magnetically permeable material nor electrically-conductive material. Note that outer rotor assemblies 353, which are depicted in dashed lines, intercept magnetic flux emanating from pole faces 349a and prevent such flux from reaching a motor case (not shown). Note further that pole faces 349a of field pole member 328 and pole faces 349b of field pole member 336 can have surfaces that are oriented at an equivalent acute angle (e.g., 40 degrees) with respect to an axis of rotation.

Figure 3H:
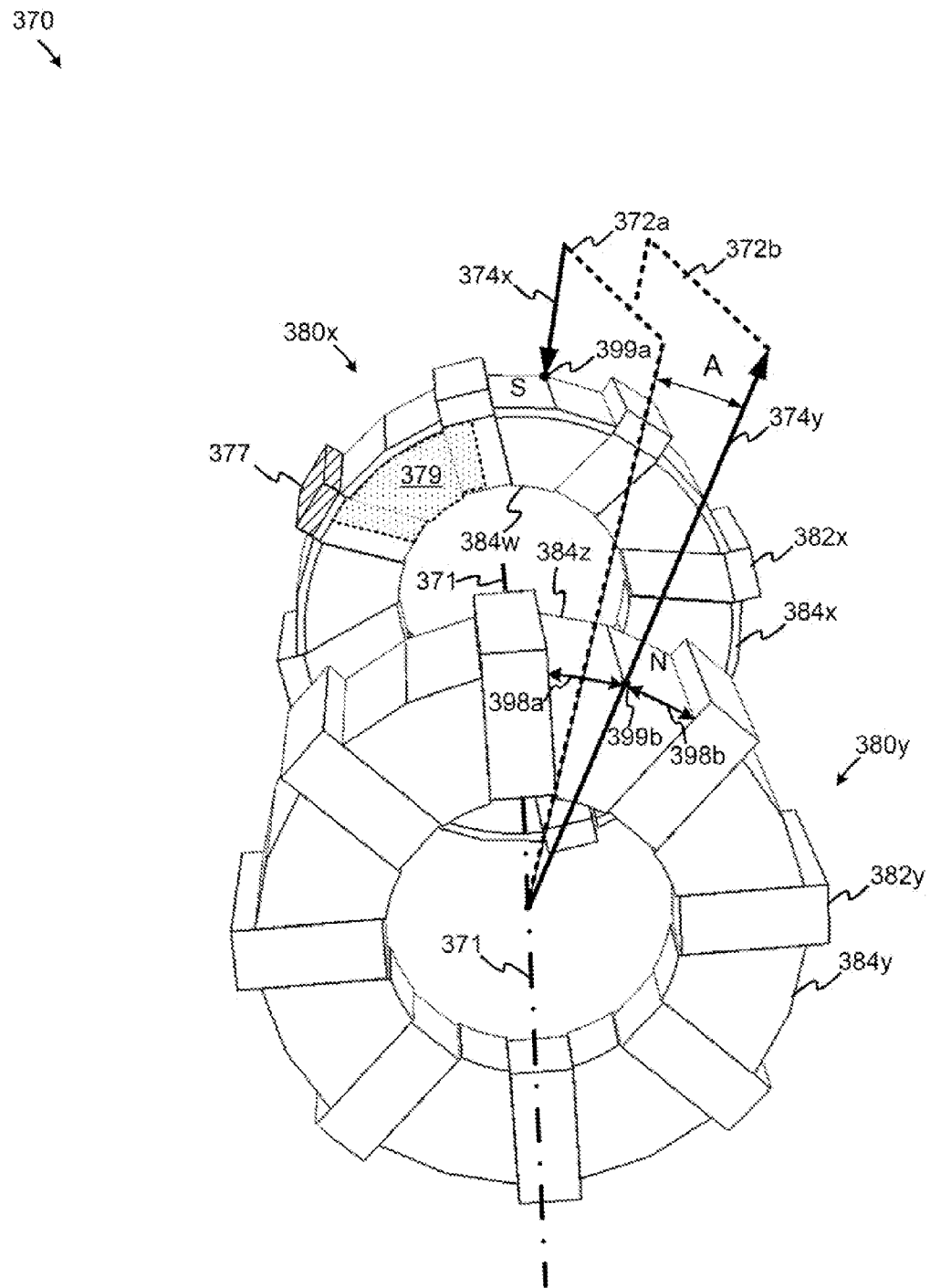
FIG. 3H depicts an example of a rotor structure implementing an arrangement of offset outer rotor assemblies, according to some embodiments.

FIG. 3H depicts an example of a rotor structure implementing an arrangement of offset outer rotor assemblies, according to some embodiments. Rotor structure 370 is shown to include rotor assemblies 380x and 380y disposed on an axis of rotation 371. Rotor assembly 380x is shown to include magnetic regions 379, which, in turn, can include magnets and/or magnetic material 382x (or portions thereof) and magnetically permeable structures 384x. Rotor assembly 380y also includes magnetic regions (not shown) similar to magnetic regions 379, which, in turn, can include magnets and/or magnetic material 382y (or portions thereof) and magnetically permeable structures 384y. As rotor assemblies 380x and 380y each can contribute to a detent torque when positioned to interact with field poles (not shown) in the stator, flux from either rotor assemblies 380x or 380y, or both, can contribute to detent. Flux waveforms depicting detent produced in association with rotor assemblies 380x and 380y can be substantially similar in shape and amplitude to each other, and, as such, the amplitudes of the detent waveforms rotor assemblies 380x and 380y can be added together (e.g., through the principles of superposition). The detent waveforms can add together to form a composite detent waveform. As shown, rotor assemblies 380x and 380y are outer rotor assemblies.

According to at least some embodiments, rotor assemblies 380x and 380y can be offset from each other relative to, for example, a shaft (not shown) coextensive to axis of rotation 371. Rotor assemblies 380x and 380y can be offset by an angle A to provide for a composite detent waveform that has an amplitude less than if there was no offset. In some examples, angle A can be determined to offset at least one detent waveform to be out of phase (or substantially out of phase), where angle A can be any number of degrees. In at least some examples, angle A can be any angle between 0 to 30 degrees. A composite detent waveform can have a reduced amplitude, with the offset rotor assemblies 380x and 380y causing the detent waveforms to be offset relative to each other. In some cases, offset detent waveforms can cancel (or substantially cancel) each other for enhanced position control of a motor and relatively smoother operation, according to various embodiments.

Angle A can be referenced in relation to the rotor assemblies and/or between any points of reference associated with the rotor assemblies, and can be expressed in terms of mechanical degrees about axis 371. In at least some embodiments, angle A is an angle between poles for rotor assemblies 380x and 380y, such as an angle between one pole associated with rotor assembly 380x and another pole associated with rotor assembly 380y. For example, a south pole associated with rotor assembly 380x can be positioned on axis 371 at an angle A relative to a north pole associated with rotor assembly 380y. In at least some embodiments, angle A can be referenced relative to a first reference point associated with rotor assembly 380x and a second reference point associated with rotor assembly 380y. As shown in this example, reference points, such as reference points 399a and 399b of associated magnetic regions 379, can be used to determine an offset from each other by angle A. In some cases, reference points 399a and 399b each can represent a point along a line or plane that bisects the surface of either magnetically permeable structure 384w or magnetically permeable structure 384z. Reference points can include other points of reference, such as a point on a common edge or side (e.g., adjacent to a magnet, such as magnet 382x or magnet 382y). According to at least some embodiments, rotor assemblies 380x and 380y can be offset relative to planes including reference points, where each of the reference points is located in a plane that includes axis 371. As shown, a ray 374y extending out from rotor assembly 380y can be offset from another ray 374x oriented into rotor assembly 380x. In particular, a plane 372a including ray 374x (e.g., into magnetically permeable structure 384w) can be offset by an angle A from another plane 372b that includes ray 374y (e.g., extending out from magnetically permeable structure 384z). While planes 372a and 372b including rays 374x and 374y can include axis of rotation 371, the planes need not be so limited. Plane 372b bisects magnetically permeable material 384z such that reference point 399b is located at midpoint between equal arc lengths 398a and 398b (e.g., along a circle centered on axis of rotation 371). Note that structural features, such as feature 377, which is shown with shading, is optional and need not be present in various examples.

Figure 4A:
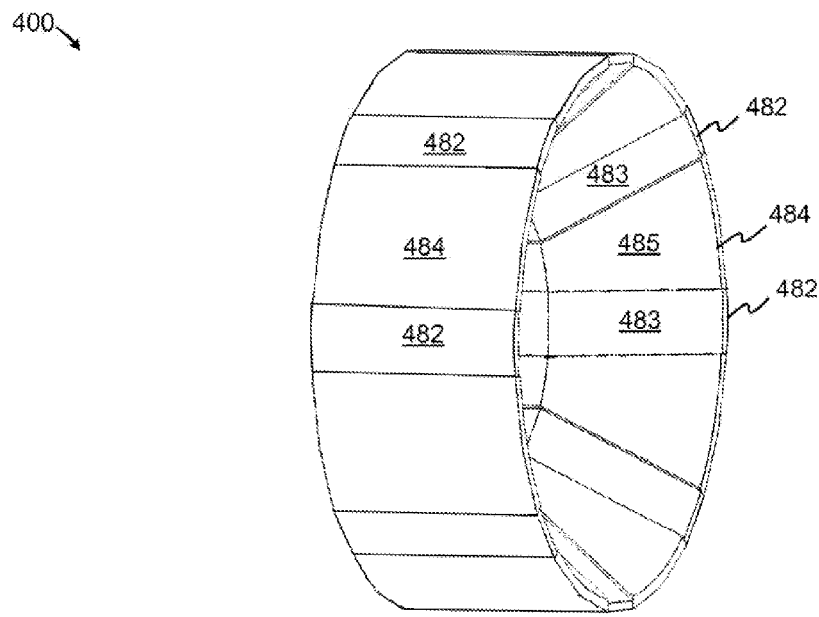
FIGS. 4A and 4B depict different perspective views of an example of an outer rotor assembly, according to some embodiments.
Figure 4B:
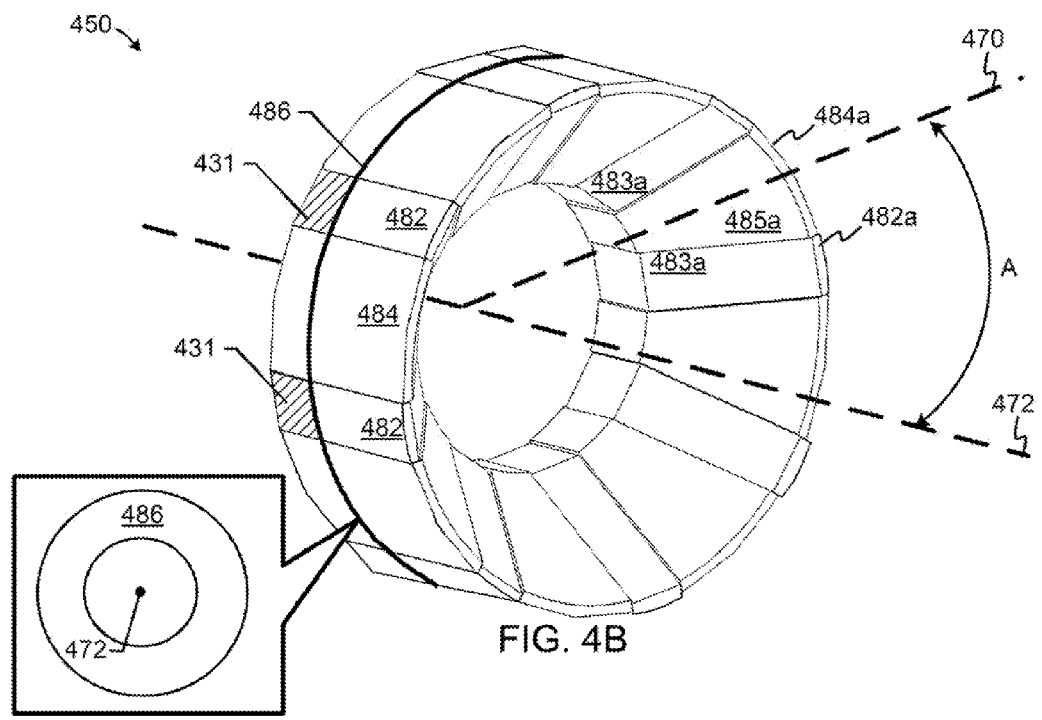

FIGS. 4A and 4B depict different perspective views of an example of an outer rotor magnet or rotor assembly, according to some embodiments. In FIG. 4A, a rotor assembly 400 includes magnetic material 482 (e.g., as permanent magnets) having surfaces 483 configured to confront pole faces, and magnetically permeable structures 484 having surfaces 485 that are configured also to confront pole faces. Surfaces 483 and 485 can specify a magnetic region and/or a pole for rotor assembly 400. Note that while surfaces 483 of magnetic material 482 are configured to confront pole faces, flux need not, according to some embodiments, pass through surfaces 483. Rather, the flux and/or flux density produced by the structures of magnetic material 482 can magnetically couple to (i.e., form flux paths through) the sides of magnetically permeable structures 484, whereby flux produced by the structures of magnetic material 482 can interact via surfaces 485 with pole faces.

FIG. 4B depicts another perspective view of a rotor assembly 450 includes magnetic material 482 (e.g., as permanent magnets), and magnetically permeable structures 484. A surface 485a of magnetically permeable structures 484a can be at angle "A" from centerline 472 passing through the center of rotor assembly 450, where line 470 is coextensive with at least a portion of surface 485a. Further, surfaces 483a of magnetic material 482a can be at angle "A" (or any other angle) from centerline 472. In some embodiments, centerline 472 coincides with an axis of rotation. Centerline 472 can represent a geometric center of a number of cross-sections of rotor assembly 450 in planes perpendicular to the axis of rotation. To illustrate, FIG. 4B depicts a cross section 486 having an annular or a disc shape that is centered on centerline 472, with cross section 486 residing a plane perpendicular to centerline 472. Further, centerline 472 can represent, for example, a line about which rotor assembly 450 is symmetric. In at least some embodiments, surfaces 485a are used to form air gaps with adjacent pole faces (not shown). In at least one example, surfaces 485, such as surface 485a, are configured to be coextensive with portions of an outer surface of a cone, whereas surfaces 483, such as surface 483a, may or may not be configured to be at angle A or coextensive with the outer surface of a cone. Thus, flux paths may pass between surfaces 485 and the pole faces, whereas flux paths need not exist between surfaces 483 and the pole faces.

Figure 4C:
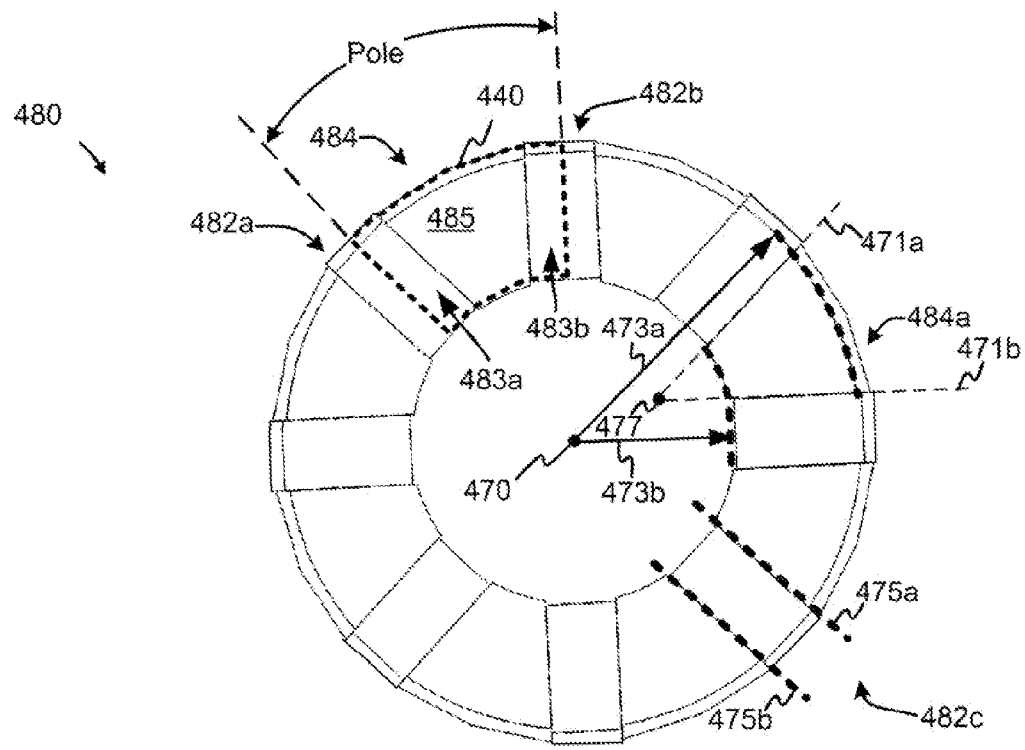
FIGS. 4C and 4D depict a front view and a rear view of an example of an outer rotor assembly, according to some embodiments.
Figure 4D:
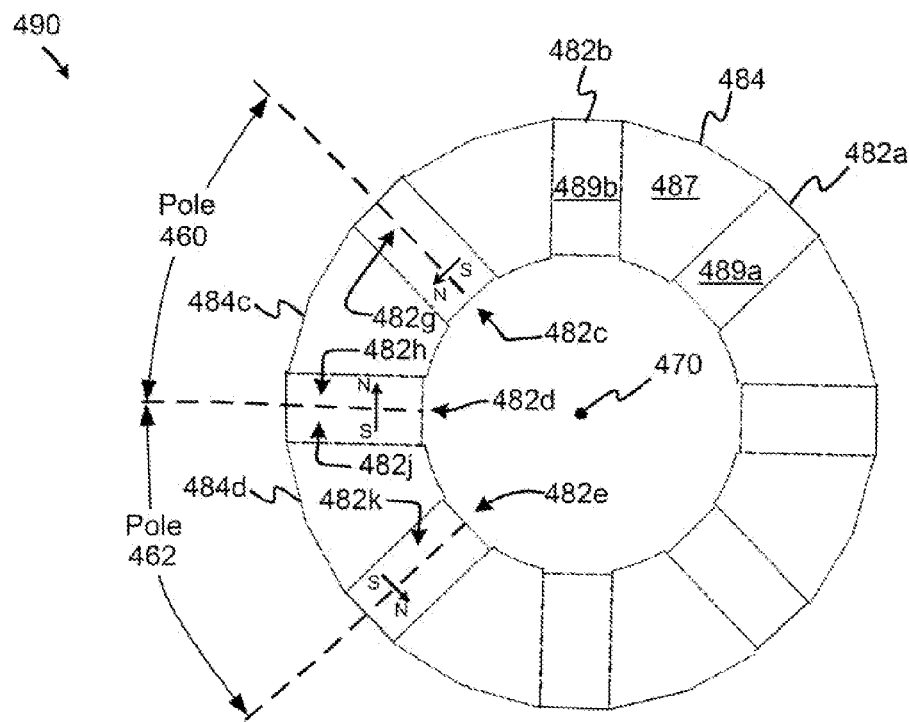

FIGS. 4C and 4D depict a front view and a rear view of an example of an outer rotor assembly, according to some embodiments. FIG. 4C depicts a front view of a rotor assembly 480 including an arrangement of magnetic regions 440. A magnetic region 440 includes surface portion 483a, surface portion 483b, and surface 485 associated with respective magnetic material 482a, magnetic material 482b, and magnetically permeable structure 484, whereby surfaces 483a, 485, and 483b are configured to confront pole faces (not shown). Magnetic regions 440 are arranged radially about a centerline 470. Further to FIG. 4C, the front view (e.g., the view in which at least surface 485 confronts pole faces of field pole members) of magnetically permeable structure 484a is a circular sector shape (e.g., a "pie piece"-like cross-section in a plane substantially perpendicular to the axis of rotation). In the example shown, magnetically permeable structure 484a can be defined as a portion of a circle enclosed by line 471a and line 471b originating from, for example, a point 477, and bounded by a first arc or line associated with an outer radius 473a and a second arc or line associated with an inner radius 473b. Line 471a and line 471b can be a first boundary and a second boundary extending from a point 477, which is a center of a circle (not shown) offset from centerline 470. Note that inner radius 473b can be relatively constant in an extension portion (e.g., in an extension region 426 of FIG. 4E) and can vary in an angled surface portion (e.g., in an angled surface portion 428 of FIG. 4E) along the axis of rotation.

Referring back to FIG. 4C, the front view of magnetic material 482, such as magnetic material 482c, indicates that sides 475a and 475b of magnetic material 482 can be parallel to each other. Further, magnetic material 482c can also be bound by an arc or line associated with an outer radius 473a and another arc or line associated with an inner radius 473b. Note that the shapes of magnetically permeable structures 484 and magnetic materials 482a and 482b are not limited to those shown and can be of any shape. For example, magnetic materials 482a and 482b can be wedge-shaped (not shown) and the shapes of magnetically permeable structures 484 can be dimensioned to have parallel sides, such as sides 475a and 475b. Note that sizes (e.g., relative sizes) of magnetically permeable structures 484 and magnetic materials 482a and 482b are not limited to those depicted in this and other figures. Also, rotor assembly 480 and other variations thereof need not be limited to magnetically permeable structures 484 and magnetic materials 482a and 482b, but may include other materials, structures and/or arrangements of magnetically permeable structures 484 and magnetic materials 482a and 482b.

FIG. 4D depicts a rear view 490 of a rotor assembly 480 including arrangements of magnetic material 482a, magnetic material 482b, and magnetically permeable structures 484 of FIG. 4C, where magnetic material 482a, magnetic material 482b, and magnetically permeable structures 484 are used to form a magnetic region. Surfaces 489a, 487, and 489b are rear surfaces of magnetic material 482a, magnetically permeable structure 484, and magnetic material 482b, respectively. In some embodiments, the cross-sections of magnetic material 482a and of magnetic material 482b are substantially rectangular in a plane perpendicular to centerline 470. In various instances, one or more of the surfaces of either the magnetic material or the magnetically permeable structure can be curved or straight (or can be formed from multiple straight portions to approximate a curved surface) at an inner radius dimension, such as at inner radius 473b of FIG. 4C or an outer radius dimension, such as at an outer radius 473a of FIG. 4C. The cross-section of magnetically permeable structure 484 can be trapezoidal in shape (e.g., wedge-shaped) in a plane perpendicular to centerline 470. Further, FIG. 4D depicts a rear view of structures for forming magnetic poles 460 and 462, where pole 460 is a north pole and pole 462 is a south pole. In the example shown, a portion ("N") 482g of magnet 482c, a portion ("N") 482h of magnet 482d and magnetically permeable structure 484c form pole 460, whereas a portion ("S") 482j of magnet 482d, a portion ("S") 482k of magnet 482e, and magnetically permeable structure 484d form pole 462. Note that magnets 482c, 482d, and 482e can be polarized in the direction shown by the flux arrows with north ("N") and south ("S") notations, whereby the directions of polarization can be circumferential (or substantially circumferential), and, thus, can be tangent (or substantially tangent) to a circle (not shown) about centerline 470. In some examples, the directions of polarization can be circumferential in that flux passes generally of, at, or near the circumference of a circle (not shown) about a centerline and/or an axis of rotation. In some embodiments, the portions of magnets 482a to 482b need not be visible in the rear view. For example, the axial lengths of magnets 482 of FIGS. 4A and 4B need not extend along centerline 472 as long as magnetically permeable material 484.

FIGS. 4E to 4G depict cross-sectional views of an example of an outer rotor assembly, according to some embodiments. Diagram 420 of FIG. 4E includes a cross-section of an outer rotor assembly in which a plane ("X-X'") bisects the outer rotor along or through the axis of rotation 412. The cross-section includes an extension portion 426 and an angled surface portion 428 having at least a subset of dimensions along the axis of rotation 412. Extension portion 426 includes an inner radius ("IR") 421 as a dimension that is substantially constant along axis of rotation 412. Extension portion 426 can be configured to vary an amount of flux passing through a surface of magnetically permeable structure, such as surface 425. The amount of flux can be varied by modifying a dimension along the axis, such as an axial length 429. The amount of flux can be generated at least by magnetic material. In some examples, the amount of flux can be varied by modifying another dimension, height 427, which can be perpendicular to axis of rotation 412. In some cases, modifying the outside radius ("OR") 499 of the outer rotor assembly may influence height 427 to modify the amount of flux. Also, modifying height 427 to modify the amount of flux may or may not influence outside diameter 499. Angled surface portion 428 is shown to have surfaces at multiple radial distances 423 from axis of rotation 412, whereby radial distances 423 increase at axial distances further from extension portion 426 along axis of rotation 412. But note that radial distances 423 need not vary in some cases (not shown). For example, one or more subsets of radial distances can be constant or substantially constant for one or more subsets or ranges of lengths along the axis of rotation. As shown, the interior portions of an internal permanent magnet ("IPM") and/or portions of the magnetically permeable material and magnetic material are disposed at radial distances greater than a radial distance 423 from the axis of rotation.

In some embodiments, the portions of magnets 482a to 482b need not be visible in the rear view. For example, the axial lengths of magnets 482 of FIGS. 4A and 4B need not extend along centerline 472 as long as magnetically permeable material 484 along the axis of rotation. Thus, magnets 482 can be embedded in magnetically permeable material such that they need not extend axially through the axial length of a rotor assembly. In some embodiments, magnets 482 having a shorter axial length than magnetically permeable material 484 can be disposed adjacent supplemental structures 431 that can include any material, such as plastic. In some instances, supplemental structures 431 can include any material that reduces or prevents magnetic short-circuits between structures of magnetically permeable material 484. While magnets 482 may be disposed in angled surface portion 428, they can be disposed in a portion of an extension portion or can be omitted therefrom. In some embodiments, surfaces 483 of magnets 482 can be covered by magnetically permeable material between surfaces 483 and respective air gaps and/or pole faces.

Diagram 410 of FIG. 4F is a perspective view of a cross-section of an outer rotor assembly 432 in which a plane ("X-X'") 411 bisects the outer rotor assembly along the axis of rotation 412, according to at least one embodiment. The inner diameter of extension portion 426 can include one or more radial distances. In the example shown, the inner diameter can include as radial distances 413 and 414 between axis of rotation 412 and the surfaces in extension portion 426 for magnets 482 and magnetically permeable structure 484. In some cases, radial distances 413 and 414 can be the same.

Diagram 430 of FIG. 4G is another perspective view of a cross-section of an outer rotor assembly 432, according to at least one embodiment. As shown, the surfaces of magnets 482 and magnetically permeable structures 484 can be at the same or at different distances from the axis of rotation (e.g., the surfaces for magnets 482 and magnetically permeable structure 484 can reside on the same or different interior or exterior surface portions of a cone). Thus, surfaces 437 of magnetically permeable structures 484 and surfaces 439 of magnets 482 can be dimensioned similarly or differently. In the particular example shown, surfaces 437 of magnetically permeable structures 484 can be disposed at a radial distance 433 from an axis of rotation, whereas surfaces 439 of magnets 482 can be disposed at a radial distance 435 from the axis of rotation. Note that in at least some embodiments, surfaces 437 of magnetically permeable structures 484 are configured to convey flux between a pole face (not shown) and outer rotor assembly 432 in an angled surface portion. Thus, surfaces 439 of magnets need not be coextensive with the same conically-shaped space to which surfaces 437 are coextensive. Rather, surfaces 439 of the magnets can be described as being "recessed" relative to surfaces 437. As air gaps can be defined in associated with surfaces 437 of magnetically permeable structures 484, the distances 435 can be equal or greater than distances 433 relative to an axis of rotation. Further, surfaces 439 can be of any shape are not limited to the shapes shown in FIG. 4G.

Figure 5A:
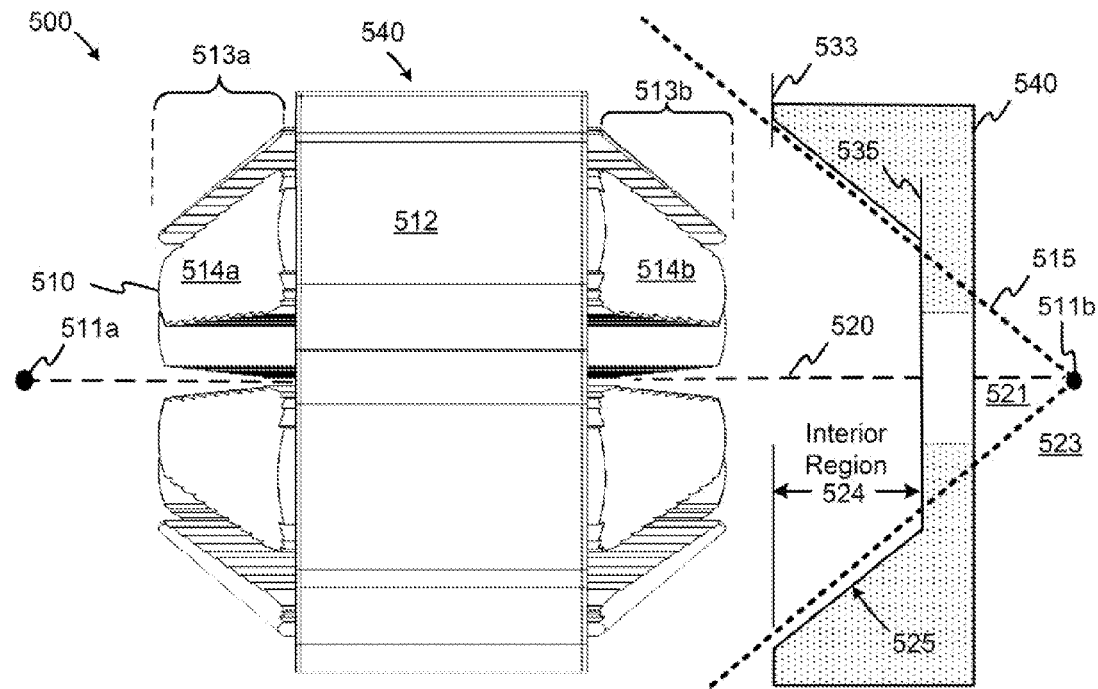
FIGS. 5A and 5B depict different views of an example of a stator assembly, according to some embodiments.
Figure 5B:
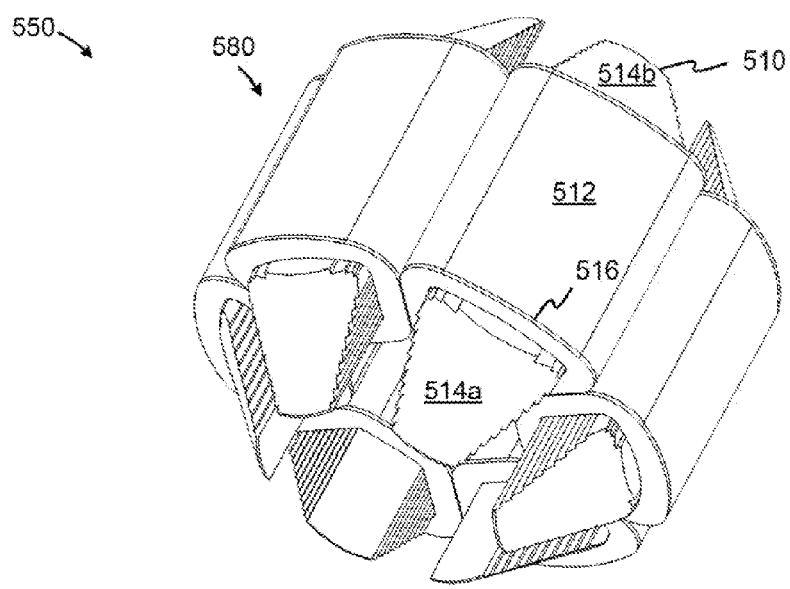

FIGS. 5A and 5B depict different views of an example of a stator assembly, according to some embodiments. FIG. 5A is a diagram 500 depicting a side view of stator assembly 540 including an arrangement of active field pole members each including a field pole member 510 having pole faces 514a and 514b, and a coil 512. As shown, pole faces 514a and portions of respective pole shoes are disposed in a portion 513a of stator assembly 540 and pole faces 514b are disposed in a portion 513b of stator assembly 540. Pole faces 514b and portion 513b are configured to extend into an interior region 524 of a rotor assembly 540. According to some embodiments, interior region 524 is an opening, space or cavity configured to receive portion 513b, and can be formed as having a frustum shape. As is known, a frustum is a cone-based shape with a first circular base (e.g., a bottom base) and a second circular base (e.g., a top base), whereby the second base is formed by cutting off the tip of a cone along a plane perpendicular to the height of a cone. The height (not shown) of the cone in this example lies along axis of rotation 520. Interior region 524 can be formed by planes 533 and 535 passing perpendicular to an axis of rotation 520. Planes 533 and 535 pass or cut through a conical boundary 515 of a cone disposed on an axis of rotation 520, with apex 511b of the cone lying on axis of rotation 520. In at least one example, planes 533 and 535 can form a first base and a second base, respectively, of a frustum-shaped interior region 524. Conical boundary 515 is oriented so as to extend from apex 511b to enclose another point 511a on axis of rotation 520 within the interior of conical boundary 515. Point 511a can serve as another apex for a conical boundary (not shown) to enclose portion 513a within. An angled surface 525 of, for example, a magnetic region of rotor assembly 540 is disposed within region 523 that is external to the conical boundary 515, whereas pole faces 514b reside in region 521 that is internal to the conical boundary 515. Further, pole faces 514b can be oriented at an angle relative to axis of rotation 520, whereby the angle is the same or different relative to an angle coextensive with angled surface 525.

FIG. 5B is a diagram 550 depicting a side view of stator assembly 580 including an arrangement of active field pole members each including a field pole member 510 having pole faces 514a and 514b, and a coil 512. Coil 512 can be disposed on or over a bobbin 516. As shown in FIGS. 5A and 5B, pole faces 514a and 514b are configured to align with a line or surface that is at an angle with, for example, the axis of rotation. Further, pole faces 514a and 514b include surfaces (or portions thereof) are contoured to also align with or be bounded by the line or the surface at the above-mentioned angle. Therefore, pole faces 514a and 514b can include convex surface portions. According to some embodiments, pole faces 514a and 514b can be substantially flat or flat. A substantially flat or flat surface for a pole face can be coextensive with at least one or more portions of a conically-shaped space. In one example, a width of a pole face from the group of pole faces 514a and 514b can be or can substantially be coincident with an arc on a circle centered on the axis of rotation. The width of the pole face can decrease as, for example, the number of field pole members increase for stator assemblies 540 of FIGS. 5A and 580 of FIG. 5B. The width decreases as the arc makes up a smaller portion of the diameter of the circle, and as the arc is reduced, the arc approximates a line by which the surface of the pole face can be bounded.

FIG. 6A depicts an outer rotor assembly and a stator assembly configured to interact with each other, according to some embodiments. Outer rotor assembly 630 and stator assembly 640 can interact with each other when arranged co-linearly. Diagram 600 depicts rotor assembly 630 including magnets 632 and magnetically permeable structures 634. Rotor assembly 630 is configured to center on a centerline 602b, which can coincide with an axis of rotation. Surface 683 and surface 685 of respective magnets 632 and magnetically permeable structures 634 can be coextensive with or can be bounded by a line 670 or surface oriented at an angle, A, from centerline 602b. In some embodiments, surfaces 685 of magnetically permeable structures 634 need only be oriented at angle A for forming air gaps with pole faces 614, with surfaces 683 being optionally oriented with angle A. Stator assembly 640 is shown to include a subset of pole faces 614, with the dimensions of a number of field pole members establishing a perimeter 651 for stator assembly 640. The dimensions of the number of field pole members can also establish a diameter 657, as shown in FIG. 6B. Referring back to FIG. 6A, an envelope 642 can define one or more boundaries in which pole faces 614 (or surface portions thereof) are oriented, with envelope 642 being centered on a center line 602a. In some cases, envelope 642 is a conically-shaped three dimensional space that can circumscribe the surfaces of pole faces 614. The interior surface of envelope 642 can be coincident with at least one angle, B. Note that angle B can be the same as angle A, or can vary therefrom (e.g., an air gap can have a uniform radial thickness or can have a variable axial thickness that varies in thickness along the axis). Stator assembly 640 can also be centered on centerline 602a. Centerlines 602a and 602b can be coincident with an axis of rotation, at least in some cases. Note that while envelope 642 can define a boundary of pole faces 614, the pole faces need not be contoured or convex in all examples. For example, pole faces 614 can include flat portions that are oriented at angle B within the boundary set forth by envelope 642.

FIGS. 6B to 6C depict cross-sections of field pole members for determining a surface area of a pole face, according to some embodiments. Angles A and/or B of FIG. 6A can be determined as follows. Generally, a rotor-stator structure is designed based on spatial constraints, such as a volume into which the rotor-stator structure is to reside. Thus, stator assembly 640 of FIG. 6A can be configured to have a perimeter 651 and/or a diameter 657. FIG. 6B depicts a cross-section 650 in a plane perpendicular to axis of rotation 656 with active field pole members arranged as a stator assembly within perimeter 651. Cross-section 650 can be located within a coil region 644 of FIG. 6A in which coils are disposed axially (e.g., the coils can be wound in an axial direction to generate ampere-turn ("AT") flux in a direction along an axis of rotation 656 of FIG. 6B within the field pole members in coil region 644. Active field pole members include coils 652 and field pole members 654 of FIG. 6B. A desired amount of flux (e.g., a total amount of flux) can be determined in coil region 644 within an active field pole member to produce a value of torque. A flux density produced at an air gap can be influenced by the magnetic material used for magnets 632 (e.g., neodymium magnets produce greater flux densities than, for instance, a ceramic magnet). Therefore, a specific magnetic material can be selected to produce a flux density to achieve a desired amount of flux in a portion of a field pole member having a cross-sectional area 665 of FIG. 6C, which depicts a cross-section 660. Cross-sectional area 665 can provide for the desired amount of flux (e.g., total flux composed of at least AT-generated flux and magnetic material-generated flux) through the field pole member. In some cases, cross-section 660 can be perpendicular to centerline 602a of FIG. 6A. For example, cross-section 660 can be depicted as cross-section 661 of a field pole member 641 of stator assembly 640 of FIG. 6A, with cross-section 661 being in a plane (not shown) perpendicular to centerline 602a.

FIG. 6D illustrates a surface area of a pole face determined as a function of the flux in a coil region and/or the flux density produced by at least one magnetic region, the surface area being oriented at angle from a reference line, according to some embodiments. Surface area 694 of a pole face 614 of FIG. 6A can be based on the flux in coil region 644 and the flux density produced by at least one magnet 632 of the magnetic region, either (or both) of which can influence the generation of a desired amount of torque. Therefore, surface area 694 can be determined as a function of flux produced by the magnetic material of magnets 632, the flux originating tangent to a circle about centerline 602a (i.e., as determined by the direction of polarization). Angle B can be determined to achieve surface area 694. Note that surface area 694 is greater than cross-sectional area 665, thereby enhancing the concentration of magnet-produced flux within the field pole member. Pole face 614a is oriented at an angle B (e.g., an acute angle to centerline 602a) to establish surface area 694. Note that the depiction in FIG. 6D is viewed from a point on a line normal to the surface of pole face 614a. In some cases, at least a portion of pole face 614a is coextensive with a portion of a cone. Angle A can be determined to orient the surface 685 of at least magnetically permeable structure 684 to the axis of rotation to form the air gap.

Figure 7:
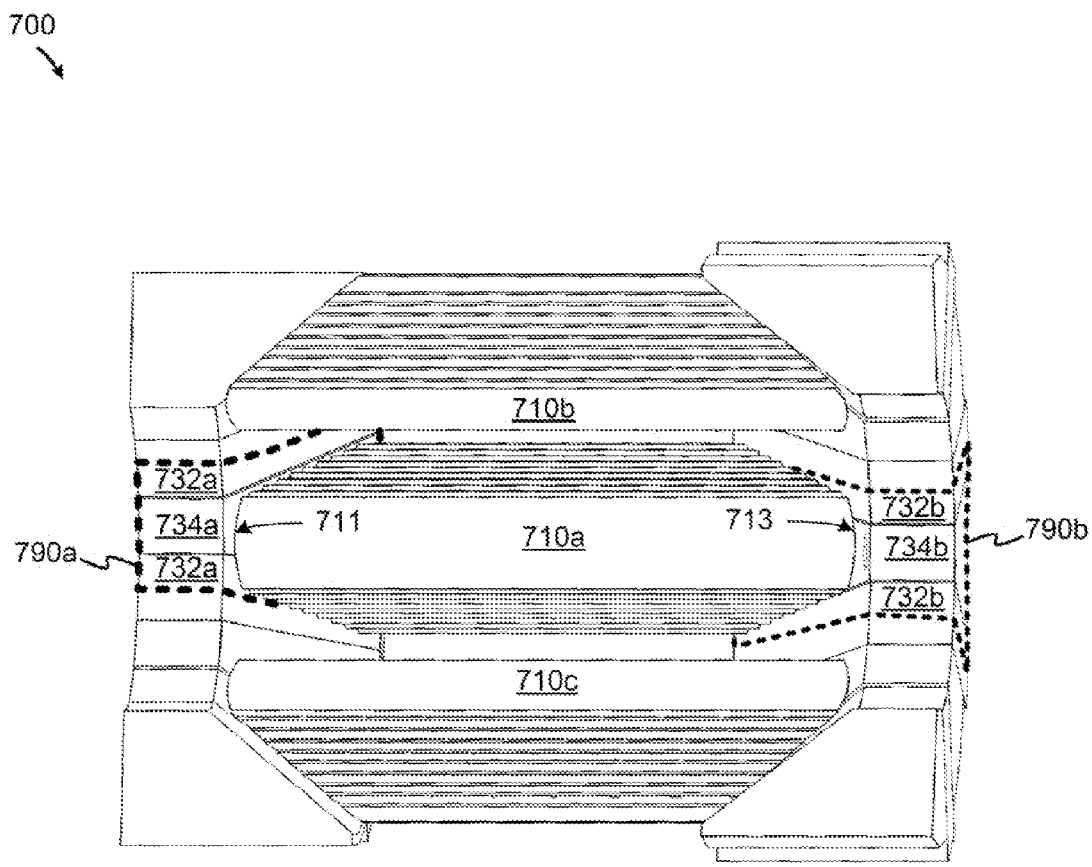
FIG. 7 depicts a cross-section of a rotor-stator structure in which field pole members are positioned adjacent to magnetic regions to form air gaps, according to some embodiments.

FIG. 7 depicts a cross-section of a rotor-stator structure in which field pole members are positioned adjacent to magnetic regions to form air gaps, according to some embodiments. Cross-section 700 includes field pole members 710a, 710b, and 710c oriented between portions of outer rotor assemblies. In particular, field pole member 710a is located between magnetic region 790a and magnetic region 790b. An air gap 711 is formed between magnetic region 790a and a pole face (not shown) of field pole member 710a and another air gap 713 is formed between magnetic region 790b and another pole face (not shown) of field pole member 710a. Magnetic region 790a includes magnets 732a (or portions thereof) and a magnetically permeable structure 734a, and magnetic region 790b includes magnets 732b (or portions thereof) and a magnetically permeable structure 734b. In operation, a flux path (or a portion thereof) can extend from magnetic region 790a via field pole member 710a to magnetic region 790b in examples where magnetic region 790a forms a north pole and magnetic region 790b forms a south pole. In this example, magnets 732a (or portions thereof) include north poles oriented toward magnetically permeable structure 734a and magnets 732b (or portions thereof) include south poles oriented in a direction away from magnetically permeable structure 734b. Note that while magnetic regions 790a and 790b are shown to be offset, they need not be.

Figure 8A:
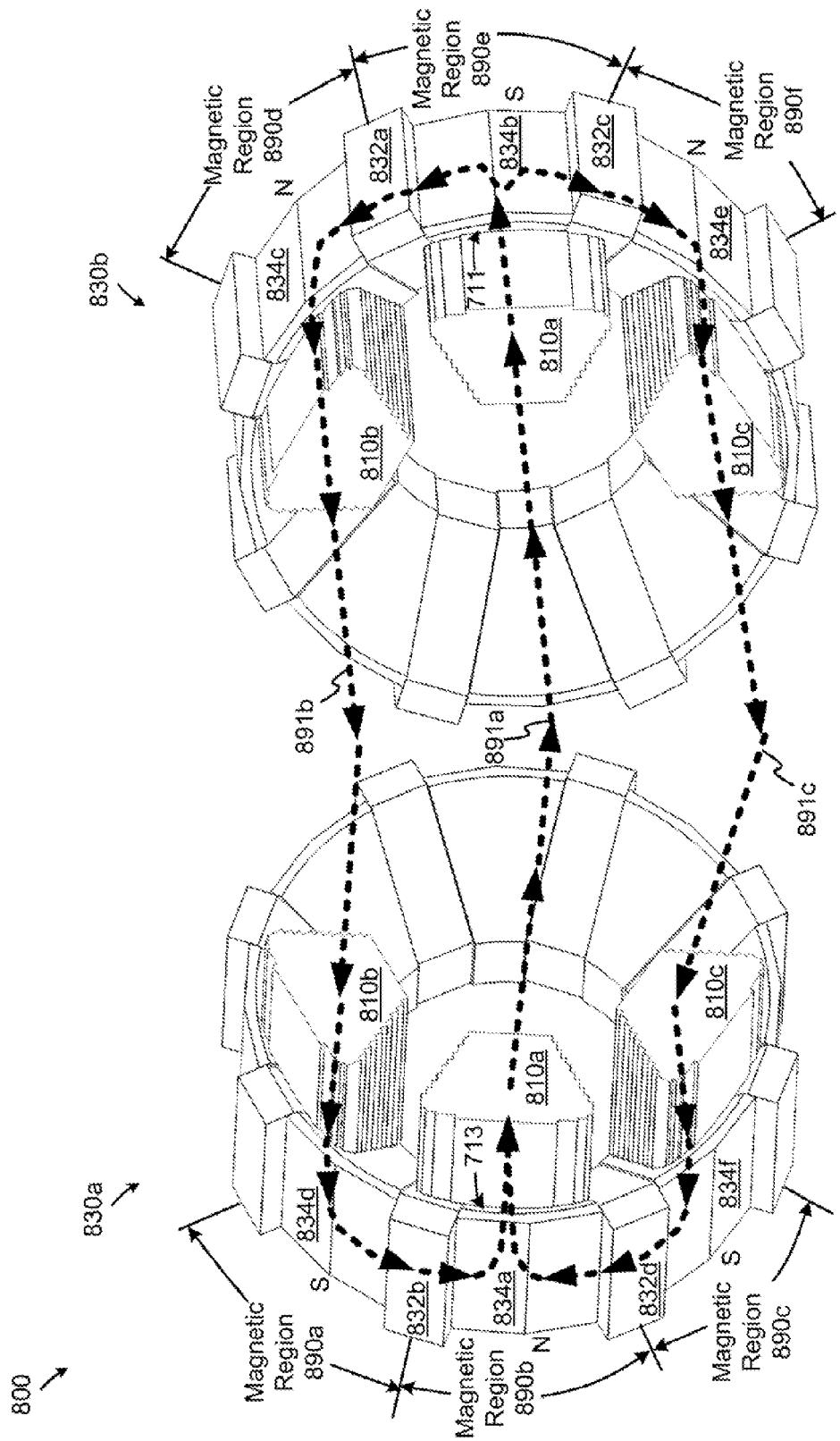
FIG. 8A depicts cross-sections of rotor-stator structure portions illustrating one or more flux path examples, according to some embodiments.

FIG. 8A depicts cross-sections of rotor-stator structure portions illustrating one or more flux path examples, according to some embodiments. Diagram 800 includes field pole members 810a, 810b, and 810c disposed between rotor assemblies 830a and 830b. As shown, flux path portion 891a can extend through field pole member 810a from magnetically permeable structure 834a in rotor assembly 830a to magnetically permeable structure 834b in rotor assembly 830b. Flux path portion 891a also passes through air gaps 711 and 713 that are formed between field pole member 810a and respective rotor assemblies 830a and 830b. Magnetically permeable structure 834b and magnets 832a and 832c (or portions thereof) are shown as constituting magnetic region 890e, which forms a south ("S") pole. The flux path portion passes from magnetic region 890e to magnetic region 890d, which forms a north ("N") pole. Magnetically permeable structure 834c and at least magnet 832a (or a portion thereof) are shown as constituting magnetic region 890d. The flux exits rotor assembly 830b as flux path portion 891b and passes through field pole member 810b before entering magnetically permeable structure 834d of magnetic region 890a (i.e., a south pole), which also includes at least magnet 832b. The flux passes to magnetic region 890b (i.e., a north pole) composed of magnetically permeable structure 834a and magnets 832b and 832d (or portions thereof), thereby establishing a closed flux path. According to the example shown, rotor assemblies 830a and 830b and field pole members 810a and 810b form a closed flux path. Portions of the closed flux path pass through at least field pole members 810a and 810b and at least rotor assemblies 830a and 830b in opposite directions or in substantially opposite directions. In some cases, a first portion of the closed flux path can pass through rotor assembly 830a in a substantially opposite direction than a second portion of the closed flux path that passes through rotor assembly 830a. For example, the first portion of the close flux path can pass through rotor assembly 830a in one direction about the axis of rotation (e.g., clock-wise) and the second portion of the close flux path can pass through rotor assembly 830b in another direction about the axis of rotation (e.g., counter clock-wise).

In a specific embodiment, the rotor-structure can be configured such that flux path portion 891a can separate in rotor assembly 830b to form flux path portion 891b and flux path portion 891c. Flux path portion 891b passes through field pole member 810b, whereas flux path portion 891c passes through field pole member 810c. The flux from magnetic region 890e enters magnet region 890f (i.e., a north pole) including magnetically permeable structure 834e and at least magnet 832c (or a portion thereof). The flux exits rotor assembly 830b and passes through field pole member 810c and into magnetic region 890c (i.e., a south pole) of rotor assembly 830a. Magnetic region 890c includes magnetically permeable structure 834f and at least magnet 832d (or a portion thereof). Note that the generation of flux path portion 891c is optional and need not be present in each rotor-stator structure of the various embodiments. Note, too, a "flux path portion" need not be limited to those shown, but can be any part of a flux path and of any length.

Figure 8B:
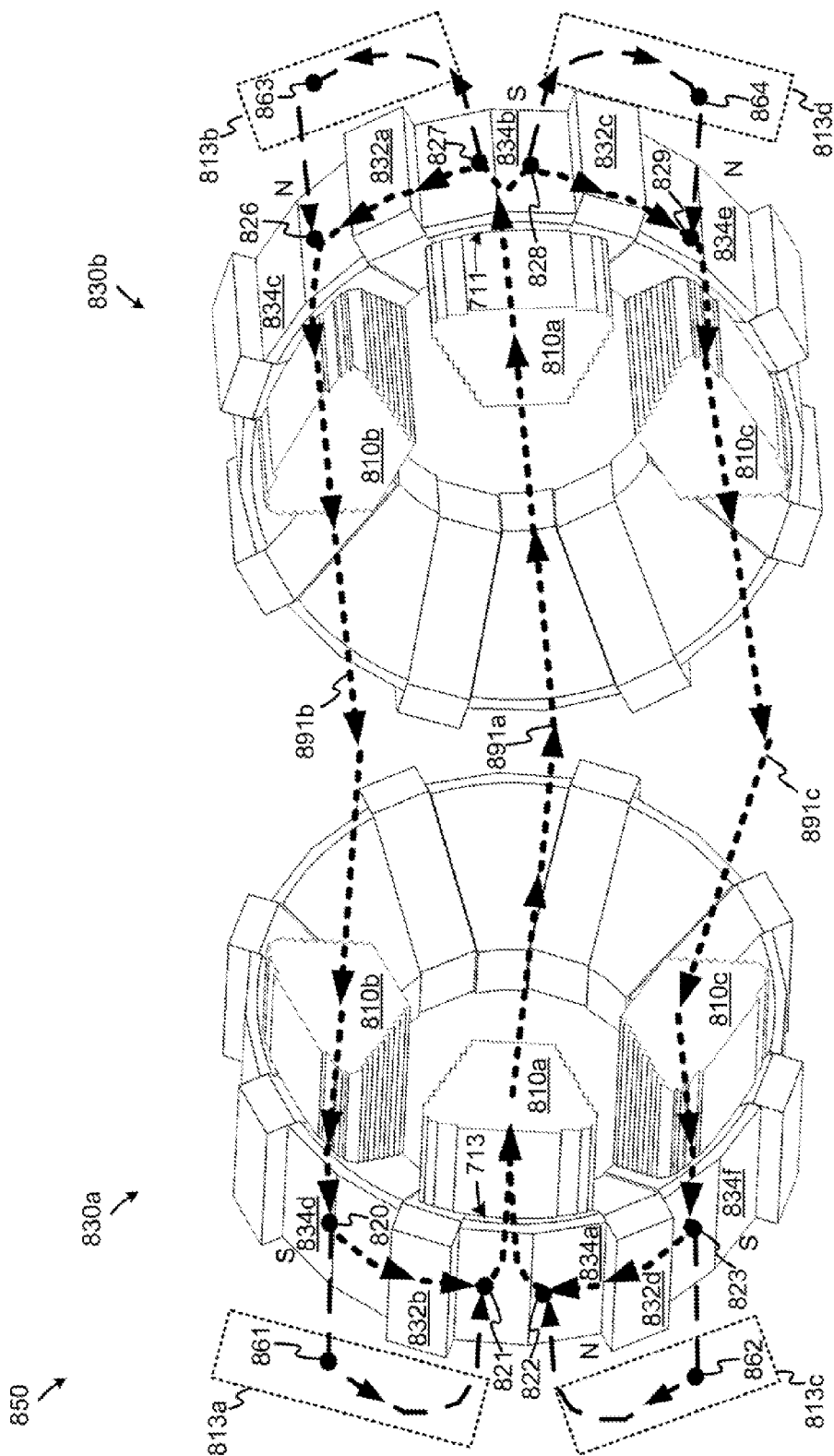
FIG. 8B depicts cross-sections of rotor-stator structure portions illustrating other flux path examples, according to some embodiments.

FIG. 8B depicts cross-sections of rotor-stator structure portions illustrating specific flux path examples, according to some embodiments. Similar to FIG. 8A, diagram 850 includes field pole members 810a, 810b, and 810c disposed between rotor assemblies 830a and 830b. A principal flux path (or portions thereof) is shown to traverse circumferentially through one magnet in a subset of magnets in rotor assembly 830a and circumferentially through another magnet in another subset of magnets in rotor assembly 830b. According to some embodiments, a principal flux path passes through magnets in rotor assemblies that generally provide a predominant amount of flux (e.g., magnet-produced flux), thereby contributing predominantly to flux production (e.g., torque production) relative to other magnetic material, such as boost magnets, which are describe below. To illustrate, consider that a principal flux path (or portions thereof) passes from a point 820 associated with magnetically permeable material 834d through magnet 832b to point 821 associated with magnetically permeable material 834a in rotor assembly 830a. The principal flux path can include flux path portion 891a between points 821 and 827, the principal flux path traversing axially through field pole member 810a. In rotor assembly 830b, the principal flux path (or portions thereof) passes from point 827, which is associated with magnetically permeable material 834b, through magnet 832a to point 826 associated with magnetically permeable material 834c. The principal flux path can include flux path portion 891b between points 826 and 820, the principal flux path traversing axially through field pole member 810b, thereby forming a closed flux path. Another principal flux path is shown to include flux path portions that traverse circumferentially from point 823 through magnet 832d (e.g., as one magnet in a subset of magnets) to point 822 in rotor assembly 830a, and from point 828 through another magnet 832c (e.g., in another subset of magnets) to point 829 in rotor assembly 830b.

FIG. 8B also shows a flux path (or portions thereof) that omits or bypasses magnets 832b and 832d in rotor assembly 830a and magnets 832a and 832c rotor assembly 830b. The flux path traverses predominantly in a circumferential direction that bypasses a magnet in a subset of magnets in either rotor assembly 830a or rotor assembly 830b. Consider the following example in which a flux path (or portions thereof) passes from a point 820 via point 861 to point 821 in rotor assembly 830a, thereby bypassing magnet 832b. Point 861 represents a point associated with a structure 813a that is configured to boost an amount of flux passing along, for example, path portion 891a. Structure 813a can also be configured to provide a magnetic return path. The flux path can then pass axially between points 821 and 827 through field pole member 810a. In rotor assembly 830b, the flux path (or portions thereof) passes from point 827 via a structure 813b including point 863 to point 826. The flux path passes from point 826 to point 820, thereby forming a closed flux path. Another flux path (or portions thereof) is shown to include flux path portions passing from a point 828 via a structure 813d including point 864 to point 829 in rotor assembly 830b, and from point 823 via a structure 813c including point 862 to point 822 in rotor assembly 830a. Note that structures 813a, 813b, 813c, and 813d can include the same or different elements and/or compositions.

Figure 8C:
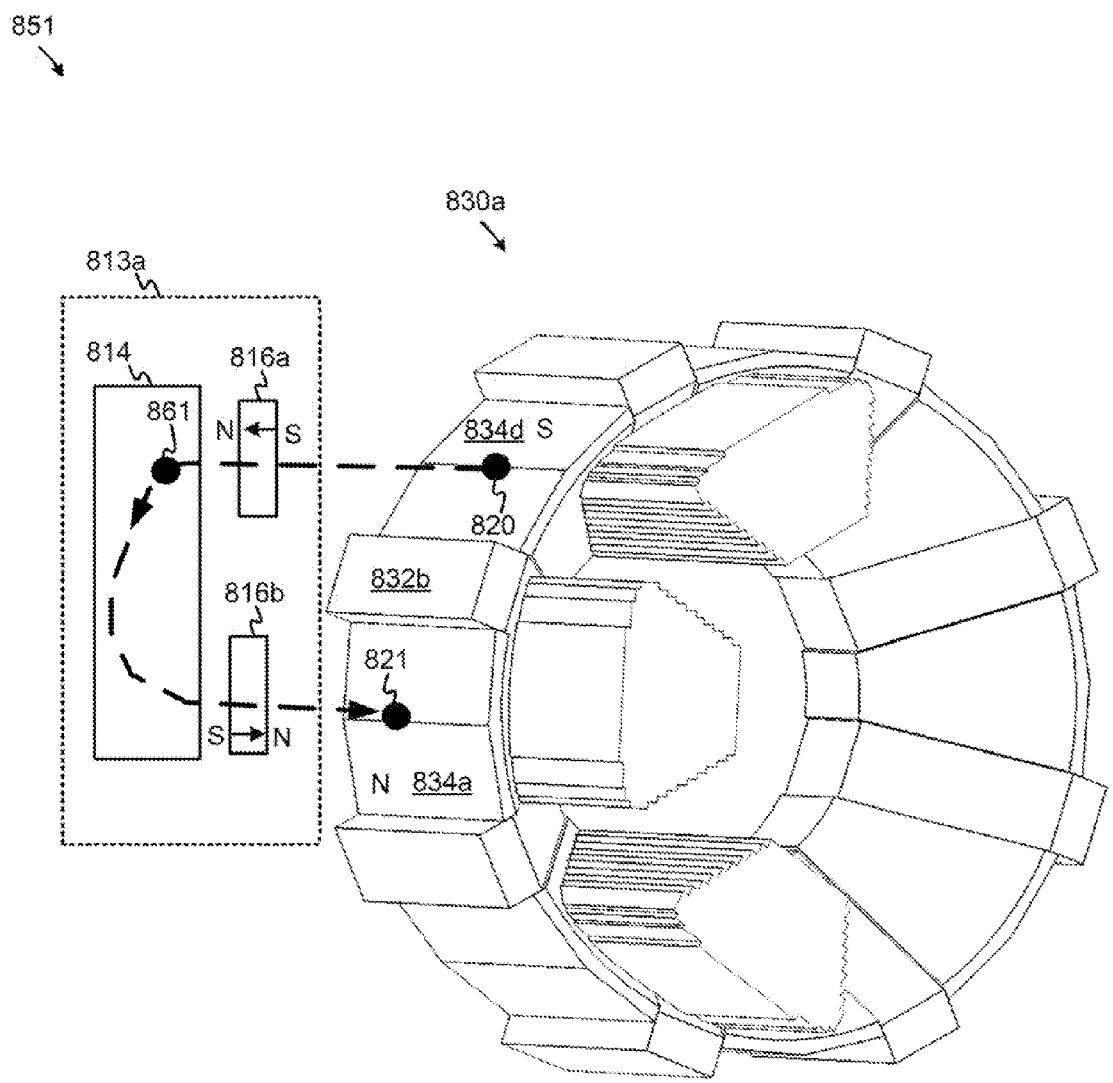
FIG. 8C is a diagram depicting elements of a structure for a rotor assembly, according to some embodiments.

FIG. 8C is a diagram depicting elements of a structure for a rotor assembly, according to some embodiments. Diagram 851 includes rotor assembly 830a, as described in FIGS. 8A and 8B, and a structure 813a. Structure 813a is configured to boost an amount of flux passing along a flux path and to provide a magnetic return path. Further, structure 813a can re-orient that direction of flux passing between points 820 and 821. For example, absence of structure 813a causes flux to pass between points 820 and 821 in a direction opposite than depicted by the arrow (i.e., in a direction from point 821 ("N") to point 820 ("S")). In the example shown, structure 813a includes magnetic material, such as magnets 816a and 816b, and/or a flux conductor shield that provides a magnetic return path and shields external regions from being exposed to stray flux. A flux conductor shield can include magnetically permeable material that, in some cases, can be equivalent to that of field pole members 810a to 810c of FIGS. 8A and 8B. Referring back to FIG. 8C, the directions of polarization for magnets 816a and 816b influence the direction of flux traveling between points 820 and 821. In various embodiments, magnets 816a and 816b can represent axial boost magnets or radial boost magnets (e.g., either inner radial boost magnets or outer radial boost magnets).

Figure 9A:
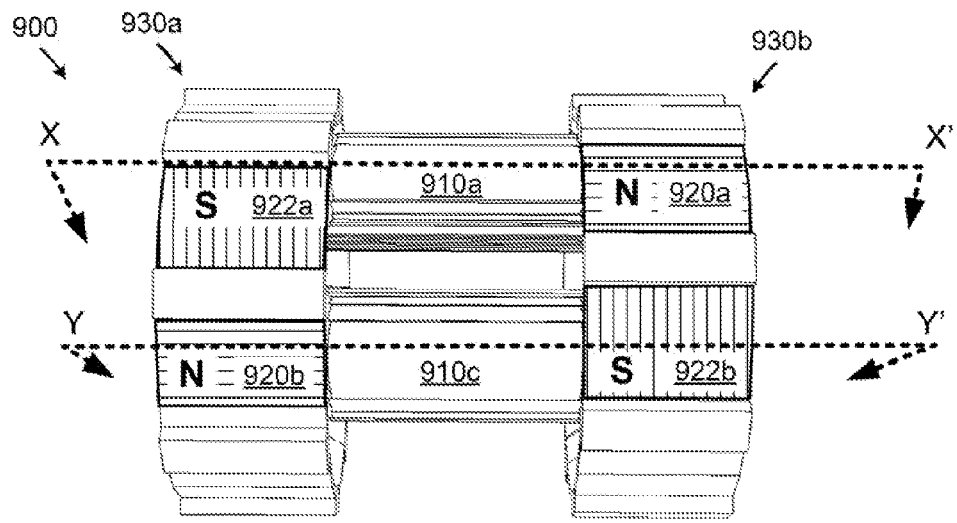
FIGS. 9A to 9C depict cross-sections of a rotor-stator structure portion illustrating examples of one or more flux path portions, according to some embodiments.
Figure 9B:
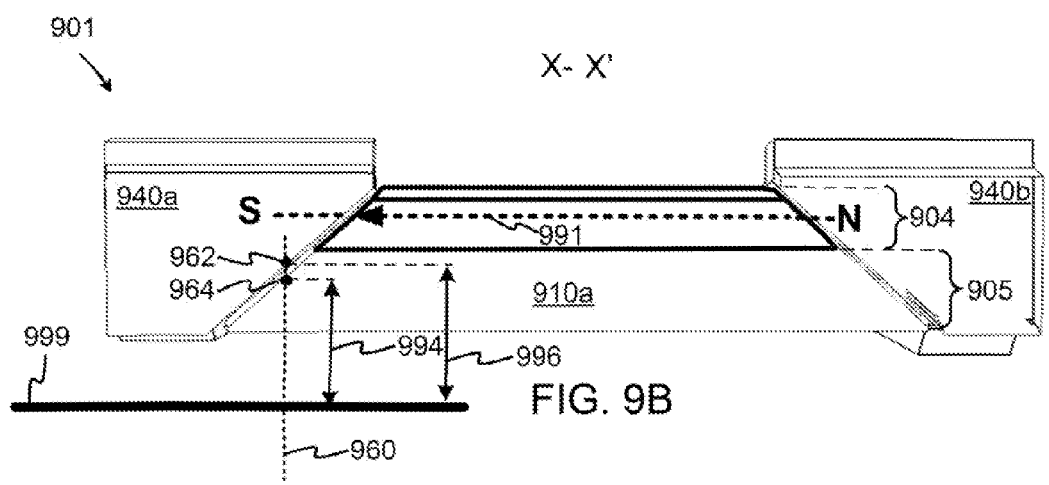
Figure 9C:
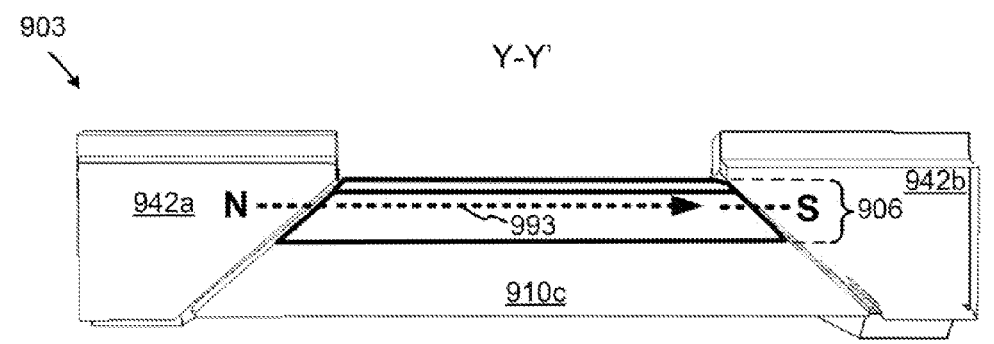

FIGS. 9A to 9C depict cross-sections of a rotor-stator structure portion illustrating examples of one or more flux path portions, according to some embodiments. Diagram 900 depicts cross-sections of field pole members 910a and 910c that are disposed between rotor assemblies 930a and 930b. As shown, cross-section X-X' is a cross-section of field pole member 910a between rotor assemblies 930a and 930b, where cross-section X-X' is a medial plane extending in an axial direction through a south magnetic pole including a magnetically permeable structure ("S") 922a and a north magnetic pole including a magnetically permeable structure ("N") 920a. The medial plane divides field pole member 910a approximately in half (e.g., includes percentages from 50/50 to 60/40 on either side). Similarly, cross-section Y-Y' is a cross-section of field pole member 910c between rotor assemblies 930a and 930b, where cross-section Y-Y' is also a medial plane extending in an axial direction through a north magnetic pole including a magnetically permeable structure ("N") 920b and a south magnetic pole associated with another magnetically permeable structure ("S") 922b. Cross-section Y-Y' divides field pole member 910c approximately in half.

FIG. 9B depicts a cross-section ("X-X") 901 of field pole member 910a in which a flux path portion 991 extends between cross-sections of rotor assemblies 940a and 940b that correspond to magnetically permeable materials 922a and 920a, respectively. In some embodiments, field pole member 910a is configured to provide that flux path portion 991 passes through a portion 904 of field pole member 910a that is located at one or more distances farther than other portions of field pole member 910a, such as a portion 905, from a reference line (e.g., an axis of rotation). Portion 904 of field pole member 910a can have an axial length that is shorter than other portions of field pole member 910a. For example, one or more laminations disposed within portion 904 can have lengths that are shorter than the lengths of laminations that are disposed in other portions of field pole member 910a. Note that a point 962 on the surface of the magnetically permeable structure in the cross-section of rotor assembly 940a can be at a radial distance 996 from a reference line 999 (e.g., the axis of rotation) and a point 964 on the pole face can be at a radial distance 994 from reference line 999, wherein the both points 962 and 964 can lie in a plane 960, which, for example, can be perpendicular to reference line 999. In outer rotor assemblies, radial distance 996 is greater than radial distance 994.

FIG. 9C depicts a cross-section ("Y-Y'") 903 of field pole member 910c in which a flux path portion 993 extends between cross-sections of rotor assemblies 942a and 942b. In some embodiments, field pole member 910c is configured to provide that flux path portion 993 passes through a portion 906 of field pole member 910a similar to flux path portion 991 of FIG. 9B. Note that flux path portion 993 can be representative of either flux path portion 891b or 891c of FIG. 8A, in at least some examples.

Figure 10:
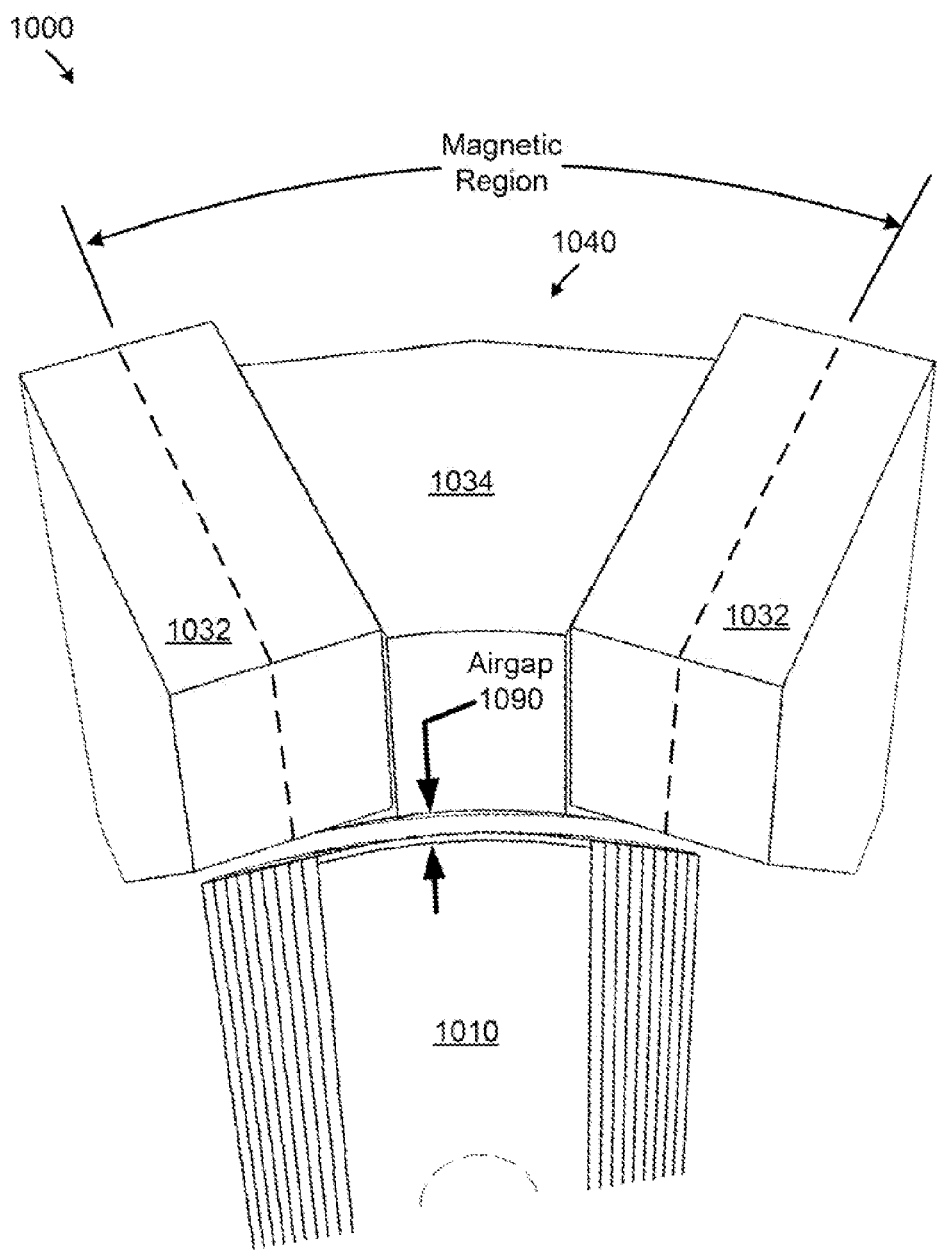
FIG. 10 depicts a view along an air gap formed between a magnetic region and a pole face, according to some embodiments.

FIG. 10 depicts a view along an air gap formed between a magnetic region and a pole face, according to some embodiments. Diagram 1000 is a view of an air gap 1090 along a curved surface (not shown) of, for example, a conically-shaped envelope, whereby the air gap can be coextensive with or located on the curved surface. Further, diagram 1000 also depicts a magnetic region 1040 confronting a pole face of a field pole member 1010, where magnetic region 1040 includes magnets 1032 (or portions thereof) and a magnetically permeable structure 1034. The pole face of field pole member 1010 and magnetic region 1040 (or a portion thereof) establish an air gap 1090. As shown, the surface of the pole face includes a curved surface between a side of field pole member 1010 near one of magnets 1032 and the other side of field pole member 1010 near another magnet 1032.

FIGS. 11A to 11C depict various views of a field pole member, according to some embodiments. FIG. 11A is a top view of a field pole member 1110 that includes pole faces 1114a and 1114b, and pole core 1111. As illustrated, pole face 1114a includes dashed lines to represent the contours indicating a convex surface. Note that the dashed lines representing the contours can represent the use of laminations to form field pole member 1110, and the dashed lines can represent any number of laminations that can be used to form pole faces 1114a and 1114b, as well as field pole member 1110. FIG. 11B is a perspective view of field pole member 1110 including at least a pole face 1114a, with field pole member 1110 being formed with a stack 1174 of laminations. Line 1170 can represent a flux path passing through a portion 1172 of field pole member 1110 shown in FIG. 11C. Portion 1172 is an axial portion or cross-section portion located at a distance from an axis of rotation. In some embodiments, portion 1172 is an axial portion that has dimensions to facilitate a reduction in flux density to reduce losses that otherwise might accompany a higher flux density. FIG. 11C is a diagram 1150 showing a cross-section view 1120 and a side view 1130 of field pole 1110. Cross-section view 1120 depicts a stack of laminations that at the lower portions have a width, W2, with the laminations increasing in width up to, for example, width, W1, for the upper portions of laminations. Cross-section view 1120 can lie in a plane that is perpendicular to the axis of rotation, but it need not (e.g., the cross-section can be perpendicular to the direction of flux generated in a coil region and in the direction of AT flux-generated). In some embodiments, an axial portion 1160 includes, for example, one or more laminations having a width W1 in a plane perpendicular to the axis of rotation at a radial distance 1196 (e.g., an average radial distance of the radial distances for each of the laminations associated with axial portion 1160) from a reference line 1199 (e.g., the axis of rotation), and an axial portion 1162 can include one or more laminations having a width W2 can be located at a radial distance 1194 (e.g., an average radial distance of the radial distances for each of the laminations associated with axial portion 1162). Note that in the example shown, radial distance 1196 is greater than radial distance 1194. Further, note that axial portion 1160 has an axial length 1190 extending between two pole faces 1114a and 1114b at approximately at radial distance 1196, and axial portion 1162 has an axial length extending between the two pole faces at approximately radial distance 1194, where axial length 1190 is less than the axial length at radial distance 1194. This can facilitate a reduction in losses that otherwise might accompany longer laminations. Note that widths W1 and W2 can represent average widths of laminations or flux conductors in the respective axial portions.

Figure 12:
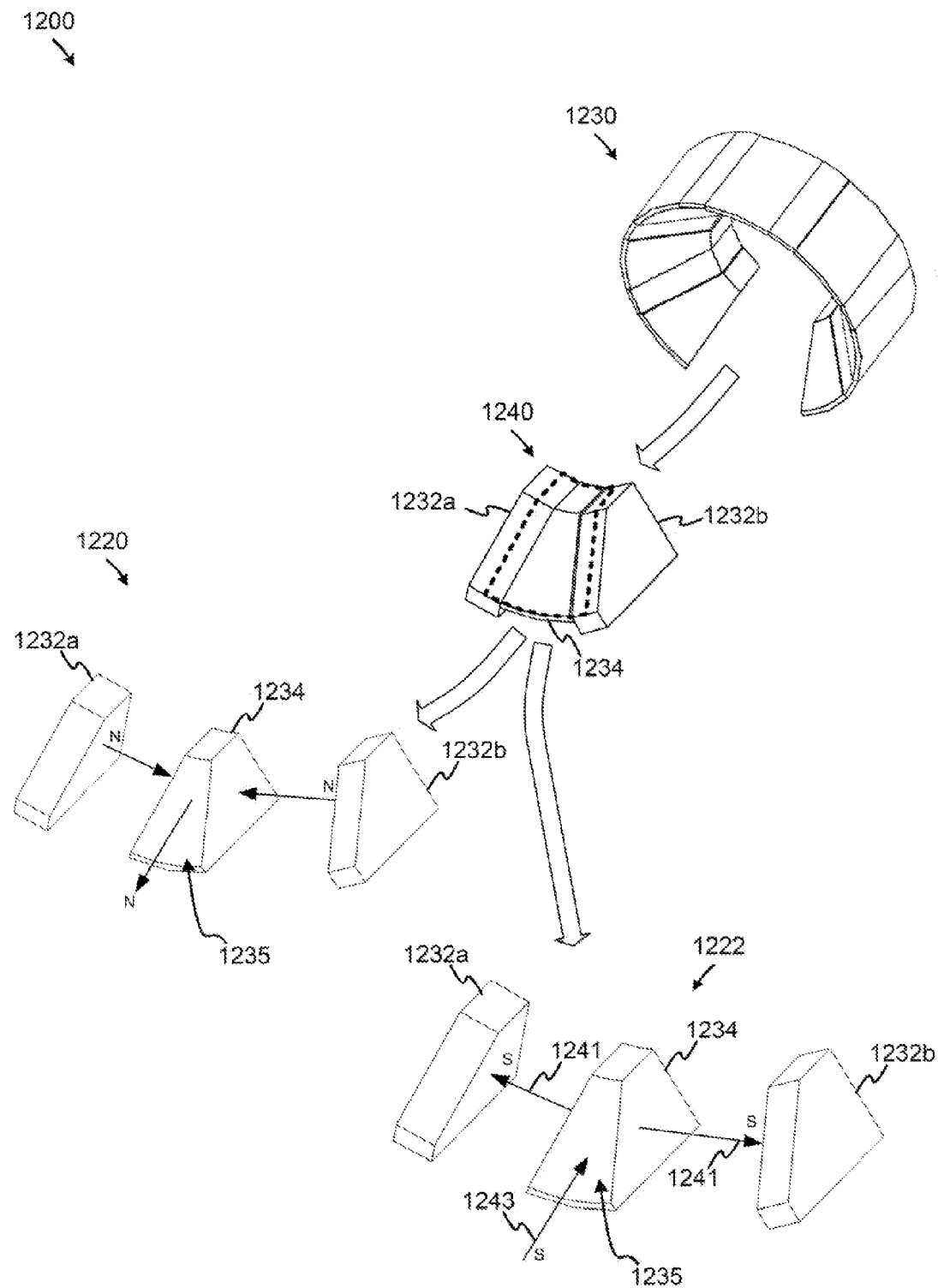
FIG. 12 depicts a magnetic region of a rotor assembly as either a north pole or a south pole, according to some embodiments.

FIG. 12 depicts a magnetic region of a rotor assembly as either a north pole or a south pole, according to some embodiments. Diagram 1200 depicts a magnetic region 1240 of a rotor assembly 1230, with magnetic region 1240 (e.g., as shown by the dashed line) including magnets 1232a and 1232b and magnetically permeable material 1234. Magnetic region 1240 can be configured as either a north pole 1220 or a south pole 1222. North pole 1220 can be implemented as magnetically permeable material 1234 with or without magnets 1232a and 1232b. As shown, magnets 1232a and 1232b can be polarized such that their north poles are oriented toward or substantially toward the sides of magnetically permeable structure 1234. In some embodiments, the polarization of magnets 1232a and 1232b can be in a direction substantially orthogonal to a line extending axially between two pole faces of the same field pole member. As shown, the surfaces of magnets 1232a and 1232b can be polarized as north poles and the flux therefrom enters magnetically permeable material 1234 in a manner that surface 1235 is a north pole (or is substantially a north pole) for rotor assembly 1230. Or, south pole 1222 can be implemented as magnetically permeable material 1234 with or without magnets 1232a and 1232b, with magnets 1232a and 1232b having their south poles oriented toward or substantially toward the sides of magnetically permeable structure 1234. In some embodiments, the polarization of magnets 1232a and 1232b can be in a circumferential direction, which is substantially orthogonal to a line extending axially between two pole faces of the same field pole member (not shown). For example, the directions of polarization 1241 can be substantially orthogonal to a line 1243 extending axially between two pole faces of the same field pole member. As shown, the surfaces of magnets 1232a and 1232b can be polarized as south poles, whereby the flux enters magnetically permeable material 1234 through surface 1235 in a manner that surface 1235 is a south pole (or is substantially a south pole) for rotor assembly 1230.

Figure 13A:
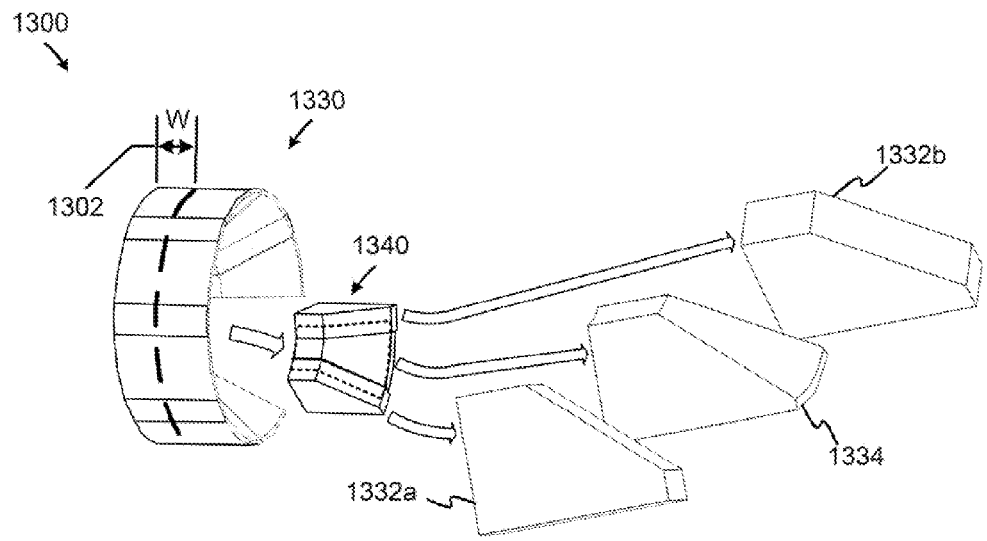
FIGS. 13A to 13C depict implementations of a magnet and magnetically permeable material to form a magnetic region of a rotor assembly, according to some embodiments.
Figure 13B:
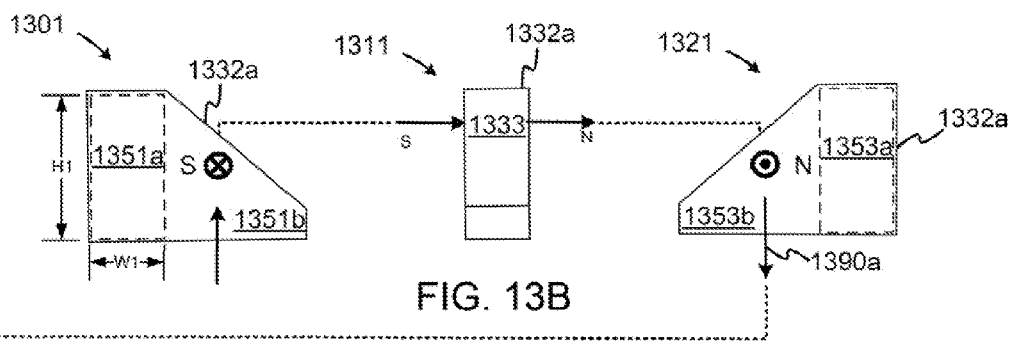
Figure 13C:
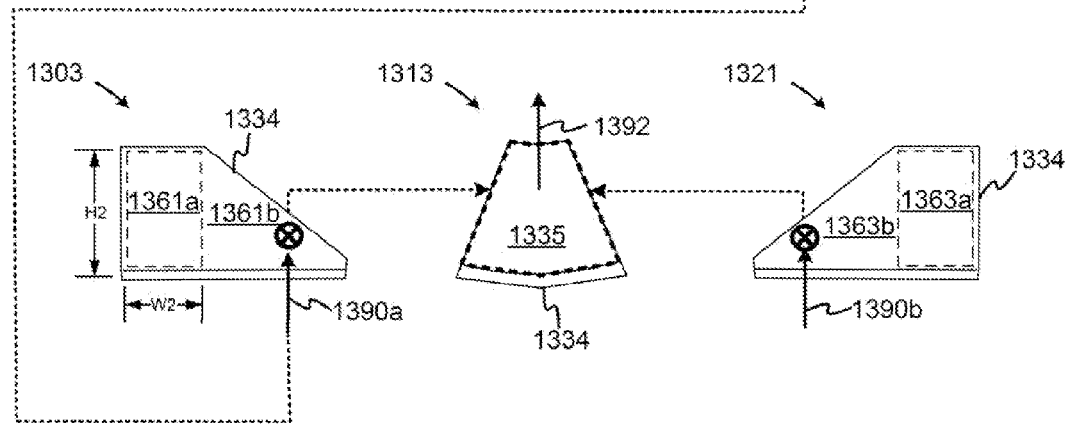

FIGS. 13A to 13C depict implementations of a magnet and magnetically permeable material to form a magnetic region of a rotor magnet or rotor assembly, according to some embodiments. Diagram 1300 of FIG. 13A depicts a magnetic region 1340 of a rotor assembly 1330, with magnetic region 1340 including magnets 1332a and 1332b and magnetically permeable material 1334. In some embodiments, the magnetic material in rotor assembly 1330 has a portion ("W") 1302 of an axial length dimension that is configurable to modify an amount of flux density passing through at least the surface of magnetically permeable structure 1334.

FIG. 13B illustrates various views of a magnet 1332a, according to an embodiment. View 1301 is a side view of magnet 1332a showing a side that is polarized as a south pole ("S"). As shown, magnet 1332a has a side portion 1351b configured as a south pole in which flux enters. Further, magnet 1332a also includes an axial extension area 1351a that can be configured to increase an amount of flux passing through the surface of magnetically permeable structure 1334. The amount of flux can be varied by modifying either the width, W1, or the height, H1, or both, of axial extension area 1351a. As such, an axial extension area can be configured to increase an amount of flux passing through the surface of magnetically permeable structure 1334. View 1311 depicts a front view of surface 1333 configured to confront a pole face, according to an embodiment. As shown, magnet 1332a has a surface polarized in one direction (e.g., as a north pole), and another surface polarized in direction indicative of a south pole. View 1321 is a side view of magnet 1332a showing a side that is polarized as a north pole ("N"). As shown, magnet 1332a has a side portion 1353b configured as a north pole in which flux emanates. Further, magnet 1332a also includes an axial extension area 1353a that can be configured to increase an amount of flux passing through the surface of magnetically permeable structure 1334. The amount of flux can be varied by modifying either the width, W1, or the height, H1, or both, of axial extension area 1353a or axial extension area 1351a of view 1301, both of which may be the same area. Flux 1390a can emanate normal to surface portion 1353b as shown.

FIG. 13C illustrates various views of magnetically permeable material 1334, according to an embodiment. View 1303 is a side view of magnetically permeable material 1334 showing a side of magnetically permeable material 1334 that is configured to be disposed adjacent a side of magnet 1332a to receive flux 1390a from a north pole associated with side portion 1353b of FIG. 13B. In this view, magnetically permeable material 1334 includes a side portion 1361b configured to be adjacent to side portion 1353b of FIG. 13B and an axial extension area 1361a that is configured to be adjacent to axial extension area 1353a. Axial extension area 1361a includes a width, W2, or the height, H2, that can be modified (as can axial extension areas 1351a and 1353a) to enhance the flux density passing through the surface of magnetically permeable material 1334 to implement a magnet pole. Similarly, view 1321 is another side view of magnetically permeable material 1334 showing another side that also is configured to be disposed adjacent another side portion of a magnet not shown to receive flux 1390b from another north pole (e.g., from magnet 1332b). In this side view 1321, magnetically permeable material 1334 includes a side portion 1363b configured to be adjacent to another side portion and another axial extension area of another magnet not shown. View 1313 depicts a front view of surface 1335 configured to confront a pole face, according to an embodiment. As shown, magnetically permeable material 1334 has a surface 1335 configured to operate as a pole, such as a north pole, to provide flux 1392, the flux originating from magnets adjacent to the sides shown in views 1303 and 1321. In some embodiments, the surface of magnetically permeable structure 1334 is configured to include a greater density of flux than a surface of magnet 1332a or magnet 1332b. In various embodiments, the areas of the sides of magnet 1332a and magnet 1332b are collectively greater than the surface area of surface 1335.

Figure 13D:
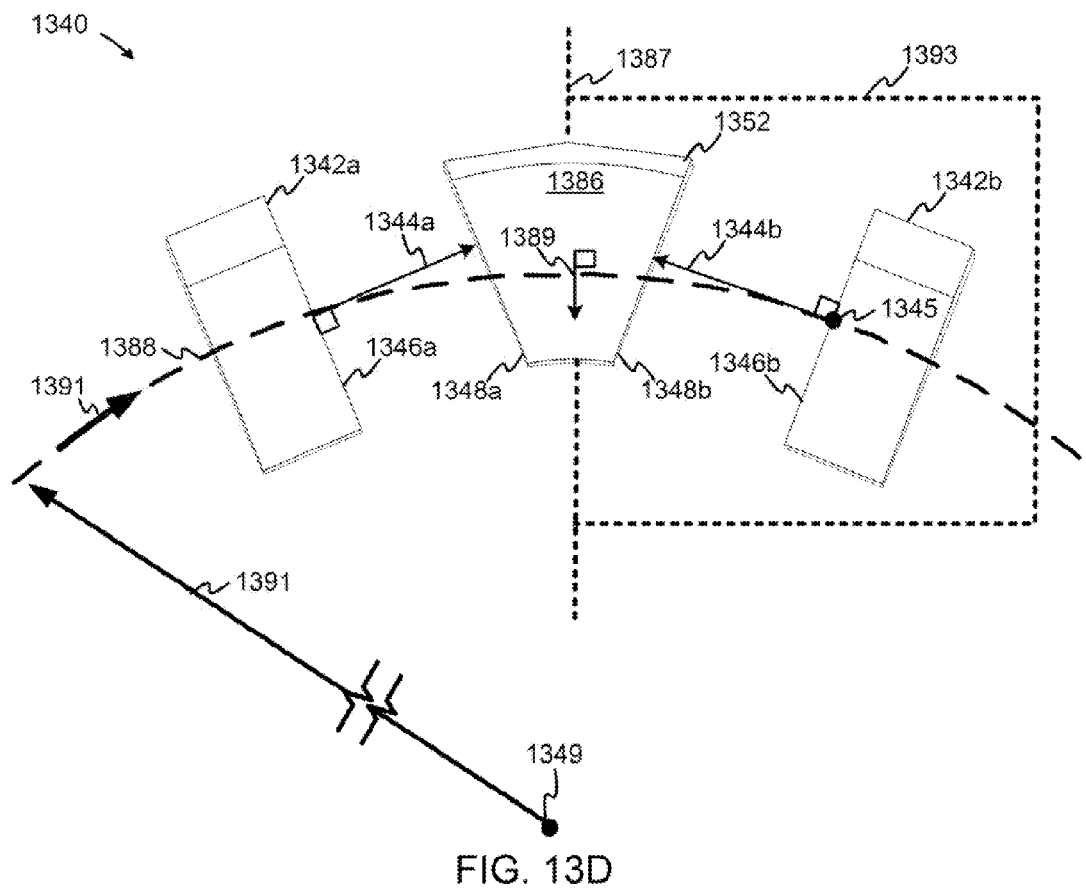
FIGS. 13D to 13E depict examples of various directions of polarization and orientations of surfaces for magnets and magnetically permeable material that form a magnetic region of a rotor assembly, according to some embodiments.
Figure 13E:
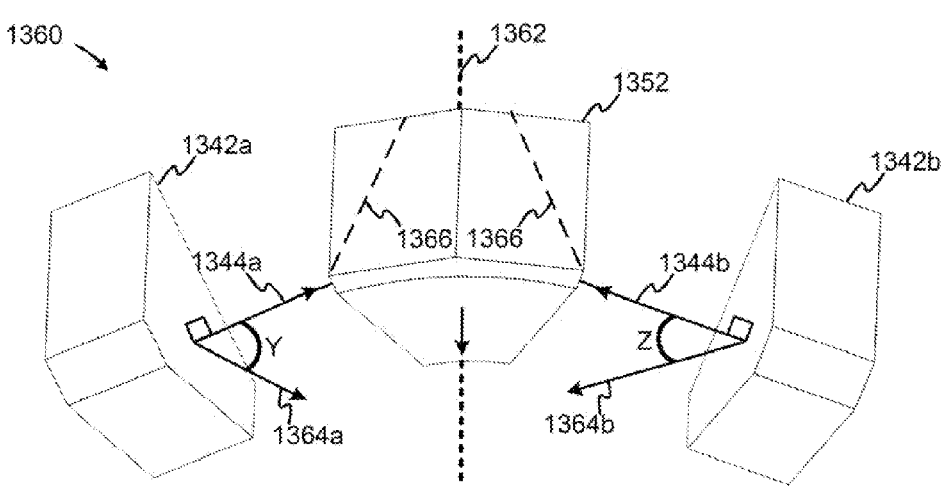

FIGS. 13D to 13E depict examples of various directions of polarization and orientations of surfaces of magnets and magnetically permeable material that form a magnetic region of a rotor magnet or rotor assembly, according to some embodiments. Diagram 1340 of FIG. 13D depicts a front view of magnets 1342a and 1342b, and magnetically permeable material 1352 arranged radially about a centerline 1349. In at least some embodiments the directions of polarization are normal to the surfaces of either magnet surfaces or the surfaces of the magnetically permeable material, or both. In some embodiments, rays 1344a and 1344b can represent the directions of polarization for magnets 1342a and 1342b. For example, a direction of polarization can be represented by ray 1344b extending from a point 1345 (in space or relative to magnet surface), which can lie on a circle centered on a centerline (e.g., the axis of rotation). A portion 1388 of the centered circle is shown in dashed lines. The direction of polarization can be oriented tangent to the circle in a plane centered on the centerline to produce flux in a circumferential direction. Thus, rays 1344a and 1344b can represent the directions of polarization for magnets 1342a and 1342b relative to the magnet surfaces 1346a and 1346b. Directions of polarization for magnets 1342a and 1342b give rise to flux path portions representing flux passing circumferentially (i.e., the flux passes along a path circumscribed by a circle portion 1388 at a radial distance 1391 from centerline 1349). Thus, magnets 1342a and 1342b can be configured to generate magnet flux along a circumferential flux path portion. According to some embodiments, magnets 1342a and 1342b are magnetized such that the directions of polarization for magnets 1342a and 1342b are normal to the surfaces 1346a and 1346b, the normal vectors depicting the orientation of the surfaces 1346a and 1346b as represented by rays 1344a and 1344b. But magnets 1342a and 1342b can be magnetized such that the directions of polarization for magnets 1342a and 1342b can be at an angle to the surfaces 1346a and 1346b (i.e., at an angle to a normal or a normal vector representing the direction of the surfaces of the magnets). According to some embodiments, a direction of polarization for a magnetic material, such as that in magnet 1342b, can lie in a first plane 1393 perpendicular or substantially perpendicular to a second plane (e.g., plane 1387) including centerline 1349 and a normal vector 1389 emanating from a point on confronting surface 1386 of magnetically permeable material 1352, whereby second plane 1387 radially bisects magnetically permeable material 1352. Confronting surface 1386 is configured to confront a pole face of a field pole member.

In some embodiments, portions of the flux paths can be directed substantially between a first point of entry into (or exit from) a magnet and a second point of exit from (or entry to) the magnet. Thus, the portions of flux paths may be relatively straight (but need not be) within the magnetic material. For example, flux can pass substantially straight through a magnetic material such that it exits (or enters) the magnetic material corresponding to a direction of polarization. In some embodiments, portions of the flux path can originate from either surface 1346a or 1346b. Flux can pass into magnetically permeable material 1352, with its direction being altered such that it exits a surface of magnetically permeable material 1352 along, for example, a non-straight or curved flux path portion. In some examples, the flux path or flux path portions in magnetically permeable material 1352 can include non-straight portions between a surface of magnetically permeable material 1352 adjacent to a magnet and a surface of magnetically permeable material 1352 adjacent a pole face.

In some embodiments, rays 1344a and 1344b can represent the directions of flux paths (or flux path portions) between a magnet and a magnetically permeable material. For example, rays 1344a and 1344b can represent a portion of a flux path at or near the interface between the magnet and the magnetically permeable material. In some embodiments, rays 1344a and 1344b can be coextensive with flux paths (or flux path portions) passing through an interface between a magnet and a magnetically permeable material. Note that the depiction of flux paths as rays 1344a and 1344b in FIGS. 13D and 13E is not intended to be limiting. For example, flux paths (or portions thereof) represented by rays 1344a and 1344b can be at any angle in any direction between a magnet and a magnetically permeable material (other than 0 degrees from or parallel to a plane including a centerline 1349 and the magnet surface) and may include straight portions and/or curved portions. While magnet surfaces 1346a and 1346b and surfaces 1348a and 1348b are depicted as being coextensive with planes parallel to centerline 1349, these surfaces are not intended to be limiting. Surfaces 1346a and 1346b and surfaces 1348a and 1348b can be coextensive with planes that are at non-zero angles to centerline 1349.

Diagram 1360 of FIG. 13E depicts a perspective view of magnets 1342a and 1342b and magnetically permeable material 1352 arranged radially about a centerline 1362. Thus, rays 1364a and 1364b can represent the directions of polarization for magnets 1342a and 1342b and/or general directions of flux paths relative to (e.g., at angles Y and Z) the rays 1364a and 1364b, which represent either normal vectors to magnet surfaces or a tangent to a circle centered on centerline 1349 and passing through a point in space, such as point 1345 of FIG. 13D. Angles Y and Z can represent any angle ranging from 0 to 65 degrees from rays 1364a and 1364b (i.e., 90 to 25 degrees from a magnet surface). According to some embodiments, the term "substantially perpendicular," when used to describe, for example, a direction of polarization, can refer to a range of angles from a line portion, such as a normal vector, that is 90 degrees to at least a portion of a magnet surface. Or the range of angles can be referenced from the flux path formed between the surface of magnetically permeable material and a pole face. In one example, a range of angles can include any angle from 0 to 65 degrees relative to a normal vector (i.e., 90 to 25 degrees from a magnet surface portion). In some embodiments, surfaces 1346a and 1346b and surfaces 1348a and 1348b of FIG. 13D can be coextensive with planes that are at angles to centerline 1362 (or a plane including centerline 1362). For example, FIG. 13E depicts that the sides or surfaces of magnetically permeable material 1352 can be configured as surfaces 1366, which are coextensive with planes (not shown) at angles to centerline 1362. Surface 1366 can increase the surface area of the sides of magnetically permeable material 1352, and may enhance the amount of flux passing through the surface of magnetically permeable material 1352 that is configured to confront pole faces. According to various embodiments, directions of polarization and/or flux path portions may or may not vary from the directions of surfaces 1346a and 1346b of magnets or magnetic material and/or or surfaces 1348a and 1348b of magnetically permeable material. Further, directions of surfaces 1346a and 1346b of magnets or magnetic material and/or or surfaces 1348a and 1348b of magnetically permeable material may or may not be flat and/or may or may not be oriented in planes that at an angle to a plane including the axis of rotation. According to some embodiments, the term "substantially normal," when used to describe, for example, a direction of orientation for a magnet surface, can refer to a range of angles from a line that is 90 degrees to a tangent plane having at least a point on the magnet surface. Examples of angles in the range of angles include any angle from 0 to 65 degrees relative to a normal vector.

Figure 14:
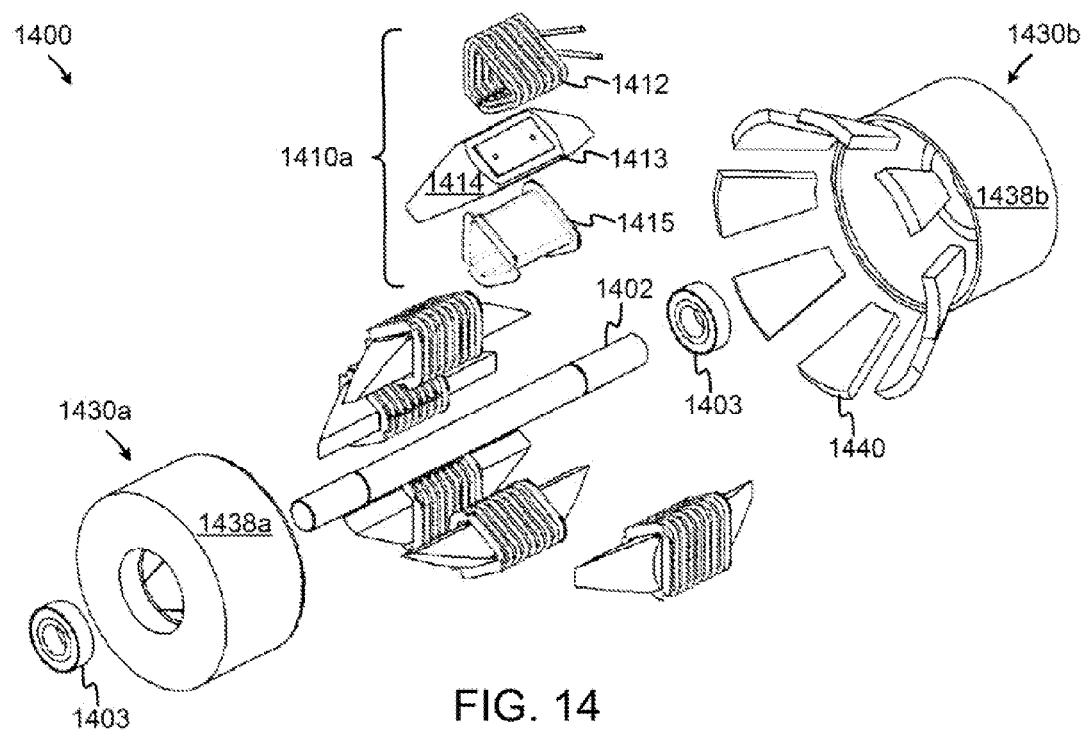
FIG. 14 is an exploded view of a rotor-stator structure including rotor assemblies in accordance with some embodiments.

FIG. 14 is an exploded view of a rotor-stator structure 1400 including rotor assemblies in accordance with some embodiments. FIG. 14 depicts a rotor assembly including at least two rotor assemblies 1430a and 1430b mounted on or affixed to a shaft 1402 such that each of rotor assemblies 1430a and 1430b are disposed on an axis of rotation that can be defined by, for example, shaft 1402. A stator assembly can include active field pole members 1410a arranged about the axis. An active field pole member 1410a can include a coil 1412, a field pole member 1413 having pole faces 1414, and a bobbin 1415. A subset of pole faces 1414 of active field pole members 1410a can be positioned to confront the arrangement of magnetic regions 1440 in rotor assemblies 1430a and 1430b to establish air gaps. In some embodiments, magnetic regions 1440 can represent one or more surface magnets. Rotor assemblies 1430a and 1430b can respectively include support structure 1438a and support structure 1438b. Further, bearings 1403 can be disposed within an axial length between the ends of rotor assemblies 1430a and 1430b of rotor-stator structure 1400.

Figure 15:
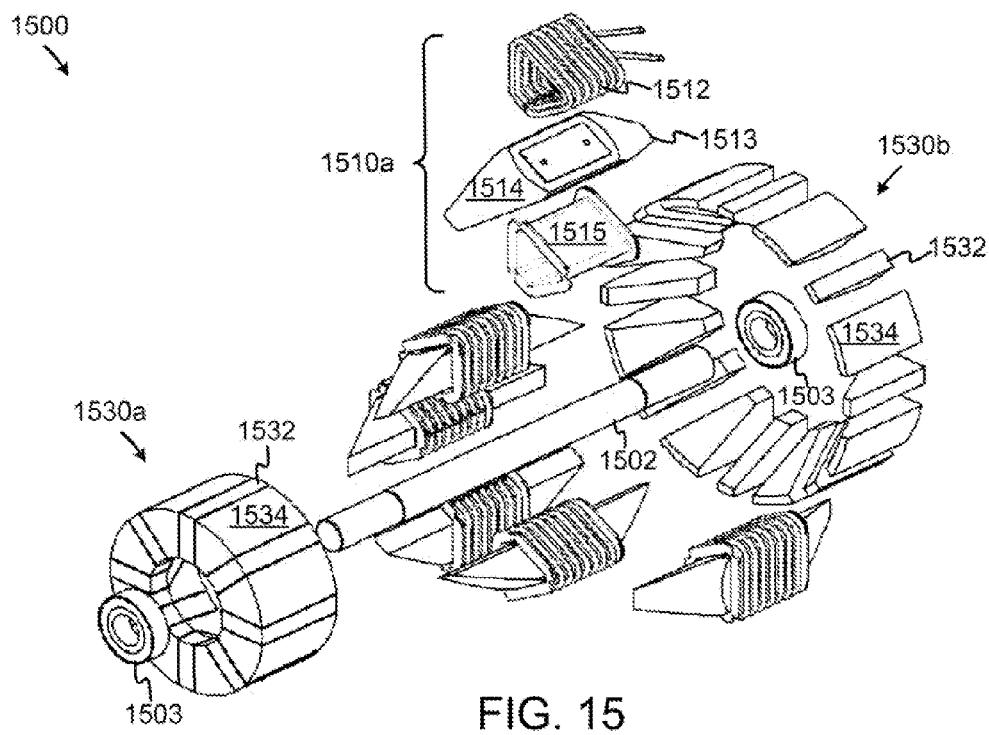
FIG. 15 is an exploded view of a rotor-stator structure including rotor assemblies in accordance with some embodiments.

FIG. 15 is an exploded view of a rotor-stator structure 1500 including rotor assemblies in accordance with some embodiments. FIG. 15 depicts a rotor assembly including at least two rotor assemblies 1530a and 1530b mounted on or affixed to a shaft 1502 such that each of rotor assemblies 1530a and 1530b are disposed on an axis of rotation that can be defined by, for example, shaft 1502. A stator assembly can include active field pole members 1510a arranged about the axis. An active field pole member 1510a can include a coil 1512, a field pole member 1513 having pole faces 1514, and a bobbin 1515. A subset of pole faces 1514 of active field pole members 1510a can be positioned to confront the arrangement of magnetic regions including magnets 1532 and magnetically permeable structures 1534 in rotor assemblies 1530a and 1530b to establish air gaps. Further, bearings 1503 can be disposed within an axial length between the ends of rotor assemblies 1530a and 1530b of rotor-stator structure 1500.

FIG. 16 is an exploded view of a rotor-stator structure 1600 including inner rotor assemblies in accordance with some embodiments. FIG. 16 depicts a rotor assembly including at least two inner rotor assemblies 1630a and 1630b mounted on or affixed to a shaft 1602 such that each of inner rotor assemblies 1630a and 1630b are disposed on an axis of rotation that can be defined by, for example, shaft 1602. FIG. 16 depicts boundaries 1603 of conically-shaped spaces in which magnetic regions 1690 are disposed. Pole faces 1614 are disposed or arranged outside boundaries 1603 of conically-shaped spaces. Thus, magnetic regions 1690 are coextensive with an interior surface of a cone, whereas pole faces 1614 are coextensive with an exterior surface of a cone). A stator assembly 1640 can include active field pole members 1610$a$, 1610$b$, and 1610$c$ arranged about the axis. An active field pole member 1610$a$ can include a coil 1612 and pole faces 1614 formed at the ends of field pole member 1611$a$. A subset of pole faces 1614 of active field pole members 1610 can be positioned to confront the arrangement of magnetic regions 1690 that can either include surface magnets (e.g., magnetic material, including permanent magnets) and/or can include a combination of magnetic material (e.g., including permanent magnets) and magnetically permeable structures as internal permanent magnets ("IPMs") in rotor assemblies 1630$a$ and 1630$b$ to establish air gaps. Rotor assemblies 1630$a$ and 1630$b$ can respectively include support structure 1638$a$ and support structure 1638$b$.

Figure 17:
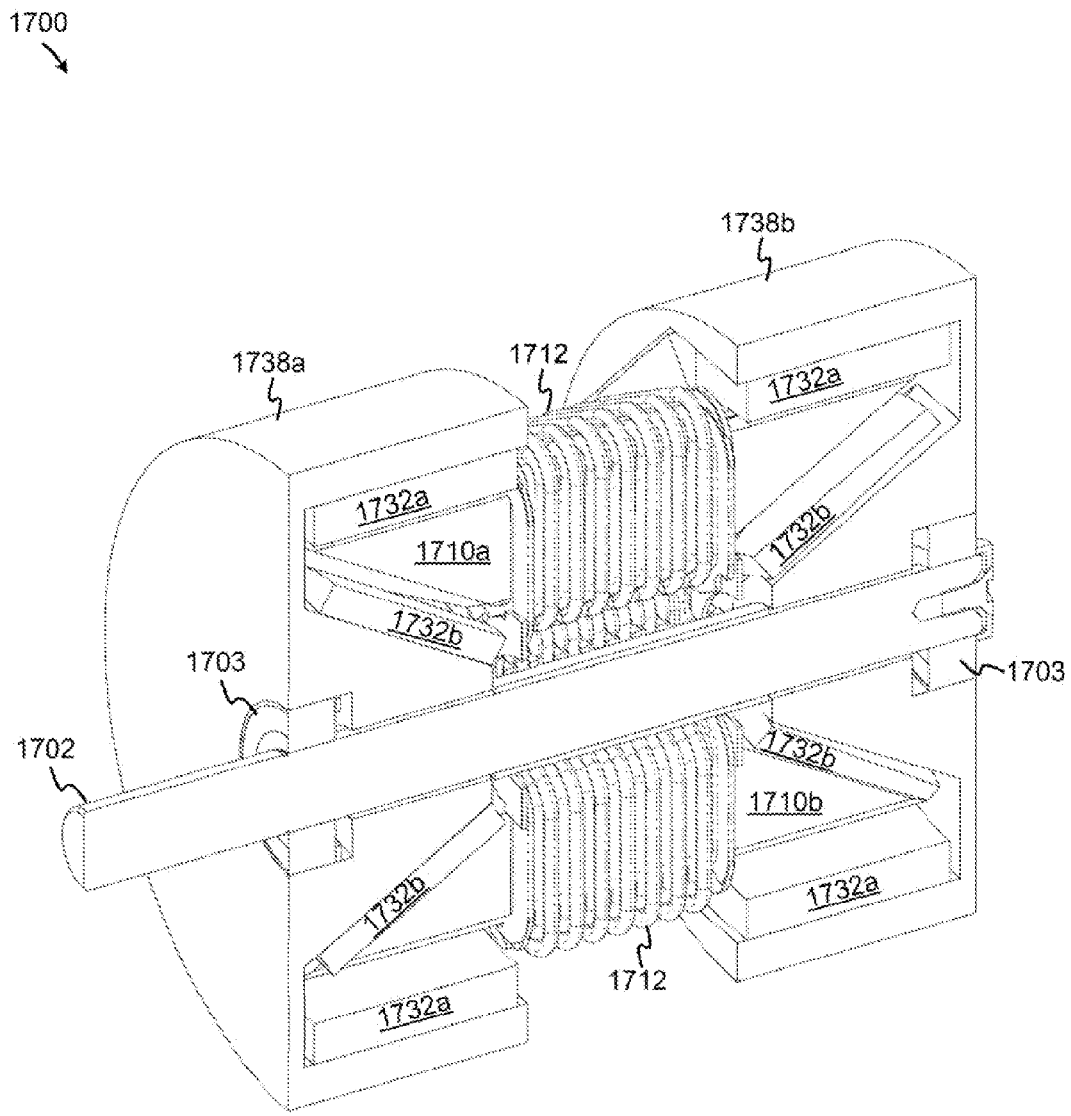
FIG. 17 is a cross-section view of a rotor-stator structure including both outer and inner rotor assemblies in accordance with some embodiments.

FIG. 17 is a cross-section view of a rotor-stator structure including both outer and inner rotor assemblies in accordance with some embodiments. A rotor assembly including at least two rotor assemblies 1738$a$ and 1738$b$ mounted on or affixed to a shaft 1702 such that each of inner rotor assemblies includes magnetic regions 1732$b$ that are disposed on an axis of rotation that can be defined by, for example, shaft 1702. Further, rotor assemblies 1738$a$ and 1738$b$ can also include magnetic regions 1732$a$ of outer rotor assemblies. A stator assembly can include active field pole members 1710$a$ and 1710$b$ arranged about the axis, both of which include coils 1712. A subset of pole faces of active field pole members 1710 can be positioned to confront the arrangement of magnetic regions 1732$a$ and 1732$b$ that can either include surface magnets or can include magnets and magnetically permeable structures as internal permanent magnets in rotor assemblies 1738$a$ and 1738$b$ to establish air gaps. Rotor assemblies 1738$a$ and 1738$b$ can respectively include support structures and bearings 1703.

Figure 18A:
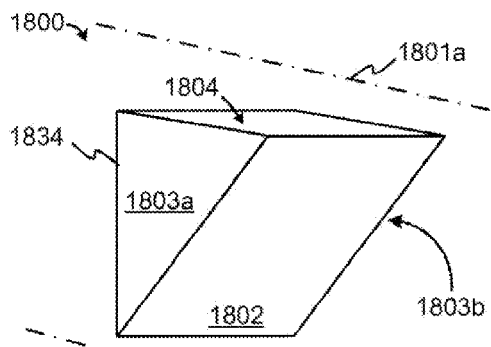
FIGS. 18A to 18G depict various views of an example of a magnetically permeable structure (and surfaces thereof) with various structures of magnetic material, according to some embodiments.
Figure 18B:
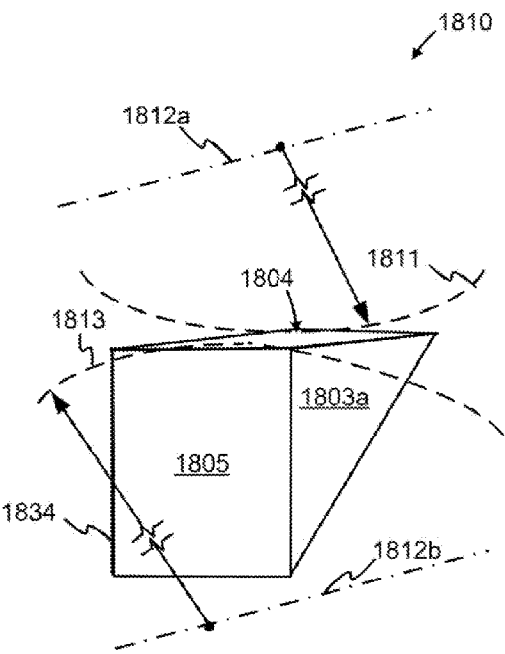
Figure 18C:
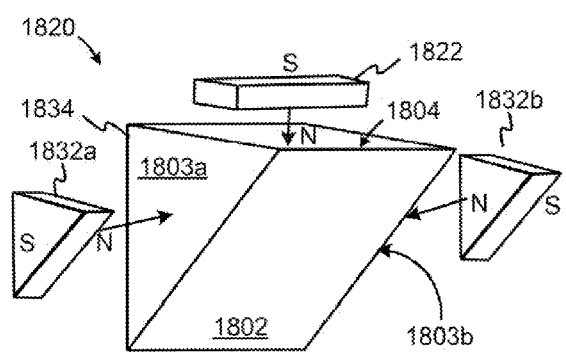

FIGS. 18A to 18D depict various views of an example of a magnetically permeable structure (and surfaces thereof) with various structures of magnetic material, according to some embodiments. FIG. 18A is a front perspective view 1800 of an example of a magnetically permeable structure 1834 configured for use in inner and outer rotor assemblies. Magnetically permeable structure 1834 includes one or more confronting surfaces and a number of non-confronting surfaces. A "confronting surface" of a magnetically permeable structure is, for example, a surface configured to confront or face an air gap, a pole face, a field pole member, a stator assembly, or the like, whereas a "non-confronting surface" of a magnetically permeable structure is, for example, a surface configured to confront or face structures other than a pole face, according to various embodiments. A "non-confronting surface" can be configured to face or confront magnetic material. In the example shown, magnetically permeable structure 1834 includes a confronting surface 1802 and a number of non-confronting surfaces 1803$a$, 1803$b$, and 1804. Magnetic material can be disposed adjacent surfaces 1803$a$ and 1803$b$, whereby the magnetic material can be polarized in a direction into (or out from) surfaces 1803$a$ and 1803$b$. Therefore, non-confronting surfaces 1803$a$ and 1803$b$ can include or can be on a flux path portion of a flux path passing through field pole members (not shown), magnetically permeable structure 1834, and the magnetic material adjacent to non-confronting surfaces 1803$a$ and 1803$b$. Non-confronting surface 1804 can be referred to as a "radial non-confronting surface," as its surface area is disposed generally at a radial distance. Note that magnetically permeable structure 1834 can be configured to form magnetic regions in either inner or outer rotor assemblies. For example, if magnetically permeable structure 1834 is implemented in an outer rotor assembly, then magnetically permeable structure 1834 rotates about an axis 1801$b$, whereas if magnetically permeable structure 1834 is implemented in an inner rotor assembly, then magnetically permeable structure 1834 rotates about an axis 1801$a$.

FIG. 18B is a rear perspective view 1810 of an example of magnetically permeable structure 1834 including an axial non-confronting surface for either inner or outer rotor assemblies, according to one embodiment. As shown, magnetically permeable structure 1834 includes a non-confronting surface 1805 that can be referred to as an "axial non-confronting surface." Note that if magnetically permeable structure 1834 is implemented in an outer rotor assembly, then magnetically permeable structure 1834 rotates along circle 1813 about an axis 1812$b$, whereas if magnetically permeable structure 1834 is implemented in an inner rotor assembly, then magnetically permeable structure 1834 rotates on circle 1811 about an axis 1812$a$.

FIG. 18C is a front perspective view 1820 of an example of an arrangement of a magnetically permeable structure 1834 and magnetic structures, according to one embodiment. As shown, a subset of magnetic structures including magnetic material, such as magnetic structures 1832$a$ and 1832$b$, are disposed adjacent to non-confronting surfaces 1803$a$ and 1803$b$, respectively. The flux produce by magnetic structures 1832$a$ and 1832$b$ (e.g., permanent magnets) is directed to magnetically permeable structure 1834, which, in turn, can pass through confronting surface 1802 to a pole face (not shown). For purposes of illustration, consider that FIG. 8A depicts magnetically permeable structure 1834 being implemented as magnetically permeable structure 834$a$ of rotor assembly 830$a$, and magnetic structures 1832$a$ and 1832$b$ of FIG. 18C are implemented as 832$d$ and 832$b$, respectively, of FIG. 8A. As shown, magnetic structures 832$b$ and 832$d$ lie in or on flux path portions 891$b$ and 891$c$, respectively, (or shorter portions of flux path portions 891$b$ and 891$c$). Flux path portions 891$b$ and 891$c$ extends between rotor assemblies 830$a$ and 830$b$. The non-confronting surfaces of magnetically permeable structure 834$a$ adjacent magnetic structures 832$b$ and 832$d$ also can be on or in the flux path portions 891$b$ and 891$c$ (or shorter portions thereof). Flux path portions 891$b$ and 891$c$ (and 891$a$) of FIG. 8A can be described as principal flux path portions as the predominant amount of flux passes along these flux path portions, according to some embodiments. As is discussed below, other flux paths can be implemented to intercept flux path portions 891$b$ and 891$c$ (and 891$a$) to, among other things, provide additional flux to that associated with the principal flux path portions.

Referring back to FIG. 18C, supplementary magnetic material is disposed adjacent to non-confronting surfaces of magnetically permeable structure 1834 to enhance the flux of flux paths having portions passing through magnetic structures 1832$a$ and 1832$b$ and confronting surface 1802. In the example shown, a magnetic structure 1822 (e.g., a permanent magnet) is disposed adjacent non-confronting surface 1804, whereby the direction of polarization for magnetic structure 1822 is directed into (or out of) non-confronting surface 1804. As such, magnetic structure 1822 can provide additional flux to enhance the flux passing through confronting surface 1802.

Figure 18D:
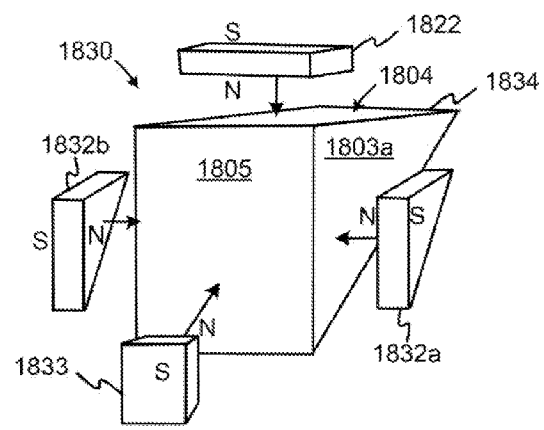

FIG. 18D is a rear perspective view 1830 of an example of the arrangement depicted in FIG. 18C, according to some embodiments. Additional supplementary magnetic material is disposed adjacent to non-confronting surface 1805 of magnetically permeable structure 1834 to enhance the flux of flux paths having portions passing through magnetic structures 1832a and 1832b and confronting surface 1802. As shown, a magnetic structure 1833 (e.g., a permanent magnet) is disposed adjacent non-confronting surface 1805, whereby the direction of polarization for magnetic structure 1833 is directed into (or out of) non-confronting surface 1805. As such, magnetic structure 1833 can provide additional flux to enhance the flux passing through confronting surface 1802.

Figure 18E:
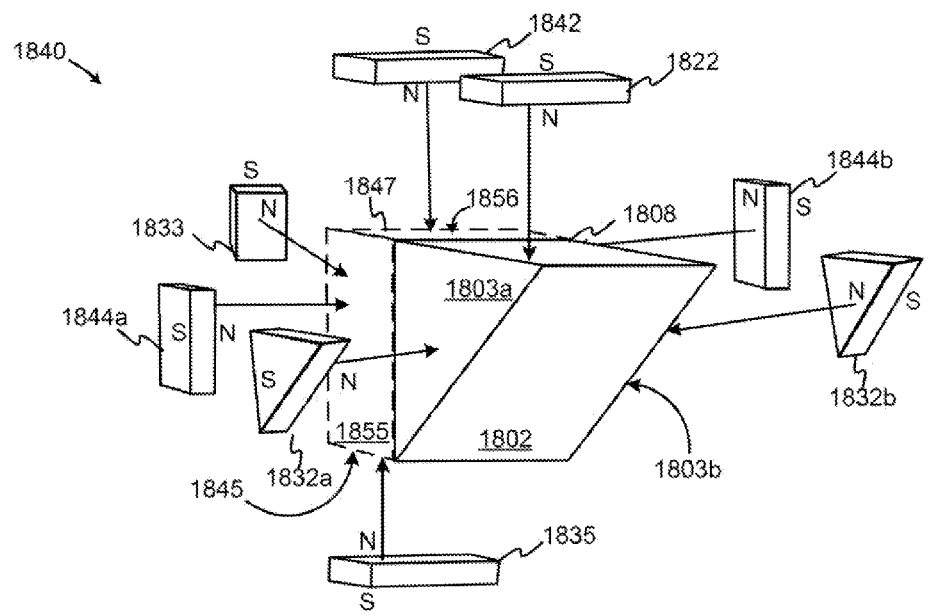

FIG. 18E is a front perspective view 1840 of an example of a magnetically permeable structure including an extension portion 1845, according to some embodiments. A magnetically permeable structure 1808 includes an extension portion 1847 to vary an amount of flux passing through confronting surface 1802, whereby the amount of flux can be varied by modifying a dimension of magnetically permeable structure 1808 along the axis (i.e., in an axial direction). Extension portion 1847 provides for additional surface area of non-confronting surfaces, and can be composed of material similar to that of the magnetically permeable material. For example, additional surface area 1855 is provided so that supplementary magnetic material, such as magnetic structure 1844a, can be disposed adjacent to additional surface area 1855 (another magnetic structure 1844b can also be disposed adjacent to additional surface area not shown). The supplementary magnetic material can provide for enhanced amounts of flux being passed through confronting surfaces 1802. Therefore, the additional surface area and supplementary magnetic material can be added optionally to enhance the flux produced by the magnetic region including confronting surface 1802.

Extension portion 1847 can also provide additional surface area 1856 so that supplementary magnetic material, such as magnetic structure 1842, can be disposed adjacent to additional surface area 1856 to enhance the flux passing through confronting surface 1802. Further, extension portion 1847 can also provide additional surface area 1845 so that yet other supplementary magnetic material, such as magnetic structure 1835, can be disposed adjacent to additional surface area 1845 to enhance the flux. In some embodiments, magnetic structures 1842 and 1835 can be referred to as radial boost magnets, whereas magnetic structure 1833 can be referred to as an axial boost magnet. A radial boost magnet can produce flux parallel to or along a radial direction relative to an axis, according to some embodiments. For example, a radial boost magnet can produce flux perpendicular to (or substantial perpendicular to) an axis of rotation. An axial boost magnet can produce flux parallel to or along an axial direction, according to some embodiments. For example, an axial boost magnet can produce flux parallel to (or substantial parallel to) an axis of rotation. In various embodiments, one or more of magnetic structures 1833, 1835, 1842, 1844a, and 1844b can be optional. More or fewer surfaces and/or magnetic structures can be implemented. For example, any of magnetic structures 1842, 1844a, and 1844b can be formed as part of respective magnetic structures 1822, 1832a, and 1832b to form unitary magnetic structures (e.g., magnetic structures 1822 and 1842 can be formed as a single magnet). Note that magnetic structures and a magnetically permeable structure depicted in FIGS. 18A to 18E are not limited to those shapes shown and are not limited to flat surfaces. Note that boost magnets can be made from the same magnet material or different magnet material that is disposed between magnetically permeable material in the rotor assemblies. Further, boost magnets can have the same or different surface area dimensions as the adjacent surfaces of magnetic permeable material.

Figure 18F:
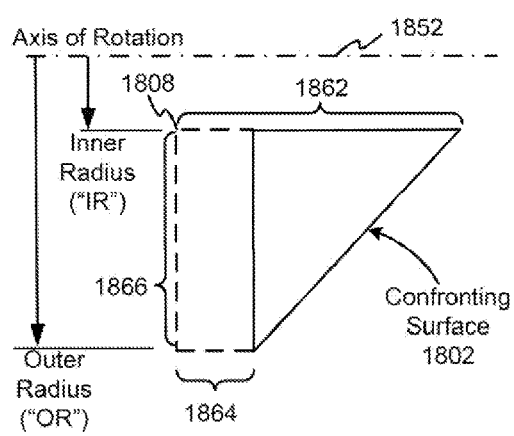
Figure 18G:
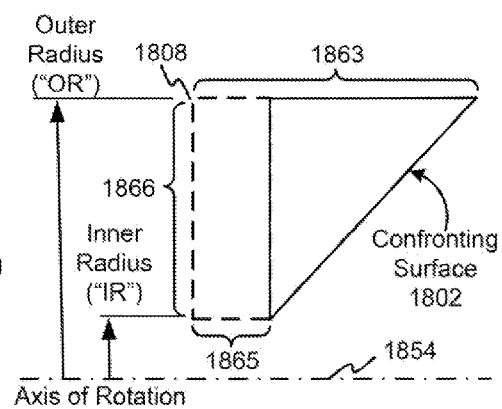

FIGS. 18F and 18G are side views of an example of magnetically permeable structure and various axes of rotations, according to some embodiments. FIG. 18F is a side view of a magnetically permeable structure 1808 oriented relative to an axis of rotation 1852. As confronting surface 1802 is oriented to face away from axis of rotation 1852, magnetically permeable structure 1808 is implemented in an inner rotor assembly. In an inner rotor assembly, a radial surface 1862 (i.e., a radial non-confronting surface) is disposed at an inner radius ("IR") dimension, whereas a radial surface 1864 is disposed at an outer radius ("OR") dimension. Non-confronting surface 1866 is an axial non-confronting surface. FIG. 18G is a side view of a magnetically permeable structure 1808 oriented relative to an axis of rotation 1854. As confronting surface 1802 is oriented to face toward axis of rotation 1854, magnetically permeable structure 1808 is implemented in an outer rotor assembly. In an outer rotor assembly, a radial surface 1865 (i.e., a radial non-confronting surface) is disposed at an inner radius ("IR") dimension, whereas a radial surface 1863 is disposed at an outer radius ("OR") dimension. Non-confronting surface 1866 is an axial non-confronting surface. Radial surfaces 1862, 1863, 1864, and 1865 are oriented to extend generally along the axis of rotation, whereas axial surface 1866 is oriented to extend generally along one or more radii.

Figure 19A:
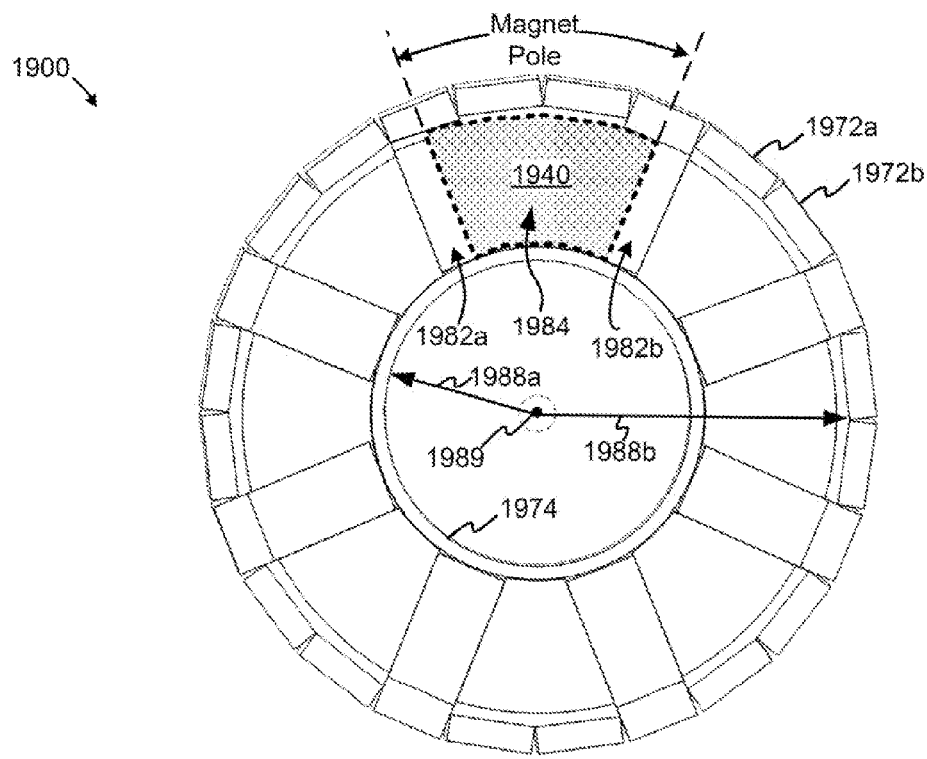
FIGS. 19A to 19D depict various views of an example of an outer rotor assembly, according to some embodiments.

FIGS. 19A to 19D depict various views of an example of an outer rotor assembly, according to some embodiments. FIG. 19A is a front view of an outer rotor assembly 1900. Outer rotor assembly 1900 includes magnetic material 1982a and 1982b (or structures thereof, such as magnets) and magnetically permeable material 1984 arranged about a centerline 1989, the combination of which form magnetic regions, such as magnetic region 1940. Outer rotor assembly 1900 also includes boost magnets disposed adjacent to one or more non-confronting surfaces of magnetically permeable material 1984. As used herein, the term "boost magnet" can refer, at least in some embodiments, to magnets disposed at or adjacent a surface of magnetically permeable material to enhance or "boost" the flux exchanged between a confronting surface of the magnetically permeable material and a pole face of a field pole member. A boost magnet can be disposed external to the flux paths (or flux path portions) passing through magnetically permeable material 1984 and magnetic material 1982a and 1982b (e.g., external to the principal flux paths). The boost magnet produces flux for enhancing the amount of flux passing through the air gaps, which, in turn, enhances torque production. As shown, outer rotor assembly 1900 includes boost magnets disposed radially (e.g., at a radial distance from centerline 1989), such as at an inner radius or an outer radius. In some examples, magnetic material can be disposed at an outer radial dimension ("OR") 1988b as one or more outer radial boost magnets. As shown, outer rotor assembly 1900 includes boost magnets 1972a and 1972b. While boost magnets 1972a and 1972b are depicted as having square or rectangular cross-sections, boost magnets are not so limited and can be formed with one or more magnets having various cross-sectional shapes. In another example, a boost magnet can be disposed at an inner radial dimension ("IR") 1988a. A magnetic material can be disposed at inner radial dimension 1988a as one or more inner radial boost magnets. In FIG. 19A, the boost magnet at the inner radial dimension 1988a is composed of inner radial boost magnet 1974 disposed adjacent a surface of magnetically permeable material 1984 located at inner radial dimension 1988a. In some examples, inner radial boost magnet 1974 can be a monolithic structure with alternating regions of "north" and "south"

polarities, or can be composed of separate magnetic structures integrated to form inner radial boost magnet 1974.

Figure 19B:
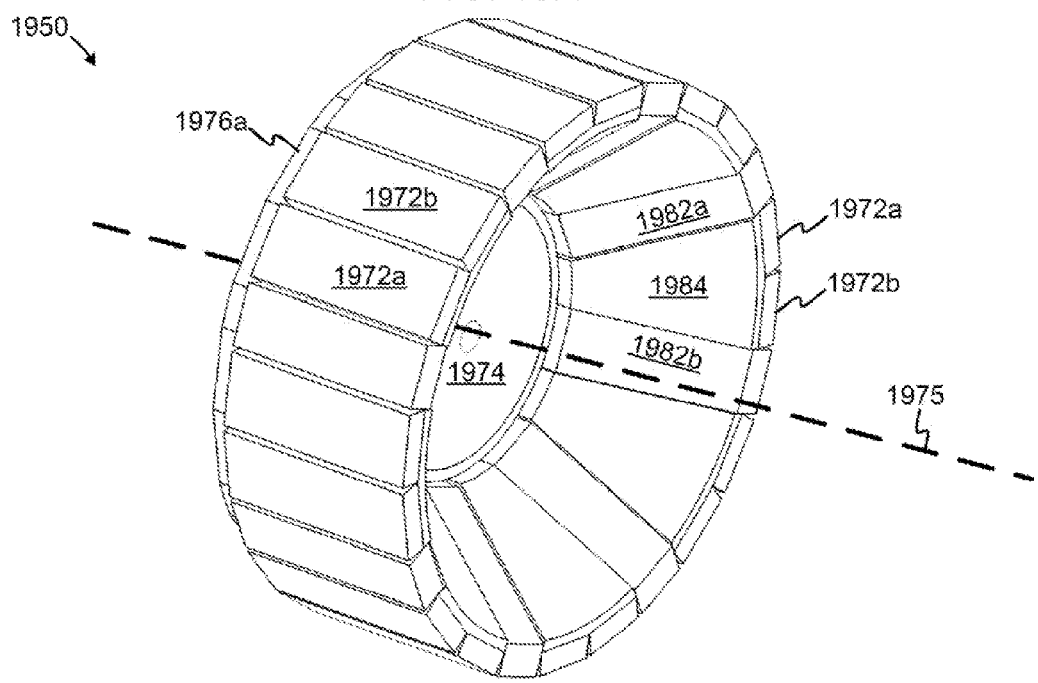

FIG. 19B is a front perspective view of an outer rotor assembly 1950 implementing outer radial boost magnets 1972a and 1972b, as well as inner radial boost magnet(s) 1974, according to some embodiments. Further, one or more boost magnet(s) can be located at or adjacent other surfaces of magnetically permeable material 1984, such as the rear surface(s) of magnetically permeable material 1984. As shown, a boost magnet structure 1976a is disposed adjacent the rear surfaces of magnetically permeable material 1984. Boost magnet structure 1976a is configured to modify (e.g., increase) the amount of flux passing through magnetic region 1940 of FIG. 19A. Note that any outer radial boost magnets 1972a and 1972b, inner radial boost magnet 1974, and axial boost magnet structure 1976a can be optional and may be omitted. Note, too, that the one or more of the boost magnets of FIGS. 19A and 19B can include magnetic material and other material to produce flux.

Figure 19C:
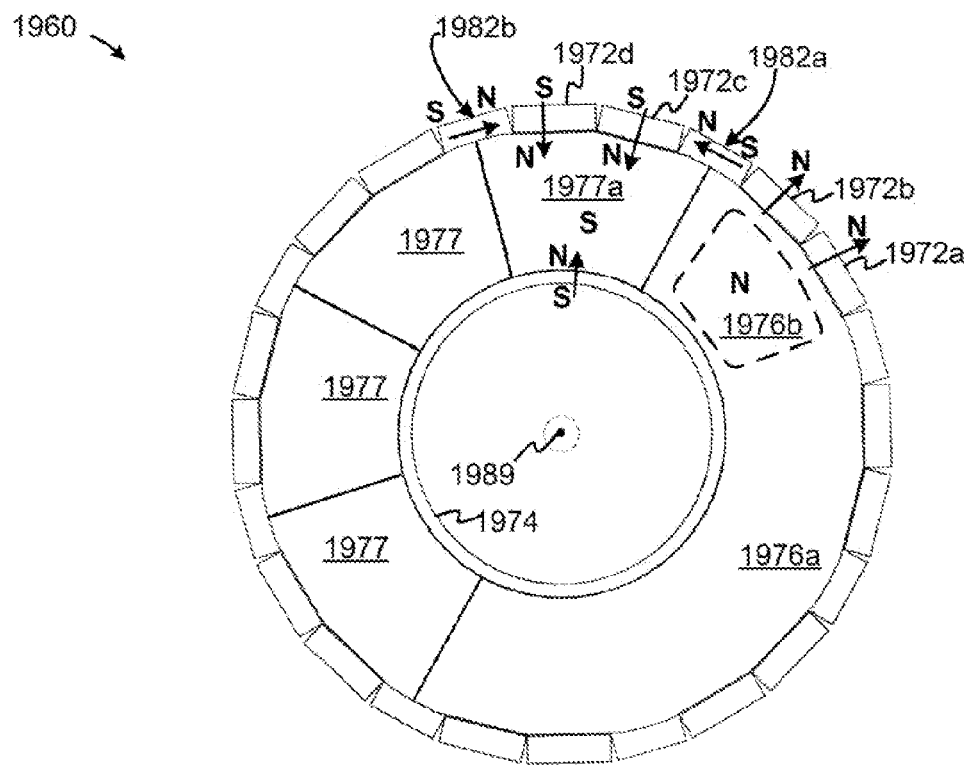

FIG. 19C is a rear view of an outer rotor assembly 1960 illustrating boost magnets 1972a and 1972b, boost magnet(s) 1974, and various examples of boost magnet structures 1976a, according to some embodiments. In various embodiments, boost magnet structure(s) 1976a can be composed of one or more entities configured to provide magnetic material having varied directions of polarization. In some examples, boost magnet structure(s) 1976a can be a monolithic structure including different regions of polarity, such as region 1976b, to provide flux in a direction generally along centerline 1989. As shown, two boost magnet structure(s) 1976a can be used, whereby boost magnet structure 1976a represents one-half of the rear view of an outer rotor assembly 1960 (the other one-half is not shown). In some examples, a boost magnet structure 1976a can be composed of separates structures 1977, each of which includes different regions of polarity to provide the flux along centerline 1989. As shown, four boost magnets 1977 (including 1977a) can be implemented in lieu of a boost magnet structure such as boost magnet structure 1976a. The four boost magnets 1977 represent one-half of the rear view of outer rotor assembly 1960 (the other four boost magnets 1977 representing the other half are not shown). Further, the boost magnet 1977a is depicted as having a direction of polarization, in the rear view, as a south ("S") magnet pole. The direction of polarization of boost magnet 1977a is such that a north ("N") magnet pole (see FIG. 19D) extends from the other side (i.e., the front side) of boost magnet 1977a. FIG. 19C also depicts a direction of polarization of inner radial boost magnet 1974 (i.e., from south ("S") to north ("N"), directed inwardly toward centerline 1989. FIG. 19C also depicts directions of polarization of outer radial boost magnets 1972c and 1972d. Magnets 1982a and 1982b include magnetic material having directions of polarization that are generally tangential (or substantially tangential) to a circle (not shown) about centerline 1989. Directions of polarization of outer radial boost magnets 1972a and 1972b are shown as being from south ("S") to north ("N"), directed outwardly away from centerline 1989. In view of, for example, the polarization directions of magnets 1982a and 1982b, and of other magnets, a space behind the surface of boost magnet 1977a is configured to provide a north magnet pole and a space behind the surface of region 1976b is configured to provide a south magnet pole.

Figure 19D:
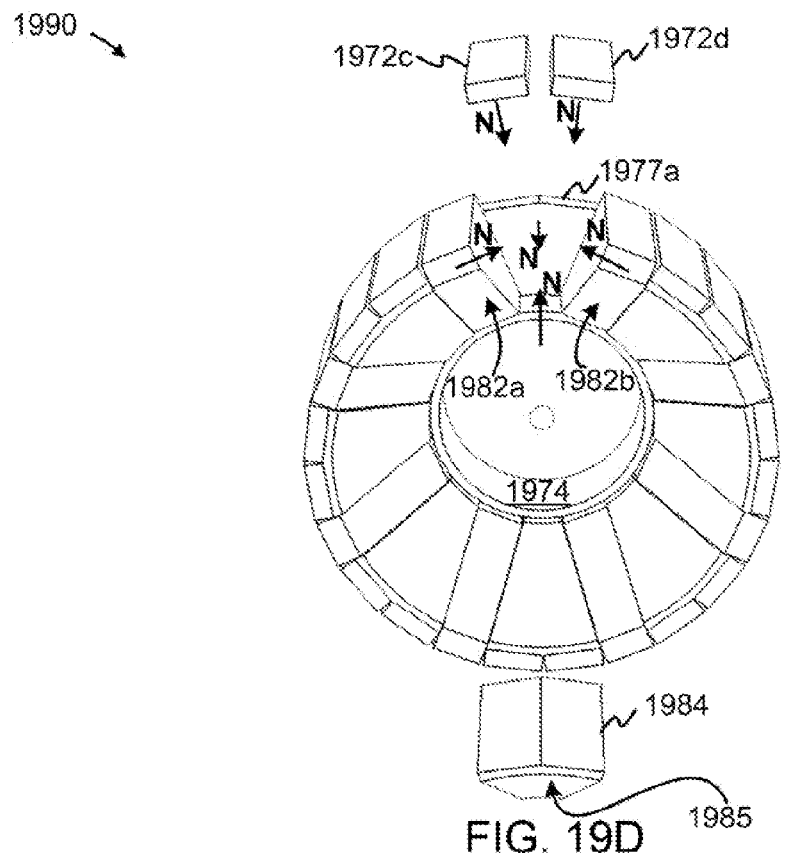

FIG. 19D a front, perspective view of an example of an outer rotor assembly 1990 illustrating directions of polarization to form and/or enhance a magnetic region, according to some embodiments. FIG. 19D depicts the directions of polarization for forming flux paths (or flux path portions) as well as other flux paths (or other flux path portions) configured to enhance the flux associated with the flux paths. For example, magnets 1982a and 1982b include directions of polarization such that magnets 1982a and 1982b magnetically cooperate to form a north ("N") magnet pole. As such, confronting surface 1985 of magnetically permeable material 1984 forms a magnetic region (or a portion thereof) as a north magnet pole. Outer radial boost magnets 1972c and 1972d can generate flux directed along a north ("N") direction of polarization into magnetically permeable material 1984 at or approximate to an outer radial dimension. Inner radial boost magnet 1974 can generate flux directed along a north ("N") direction of polarization into magnetically permeable material 1984. Axial boost magnet 1977a can generate flux directed along a north ("N") direction of polarization into magnetically permeable material 1984 at or approximate to an inner radial dimension. Therefore, magnetic material associated with outer radial boost magnets 1972c and 1972d, inner radial boost magnet 1974, and axial boost magnet 1977a can produce flux to enhance the flux passing on flux paths or flux path portions in a manner that flux per unit surface area of confronting surface 1985 is enhanced.

FIG. 20 depicts an exploded, front perspective view of a portion of an outer rotor assembly, according to some embodiments. Outer rotor assembly 2000 is shown to include flux paths or flux path portions contributing to the flux passing through magnetic regions that include, for example, magnets 1982a and 1982b and magnetically permeable material 1984 arranged about a centerline 2089. Magnets 1982a and 1982b are shown to generate flux path portions 2021 and 2023, respectively, to magnetically couple with non-confronting surfaces of magnetically permeable material 1984 that are on a flux path (e.g., a principal flux path) passing through the air gaps (not shown). Magnets 1982a and 1982b include surfaces that are disposed adjacent portions 2031 and 2033, respectively, of axial boost magnet structure 1976a when assembled. Outer boost magnets 1972a and 1972b can generate flux path portions 2011 and 2013 to magnetically couple with surfaces 2072a and 2072b, respectively, of magnetically permeable material 1984. Inner boost magnet 1974 is configured to generate flux path portion 2025 to magnetically couple with a surface of magnetically permeable material 1984. Further, axial boost magnet structure 1976a includes a surface area 2032 of magnetic material having a direction of polarization configured to generate a flux path portion 2015 to magnetically couple with a rear non-confronting surface of magnetically permeable material 1984. In various embodiments, flux path portions 2011, 2013, 2015, and 2025 intersect, but lie external to (or off of), flux paths or flux path portions that pass through magnets 1982a and 1982b. The flux associated with flux path portions 2011, 2013, 2015, and 2025 is provided to enhance the flux passing through confronting surfaces 1985.

Note that flux in magnetically permeable material 1984 from the one or more boost magnets can be additive through superposition. In some embodiments, the boost magnets are configured to reduce flux leakage. Outer radial boost magnets 1972a and 1972b can generate magnetic field potentials vectorially directed as shown by rays 2011 and 2013 in FIG. 20 to magnetically couple with surfaces 2072a and 2072b, respectively, of magnetically permeable material 1984. Inner radial boost magnet(s) 1974 can be configured to generate magnetic field potential vectorially directed as shown by ray 2025 to magnetically couple with a surface of magnetically permeable material 1984. Further, axial boost magnet structure 1976a includes a surface area 2032 of magnetic material that can generate magnetic field potential vectorially directed as shown by ray 2015 to magnetically couple with a rear non-confronting surface of magnetically permeable material 1984. In various embodiments, the magnetic field potentials illustrated by rays 2011, 2013, 2015 and 2025 can facilitate the restriction of flux path portions 2021 and 2023 in magnetically permeable material 1984 to the principal flux path passing through the air gaps. Such magnetic field potentials are disposed outside the principal flux paths but do enhance the flux passing through confronting surfaces 1985. In view of the foregoing, the boost magnets can operate to enhance flux by providing optimal magnetic return paths than otherwise might be the case. For example, boost magnets can provide a magnetic return path that has a lower reluctance than otherwise might be the case (e.g., through air, a motor case, or any other external entity). A reduction in reluctance improves the amount of available flux.

FIG. 21 depicts a portion of an exploded, front perspective view of another outer rotor assembly, according to some embodiments. Outer rotor assembly 2100 is shown to include another implementation of a radial boost magnet. As shown, radial boost magnet 2102 includes one or more surfaces that are curved, such as, a curved surface polarized as a south ("S") magnet pole and another curved surface polarized as a north ("N") magnet pole. One or more of these surfaces can be coextensive with an arc or a circle (not shown) centered on centerline 2089. Magnetically permeable material 1984 is disposed between magnets 1982a and 1982b, and radially from inner boost magnet structure 1974. In this example, a non-confronting surface 2104 of magnetically permeable material 1984 is configured to be coextensive with a surface of radial boost magnet 2102.

Figure 22A:
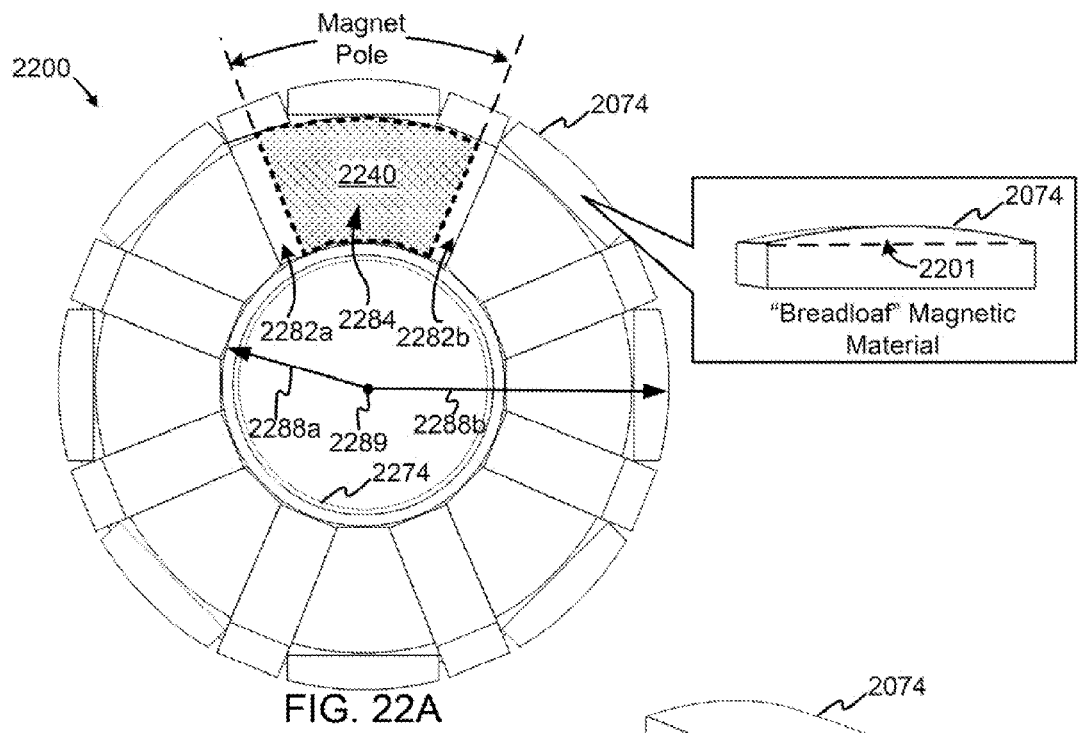
FIGS. 22A to 22D depict various views of another example of an outer rotor assembly, according to some embodiments.

FIGS. 22A to 22D depict various views of another example of an outer rotor assembly, according to some embodiments. FIG. 22A is a front view of an outer rotor assembly 2200. Outer rotor assembly 2200 includes magnetic material 2282a and 2282b (or structures thereof, such as magnets) and magnetically permeable material 2284 arranged about a centerline 2289, the combination of which form magnetic regions, such as magnetic region 2240. Outer rotor assembly 2200 also includes boost magnets disposed adjacent to radial surfaces of magnetically permeable material 2284. As shown, outer rotor assembly 2200 includes boost magnets disposed radially at an outer radius (i.e., at or adjacent an outer radial dimension ("OR") 2288b) as outer radial boost magnets 2074. In this example, an outer radial boost magnet 2074 is a "breadloaf"-shaped magnetic structure (i.e., a breadloaf magnet). Breadloaf magnet 2074 includes a first surface that is flat (or relatively flat) and a second surface that is curved (or relatively curved), whereby the second surface is located at a greater radial distance from centerline 2289 than the first surface. In various examples, the second surface is coextensive with an arc or a circle (not shown) at a specific radial distance from centerline 2289, such as outer radial dimension ("OR") 2288b. Breadloaf magnet 2074 provides for fewer singular structures that may constitute a boost magnet (e.g., breadloaf magnet 2074 can replace two or more boost magnets having rectangular cross sections), thereby simplify manufacturing of outer rotor assembly 2200, among other things. Also, breadloaf magnet 2074 provides for additional magnetic material 2201 over a boost magnet having a rectangular cross-section, thereby providing for an increased capacity for producing more flux, among other things. Further to FIG. 22A, a boost magnet structure can be disposed at or adjacent an inner radial dimension ("IR") 2288a as an inner radial boost magnet 2274.

Figure 22B:
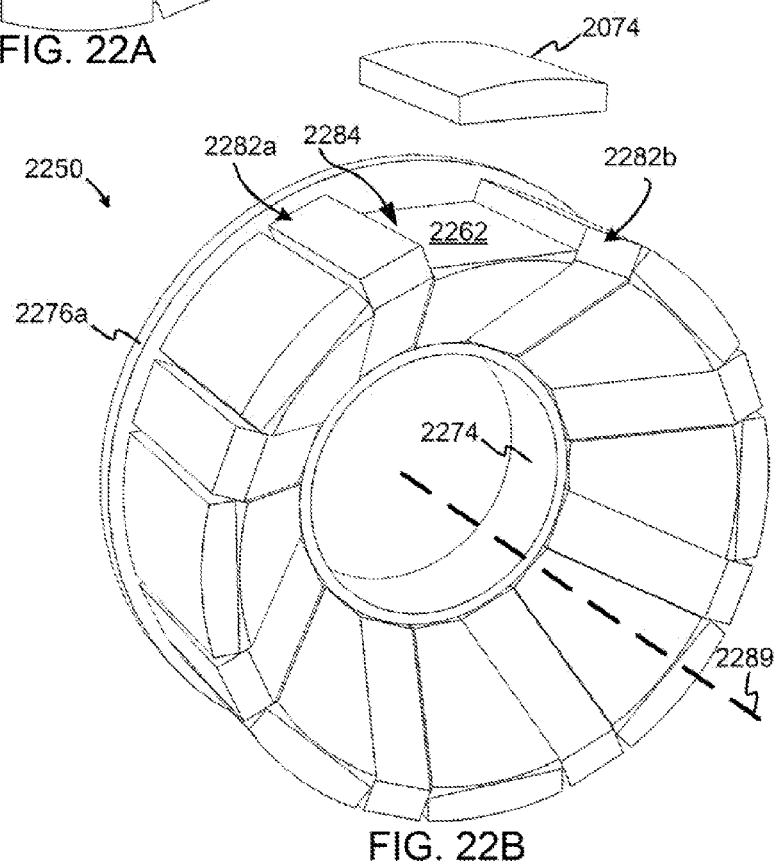

FIG. 22B is a front perspective view of an outer rotor assembly 2250 illustrating outer radial boost magnets and corresponding magnetically permeable structures, according to some embodiments. Outer rotor assembly 2250 includes magnetically permeable material, such as magnetically permeable structures 2284, and magnetic material, such as magnets 2282a and 2282b. Further, outer rotor assembly 2250 includes boost magnets, which can include one or more of outer radial boost magnets 2074, one or more inner boost magnets 2274, and/or one or more axial boost magnets, as represented by axial boost magnet structure 2276a. In the example shown, magnetically permeable structure 2284 includes a non-confronting surface 2262 shaped to coincide with a surface of breadloaf magnet 2074. For example, non-confronting surface 2262 is a radial non-confronting surface that is flat (or relatively flat) and can be oriented orthogonal to a ray (not shown) extending from centerline 2275.

Figure 22C:
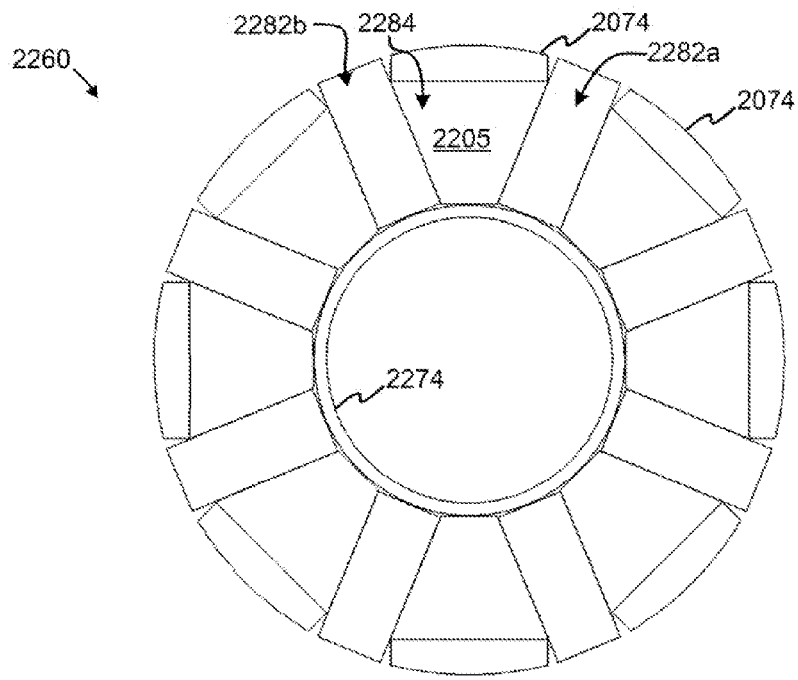

FIG. 22C is a rear view of an outer rotor assembly of FIG. 22B, according to some embodiments. In this figure, axial boost magnet structure 2276a is absent and outer rotor assembly 2260 includes boost magnets 2074 and an example of suitable magnetically permeable structures 2284. Magnetically permeable structures 2284 each include an axial non-confronting surface 2205.

Figure 22D:
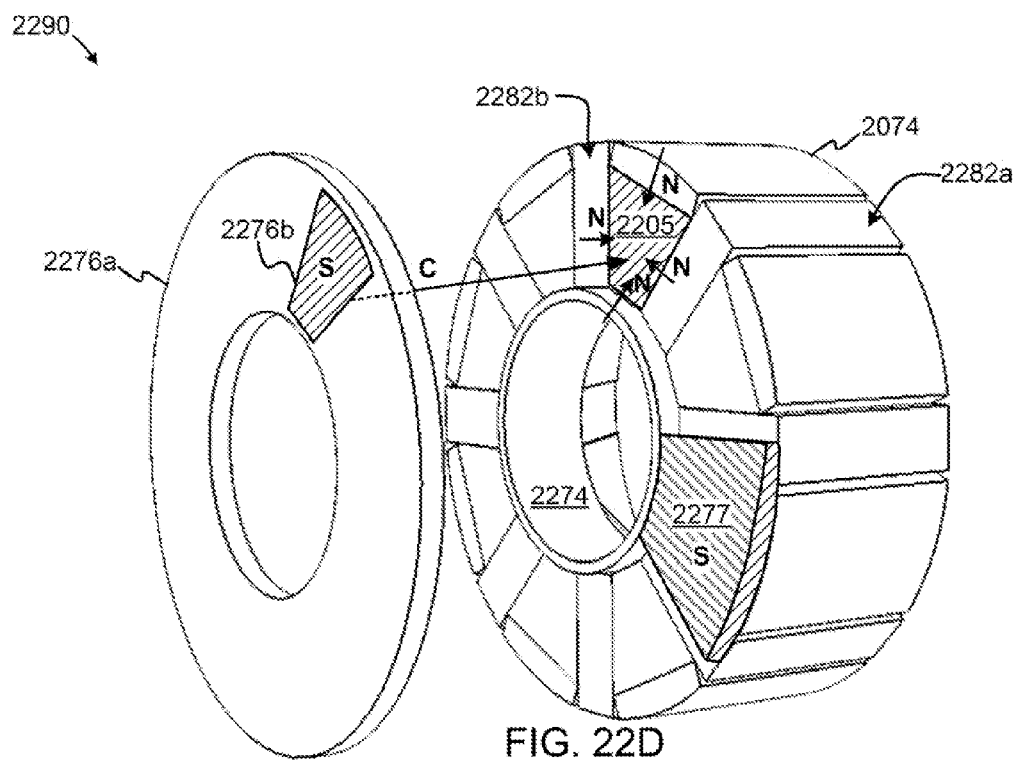

FIG. 22D is a perspective side view of an outer rotor assembly of FIG. 22C, according to some embodiments. In this figure, outer rotor assembly 2290 includes magnetically permeable material disposed between magnets 2282a and 2282b, which have directions of polarization arranged to configure the magnetically permeable material between magnets 2282a and 2282b as a north ("N") magnet pole. Note, too, that the magnetically permeable structures of FIG. 22D have axial non-confronting surfaces 2205. Further, outer boost magnets 2074 and inner boost magnets 2274 are included to boost flux in the magnetically permeable material. Axial boost magnet structure 2276a includes different regions of polarity, such as region 2276b, to provide flux in directions generally along the centerline. Region 2276b has a direction of polarization (e.g., a north pole) oriented to enter axial non-confronting surface 2205. Alternatively, axial boost magnet structure 2276a can be replaced with, or can include, discrete magnets, such as axial boost magnet 2277, that can be disposed adjacent axial non-confronting surfaces 2205. Axial boost magnet 2277 is representative of other axial boost magnets, too, but those other axial boost magnets not shown.

Figure 23A:
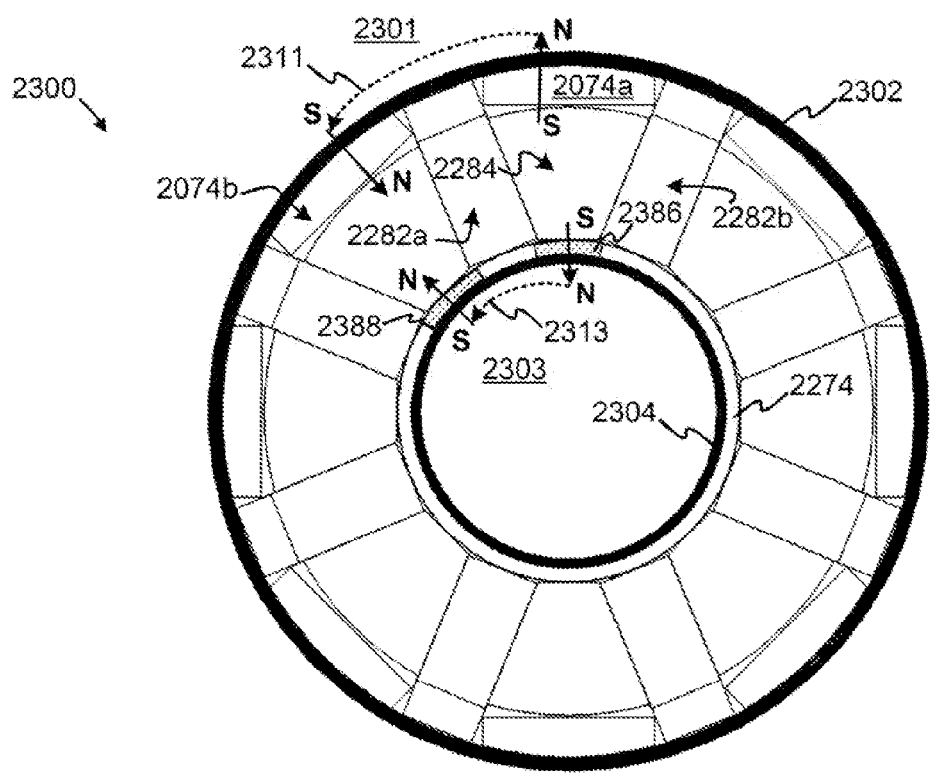
FIG. 23A is a front view of an outer rotor assembly including examples of flux conductor shields, according to some embodiments.

FIG. 23A is a front view of an outer rotor assembly 2300 including examples of flux conductor shields, according to some embodiments. Outer rotor assembly 2300 includes magnetic material 2282a and 2282b (or structures thereof, such as magnets) and magnetically permeable material 2284. Outer rotor assembly 2300 also can include outer radial boost magnets 2074a and 2074b, as well as an inner radial boost magnet structure 2274. Further, FIG. 23A depicts flux conductor shields configured to provide a return flux path (or a portion thereof) for one or more magnets, the return flux path portion residing in or traversing through a flux conductor shield. In some embodiments, a return flux path portion lies externally to a flux path or flux path portion that passes through magnetic material, such as magnetic material 2282a and 2282b, disposed between magnetically permeable material 2284. A flux conductor shield reduces or eliminates flux (e.g., stray flux) associated with magnets, such as boost magnets, that otherwise might extend externally from outer rotor assembly 2300 or its components. Therefore, the flux conductor shield can minimize or capture flux that otherwise might pass through external materials that might cause losses, such as eddy current losses or hysteresis losses. As such, a flux conductor shield can minimize or negate magnetic-related losses due to structures located external to outer rotor assembly 2300. In some examples, a flux conductor shield can operate to enhance flux by providing optimal magnetic return paths for boost magnets than otherwise might be the case. For example, a flux conductor shield can provide a magnetic return path that has a lower reluctance than otherwise might be the case (e.g., through air, a motor case, or any other external entity). A reduction in reluctance improves the amount of available flux (e.g., as generated by the boost magnets).

In the example shown, a flux conductor shield 2302 is configured to minimize or eliminate flux extending into an external region 2301 that might include magnetically permeable material, such as a motor housing. Thus, flux conductor shield 2302 includes a return flux path portion 2311 extending from outer radial boost magnet 2074a to outer radial boost magnet 2074b, both of which have directions of polarization as depicted in FIG. 23A. Another flux conductor shield 2304 is configured to minimize or negate flux that otherwise might extend into an external region 2303 (i.e., a space defined by an inner radial dimension), which might include magnetically permeable material (e.g., a shaft). Thus, flux conductor shield 2304 includes a return flux path portion 2313 extending from a portion 2386 of inner radial boost magnet structure 2274 to another portion 2388 of inner radial boost magnet structure 2274, with portions 2386 and 2388 having directions of polarization as depicted in FIG. 23A.

According to some embodiments, a flux conductor shield can be composed of one or more constituent structures, which can include one or more structures of magnetically permeable material or other materials. A flux conductor shield can be formed from a strip of magnetically permeable material that is wound about itself a number of times to form, for example, flux conductor shield 2302 or flux conductor shield 2304, according to some embodiments. For example, flux conductor shield 2302 and flux conductor shield 2304 can be formed from, for example, grain-oriented material (e.g., from a grain-oriented steel lamination), with the grain being oriented circumferentially or along a circumference. Thus, the grain can be oriented to facilitate flux passage (e.g., reduce losses) along the predominant parts of return flux path portions 2311 and 2313. In specific embodiments, a flux conductor shield can be composed with multiple structures, such as concentric circular structures of magnetically permeable material. But note that a flux conductor shield can include non-magnetically permeable material, such as plastic, to increase a distance between a boost magnet and magnetically permeable material in either region 2301 or 2303, according to some embodiments. Such a plastic structure is configured as a spacer to increase the distance, thereby decreasing the strength of the flux at magnetically permeable structures in either regions 2301 or 2303. Decreasing the strength of the flux can reduce magnetic losses.

Figure 23B:
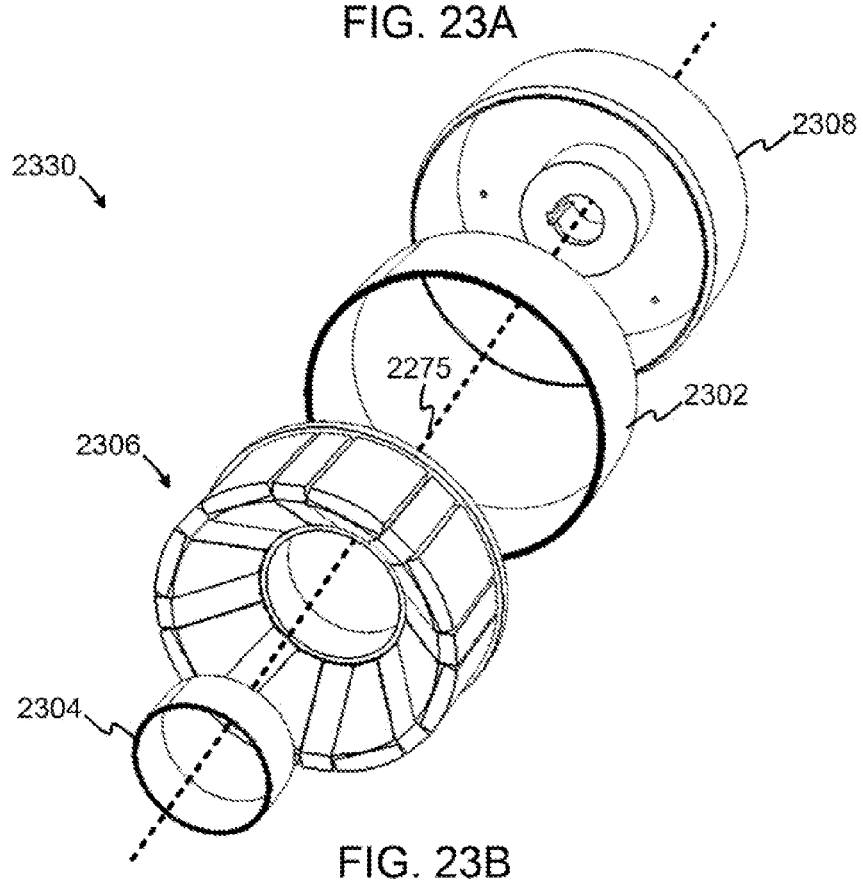
FIG. 23B is an exploded, front perspective view of an outer rotor assembly including examples of flux conductor shields, according to some embodiments.

FIG. 23B is an exploded, front perspective view of an outer rotor assembly including examples of flux conductor shields, according to some embodiments. In diagram 2300, an outer rotor assembly 2306 includes an inner radial flux conductor shield 2304 disposed within inner radial boost magnets that are positioned at an inner radial dimension from centerline 2275. The outer rotor assembly 2306 also includes an outer radial flux conductor shield 2302 disposed externally from the outer radial boost magnets. A motor housing portion 2308 is configured to house outer rotor assembly 2306, whereby outer radial flux conductor shield 2302 is configured to reduce flux from passing between outer rotor assembly 2306 and motor housing portion 2308.

Figure 23C:
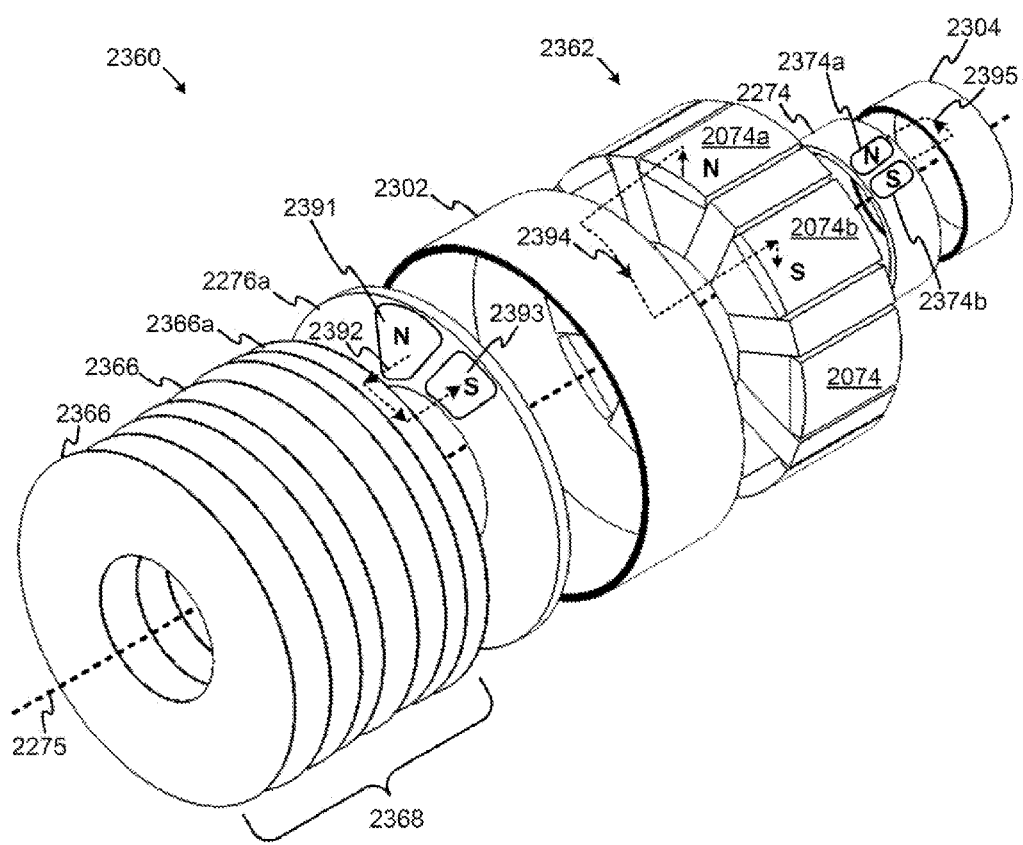
FIG. 23C is an exploded, rear perspective view of an outer rotor assembly including examples of flux conductor shields and return flux paths (and portions thereof), according to some embodiments.

FIG. 23C is an exploded, rear perspective view of an outer rotor assembly including examples of flux conductor shields and return flux path portions, according to some embodiments. Outer rotor assembly 2360 includes an inner radial flux conductor shield 2304 disposed within an inner radial boost magnet structure 2274 that includes regions 2374a and 2374b of magnetic material, whereby the directions of polarization of regions 2374a and 2374b of magnetic material establish a return flux path portion 2395 within inner radial flux conductor shield 2304. Outer rotor assembly 2360 also includes an outer radial flux conductor shield 2302 disposed externally to an arrangement 2362 of outer radial boost magnets 2074, including outer radial boost magnets 2074a and 2074b. The directions of polarization of outer radial boost magnets 2074a and 2074b establish a return flux path portion 2394 within outer radial flux conductor shield 2302. Further, outer rotor assembly 2360 also includes an axial flux conductor shield 2368 disposed adjacent to an axial boost magnet structure 2276a having different regions of polarity, such as regions 2391 and 2393. The directions of polarization of regions 2392 and 2393 establish a return flux path portion 2392 within one or more portions of axial flux conductor shield 2368, such as in axial shield 2366a. Note that while FIG. 23C depicts axial flux conductor shield 2368 as composed of a number of disc-like structures, axial flux conductor shield 2368 need not be so limited. In one example, axial flux conductor shield 2368 can be formed from a corkscrew-shaped piece of magnetically permeable material. In other examples, axial flux conductor shield 2368 can be composed of multiple pieces for each axial shield constitute component 2366. Therefore, for example, axial shield component 2366a can include multiple pieces, each being an arc-like shape (not shown) configured to provide a return flux path portion between regions 2391 and 2393. A piece can be implemented with grain-oriented material with the grain being oriented generally from one of regions 2391 and 2393 to the other. According to some embodiments, a return flux path can originate at a boost magnet of a first rotor assembly and traverse through magnetically permeable material into a field pole member. The return flux path then can exit the field pole member and pass through another magnetically permeable structure of a second rotor assembly. The return flux path then passes through another boost magnet, through a flux conductor shield, and into yet another boost magnet. Then the return flux path continues in a similar manner until reaching the point of origination at the boost magnet of the first rotor assembly. Consequently, the return flux path need not pass through magnetic material disposed between the magnetically permeable structures of a rotor assembly. In some embodiments, return flux path portions 2392, 2394 and 2395 lie off the principal flux paths, such as those flux paths passing circumferentially from one structure of magnetically permeable material through magnetic material and into another structure of magnetically permeable material.

Figure 24A:
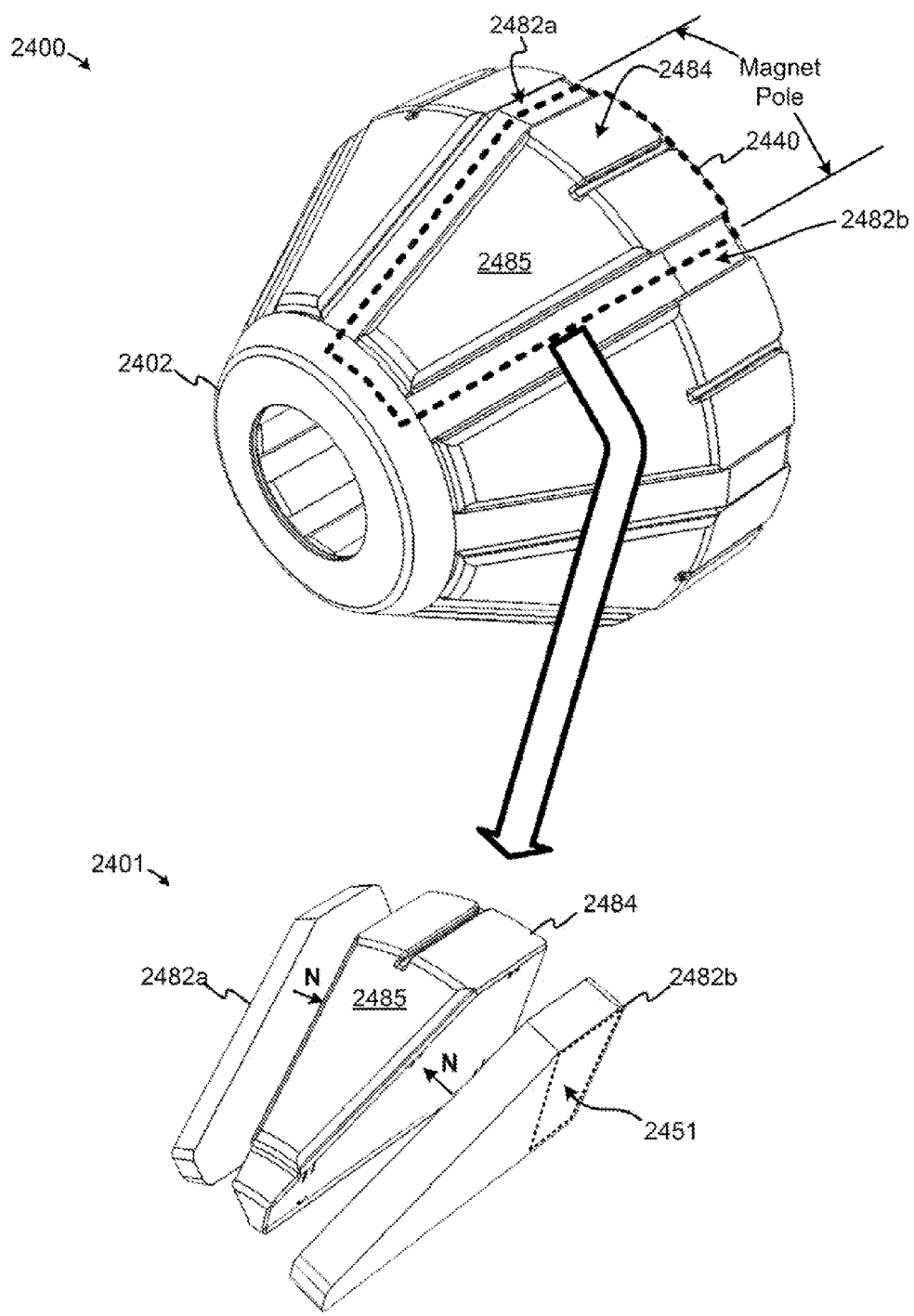
FIGS. 24A to 24C depict various views of an example of an inner rotor assembly, according to some embodiments.
Figure 24B:
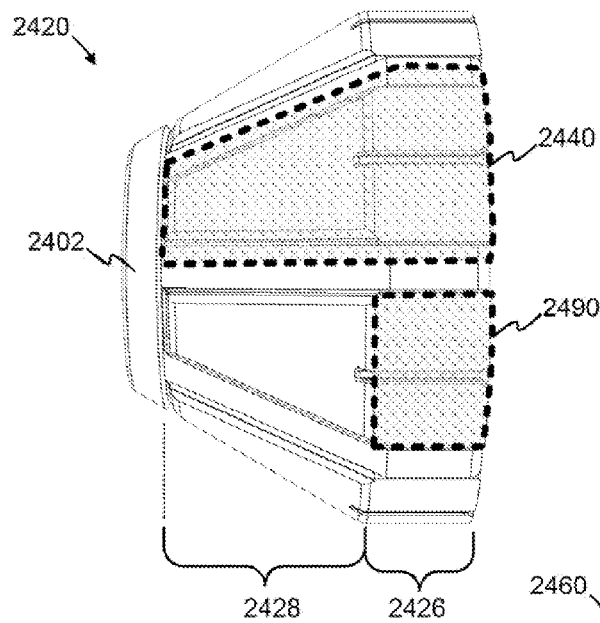
Figure 24C:
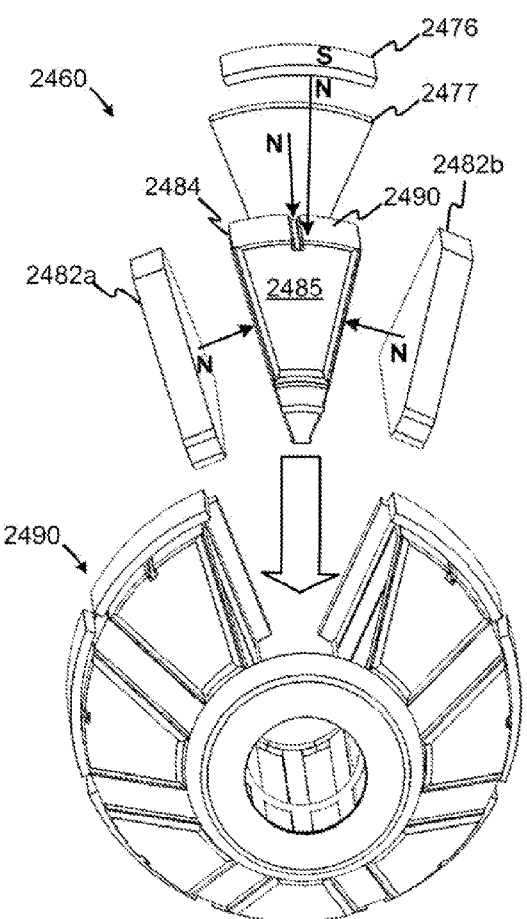

FIGS. 24A to 24C depict various views of an example of an inner rotor assembly, according to some embodiments. FIG. 24A is a front perspective view of an inner rotor assembly 2400 in accordance with a specific embodiment. Inner rotor assembly 2400 includes magnetic material 2482a and 2482b (or structures thereof, such as magnets) and magnetically permeable material 2484 arranged about a centerline, all of which form magnetic regions, such as magnetic region 2440. Further, magnetically permeable material 2484 includes a confronting surface 2485 configured to confront a pole face of a field pole member (not shown), confronting surface 2485 being oriented at an angle to a centerline or axis of rotation. An arrangement 2401 of magnet 2482a, magnetically permeable material 2484, and magnet 2482b is shown in an exploded view, with magnets 2482a and 2482b being oriented so that the north ("N") directions of polarization are directed into magnetically permeable material 2484. Note that magnets 2482a and 2482b can include an axial extension area 2451, which can provide, among other things, an enhanced surface area through which a greater amount of flux can pass. Inner rotor assembly 2400 optionally can include an end cap 2402 that can, among other things, provide support (e.g., compressive support) to immobilize magnetic material 2482a and 2482b, and magnetically permeable material 2484 against rotational forces as inner rotor assembly 2400 rotates at relatively high revolutions per unit time about an axis of rotation. End cap 2402, therefore, can be implemented to maintain air gap dimensions during various rotational speeds.

FIG. 24B is a side view of an inner rotor assembly 2420 in accordance with a specific embodiment. An outer radius dimension can vary in an angled surface portion (e.g., in an angled surface portion 2428) along the axis of rotation, and the outer radius dimension can be relatively constant in an extension portion (e.g., in an extension region 2426). Also shown is a radial non-confronting surface 2490 of magnetically permeable material 2484, adjacent which an outer radial boost magnet can be disposed. FIG. 24C is an exploded front view of structures of a magnetic region in an inner rotor assembly in accordance with a specific embodiment. A portion 2460 of an inner rotor assembly 2490 is shown to include magnet 2482a, magnetically permeable material 2484, and magnet 2482b, as well as an outer radial boost magnet 2476 and an axial boost magnet 2477. Outer radial boost magnet 2476 is disposed adjacent radial non-confronting surface 2490, and axial boost magnet 2477 is disposed adjacent an axial on-confronting surface (not shown). As shown, surfaces of magnet 2482a, magnet 2482b, outer radial boost magnet 2476, and axial boost magnet 2477 having a north ("N") direction of polarization are oriented toward non-confronting surfaces of magnetically permeable material 2484. Therefore, confronting surface 2485 is configured as a magnet pole polarized as a "north" pole.

Figure 25A:
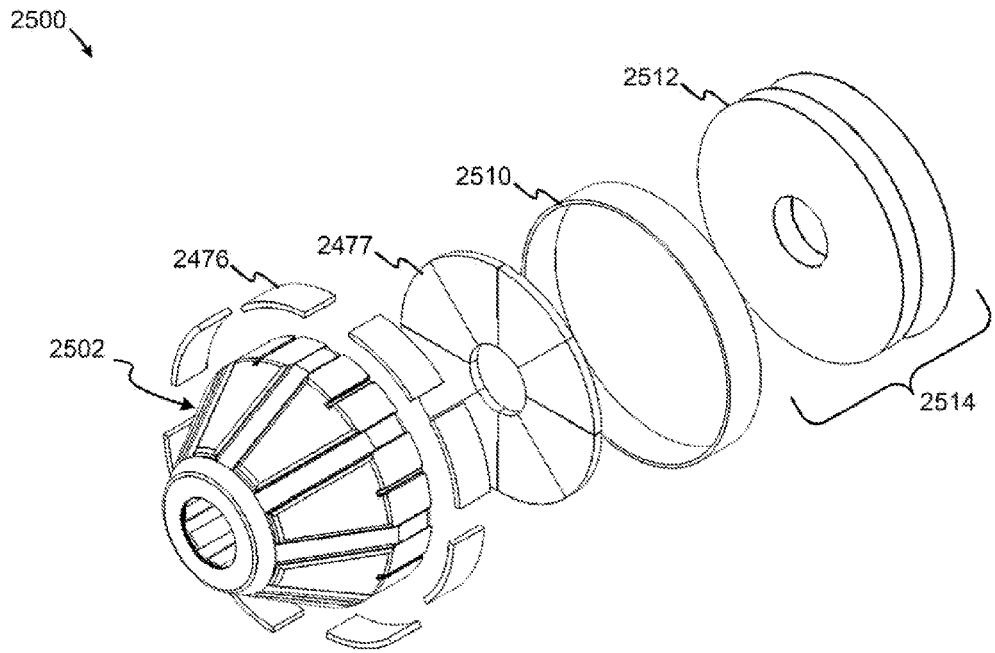
FIGS. 25A to 25B depict exploded views of an example of an inner rotor assembly, according to some embodiments.
Figure 25B:
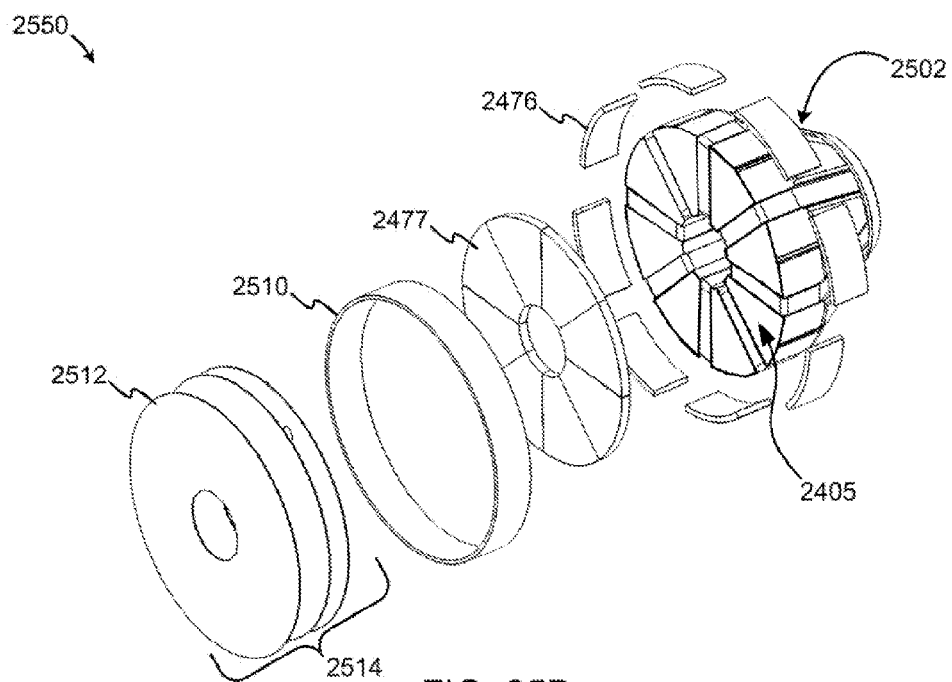

FIGS. 25A to 25B depict exploded views of an example of an inner rotor assembly, according to some embodiments. FIG. 25A is a front perspective view of an inner rotor assembly 2500 in accordance with a specific embodiment. Inner rotor assembly 2500 includes an inner rotor assembly as an arrangement 2502 of magnetic material (or structures thereof, such as magnets) and magnetically permeable material. Also shown are outer radial boost magnets 2476 disposed on and/or adjacent radial non-confronting surfaces (e.g., in the extension portion) of the magnetically permeable material. Axial boost magnets 2477 can include magnetic material having surfaces oriented toward the rear (or axial) non-confronting surfaces of the magnetically permeable material with alternating directions of polarization. An outer radial flux conductor shield 2510 is disposed over outer radial boost magnets 2476, and an axial flux conductor shield 2514 including one or more axial shield structures 2512 are disposed on and/or adjacent the axial boost magnets 2477. FIG. 25B is a rear perspective view of inner rotor assembly 2500 of FIG. 25A. As shown, axial boost magnets 2477 are disposed adjacent rear (or axial) non-confronting surfaces 2405 of the magnetically permeable material of inner rotor assembly 2550.

Figure 26:
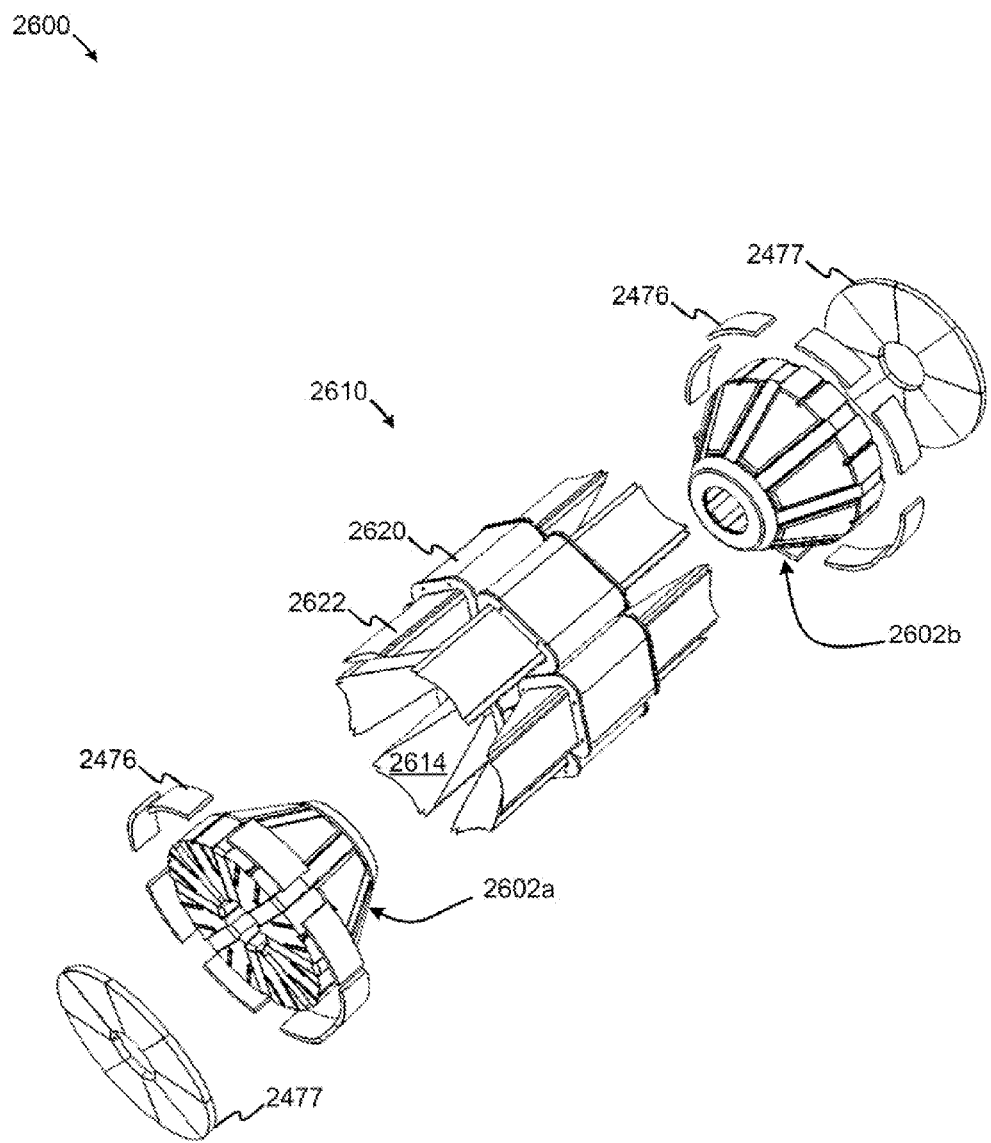
FIG. 26 is an exploded view of a rotor-stator structure including inner rotor assemblies in accordance with some embodiments.

FIG. 26 is an exploded view of a rotor-stator structure including inner rotor assemblies in accordance with some embodiments. Rotor-stator structure 2600 includes a stator assembly 2610 and inner rotor assemblies 2602a and 2602b. Stator assembly 2610 can include a number of field pole members 2622 having coils 2620 formed thereon, and a number of pole faces 2614 configured to confront the surfaces of inner rotor assemblies 2602a and 2602b. Inner rotor assemblies 2602a and 2602b can also include one or more of outer radial boost magnets 2476 and axial boost magnets 2477. In some examples, inner rotor assemblies 2602a and 2602b can include inner radial boost magnets (not shown). In other embodiments, inner rotor assemblies 2602a and 2602b can be replaced by rotor assemblies having cylindrical confronting surfaces, as well as outer radial boost magnets and axial boost magnets configured to enhance flux in flux paths formed through cylindrically-shaped rotor assemblies. Note that pole faces 2614 can include concave pole faces that are configured to confront convex-shaped portions of magnetic regions of inner rotor assemblies 2602a and 2602b. An example of a convex-shaped portion of a magnetic region if magnetic region 2440 of FIGS. 24A and 24B.

Various embodiments or examples of the invention may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples has been provided above along with accompanying figures. The detailed description is provided in connection with such examples, but is not limited to any particular example. The scope is limited only by the claims, and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

The description, for purposes of explanation, uses specific nomenclature to provide a thorough understanding of the various embodiments. However, it will be apparent that specific details are not required in order to practice the various embodiments. In fact, this description should not be read to limit any feature or aspect of to any embodiment; rather features and aspects of one example can readily be interchanged with other examples. Notably, not every benefit described herein need be realized by each example of the various embodiments; rather any specific example may provide one or more of the advantages discussed above. In the claims, elements and/or operations do not imply any particular order of operation, unless explicitly stated in the claims. It is intended that the following claims and their equivalents define the scope of the various embodiments.

The invention claimed is:

1. A rotor-stator structure for an electrodynamic machine comprising:
    a stator assembly comprising:
        field pole members arranged about an axis of rotation and including pole faces at the ends of the field pole members, a subset of the pole faces including pole face portions coextensive with a boundary of a conically-shaped space; and
    one or more rotor assemblies arranged on the axis of rotation, each of the one or more rotor assemblies comprising:
        magnetically permeable structures positioned radially about the axis of rotation, the magnetically permeable structures comprising:

confronting surfaces oriented at an angle to the axis of rotation to form air gaps with at least the pole face portions, and
non-confronting surfaces;
one or more groups of magnetic structures including magnetic material, the one or more groups of the magnetic structures comprising:
a first group of the magnetic structures interleaved with the magnetically permeable structures;
a second group of the magnetic structures; and
a flux conductor shield disposed adjacent to the second group of the magnetic structures, the flux conductor shield configured to provide return flux paths for the second group of the magnetic structures.

2. The rotor-stator structure of claim 1 further comprising:
magnetic paths including the confronting surfaces, the field pole members, and the first group of the magnetic structures.

3. The rotor-stator structure of claim 2 wherein the second group of the magnetic structures are disposed externally to the magnetic paths.

4. The rotor-stator structure of claim 2 wherein the second group of the magnetic structures is configured to enhance flux in the magnetic paths.

5. The rotor-stator structure of claim 1 wherein the second group of the magnetic structures further comprises:
axial boost magnets,
wherein the flux conductor shield is an axial flux conductor shield.

6. The rotor-stator structure of claim 1 wherein the second group of the magnetic structures further comprises:
radial boost magnets,
wherein the flux conductor shield is a radial flux conductor shield.

7. The rotor-stator structure of claim 1 wherein the pole face portions are disposed outside of the boundary of the conically-shaped space and the confronting surfaces are disposed inside of the boundary of the conically-shaped space,
wherein the pole face portions are disposed at a greater radial distance from the axis of rotation than the confronting surfaces.

8. The rotor-stator structure of claim 7 wherein the one or more rotor assemblies further comprise:
an inner rotor assembly.

9. The rotor-stator structure of claim 7 wherein the pole face portions further comprise:
concave-shaped pole face portions.

10. The rotor-stator structure of claim 1 wherein the pole face portions are disposed inside of the boundary of the conically-shaped space and the confronting surfaces are disposed outside of the boundary of the conically-shaped space,
wherein the confronting surfaces are disposed at a greater radial distance from the axis of rotation than the pole face portions.

11. The rotor-stator structure of claim 10 wherein the one or more rotor assemblies further comprise:
an outer rotor assembly.

12. The rotor-stator structure of claim 10 wherein the pole face portions further comprise:
convex-shaped pole face portions.

13. The rotor-stator structure of claim 10 further comprises:
another group of the magnetic structures; and
another flux conductor shield,
wherein the group of the magnetic structures includes outer radial boost magnets and the flux conductor shield is an outer radial flux conductor shield,
wherein the another group of the magnetic structures includes inner radial boost magnets and the another flux conductor shield is an inner radial flux conductor shield.

14. The rotor-stator structure of claim 10 wherein the group of the magnetic structures comprises:
breadloaf magnets.

15. A rotor-stator structure for an electrodynamic machine comprising:
a rotor in which rotor assemblies are arranged on an axis of rotation, each of the rotor assemblies comprising:
an arrangement of magnetic regions comprising:
magnetically permeable structures positioned radially about the axis of rotation, the magnetically permeable structures comprising confronting surfaces, and non-confronting surfaces, and
magnetic material interleaved with the magnetically permeable structures;
axial boost magnets;
one or more axial flux conductor shields configured to provide return magnetic paths for the axial boost magnets;
radial boost magnets;
one or more radial flux conductor shields configured to provide return magnetic paths for the radial boost magnets; and
field pole members arranged about the axis and including pole faces at the ends of the field pole members, a subset of the pole faces being positioned to confront the arrangement of the magnetic regions to establish air gaps.

16. The rotor-stator structure of claim 15 wherein the confronting surfaces further comprise:
angled confronting surfaces oriented at an angle to the axis and disposed coextensive with a portion of a conically-shaped space centered on the axis of rotation.

17. The rotor-stator structure of claim 16 wherein the rotor assemblies further comprise:
outer rotor assemblies.

18. The rotor-stator structure of claim 17 wherein the radial boost magnets further comprise:
inner radial boost magnets; and
outer radial boost magnets.

19. The rotor-stator structure of claim 16 wherein the rotor assemblies further comprise:
inner rotor assemblies.

20. The rotor-stator structure of claim 19 wherein the radial boost magnets further comprise:
outer radial boost magnets.

21. The rotor-stator structure of claim 19 wherein the radial boost magnets further comprise:
inner boost magnets.

* * * * *